United States Patent
Horwitz et al.

(10) Patent No.: US 12,340,390 B2
(45) Date of Patent: Jun. 24, 2025

(54) ARCHITECTURE AND METHOD FOR AGGREGATING AND INTERACTING WITH MULTIPLE THIRD-PARTY APPLICATIONS

(71) Applicant: Comcast Cable Communications, LLC, Philadelphia, PA (US)

(72) Inventors: Michael Horwitz, Seattle, WA (US); Benjamin E. Greenberg, Philadelphia, PA (US); Jiuqing Deng, Kirkland, WA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/886,201

(22) Filed: Aug. 11, 2022

(65) Prior Publication Data

US 2024/0054526 A1 Feb. 15, 2024

(51) Int. Cl.
*G06F 15/16* (2006.01)
*G06Q 30/0242* (2023.01)
*G06Q 30/0272* (2023.01)
*H04L 67/1014* (2022.01)
*H04L 67/50* (2022.01)
*H04L 67/60* (2022.01)
*H04N 21/60* (2011.01)
*H04W 48/18* (2009.01)

(52) U.S. Cl.
CPC ..... *G06Q 30/0242* (2013.01); *G06Q 30/0272* (2013.01); *H04L 67/1014* (2013.01); *H04L 67/50* (2022.05); *H04L 67/60* (2022.05)

(58) Field of Classification Search
CPC ............ G06Q 30/0242; G06Q 30/0272; H04L 67/1014; H04L 67/50; H04L 67/60
See application file for complete search history.

(56) References Cited

U.S. PATENT DOCUMENTS

| | | | |
|---|---|---|---|
| 10,476,985 B1 * | 11/2019 | Spina | G06F 9/5077 |
| 11,315,104 B2 * | 4/2022 | Wang | G06Q 20/326 |
| 11,620,673 B1 * | 4/2023 | Paquette | G06Q 30/0242 |
| | | | 705/14.41 |
| 2013/0067090 A1 * | 3/2013 | Batrouni | H04L 67/1097 |
| | | | 709/226 |
| 2019/0199616 A1 * | 6/2019 | Jones | H04L 67/60 |
| 2022/0376986 A1 * | 11/2022 | Sheppard | H04L 41/06 |

(Continued)

FOREIGN PATENT DOCUMENTS

| | | | | |
|---|---|---|---|---|
| WO | WO-2022005914 A1 * | 1/2022 | | G06F 21/45 |
| WO | WO-2023246488 A1 * | 12/2023 | | |

OTHER PUBLICATIONS

Guidelines for Identifier for Advertising (IFA) on CTV/OTT platforms, Version 1.0, Released Dec. 2018, © 2018 IAB Technology Laboratory https://labtechlab.com/OTT-IFA.

*Primary Examiner* — Schquita D Goodwin
(74) *Attorney, Agent, or Firm* — Banner & Witcoff, Ltd.

(57) ABSTRACT

Systems, apparatuses, and methods are described for generating tokens for user devices to request content items from one or more content delivery networks via networks provided by a network service provider. The tokens may be generated based on rules provided by the network service provider and may indicate whether the content delivery networks have permission to send targeted content items to the user device. Tokens provided to a user device may prevent repeated delivery of the same content item to the user device.

24 Claims, 33 Drawing Sheets

(56) References Cited

U.S. PATENT DOCUMENTS

| | | | |
|---|---|---|---|
| 2022/0400161 A1* | 12/2022 | Zafiris | H04L 61/5007 |
| 2023/0015524 A1* | 1/2023 | Salamon | H04L 67/562 |
| 2023/0032480 A1* | 2/2023 | Holton | G06Q 30/0201 |
| 2023/0059304 A1* | 2/2023 | Nainar | H04L 63/04 |
| 2023/0418966 A1* | 12/2023 | Pandey | G06F 21/6218 |

* cited by examiner

| Token 502 | | |
|---|---|---|
| Field Name | Data Type | Description |
| Identifier | UUID/string | Identifier generated by Secondary Content Request Token Generator |
| Rule Identifier | UUID/string | Rules used for generating token |
| Token Value | String | Token value |
| Expiration | DateTime | Time and date at which the token expires |
| Last Rotated on Behalf of | Enum | Tracks who last requested for this token to be rotated. One of:<br>"notApplicable" – set when token is first created prior to first rotation<br>"networkserviceprovider" – the rotation was performed by the network service provider<br>"user" – the rotation was performed at the request of a user |
| Token Type | Enum | String representing the type of token. One of :<br>"sspid" - Supply Side Platform identifier<br>"ppid" - Application<br>"dpid" - User Device<br>"sessionid" - Session |
| Application Identifer | | Identifier of application that requested the token |
| Device identifier | String | Identifer of the device |
| User Account Identifier | String | Identifier of the user account that owns this token |
| Network Service Provider Identifier | String | Identifier of the network service provider connected to the user device |
| Targeted Secondary Content? | Boolean | Indicates whether user or the user device has permitted targeted secondary content items |

FIG. 5

| Rule 732 | | |
|---|---|---|
| Field Name | Data Type | Description |
| Rule Identifier | UUID/string | Unique identifier for rule. |
| Default? | Boolean | Default rule for a network service provider |
| Expiration | DateTime | Life span for tokens generated with this rule |
| Token Type | Enum | String representing the entity who requested the token. One of : "ppid" - Application Identifier "dpid" - User Device Identifier "sessionid" - Session identifier |
| Application Identifer | String | Identifier of application associated with the rule. |
| Network Service Provider Identifier | String | Identifier of the network service provider associated with the rule. |
| Application Provider Identifier | String | Identifier of owner of application |

FIG. 7

User Interface 1002 for Privacy Settings

Enable delivery of targeted secondary content items.

| Application A | Application B | Application C | All Applications |
|---|---|---|---|
| ☐ | ☒ | ☐ | ☐ |

FIG. 10A

User Interface 1004 for Privacy Settings

Select content targeting data that can be used for targeted secondary content.

- ☐ User Identifier
- ☒ Device Identifier
- ☐ User Account Indentifier
- ☐ Internet Protocol Address
- ☐ Address
- ☐ Country
- ☒ ZIP Code
- ☐ Designated Marketing Area
- ☐ Primary Content Information
- ☒ Primary Content Genre
- ☐ User Rating for Primary Content
- ☐ Primary Content Viewing Data
- ☐ Demographic Data
- ☐ Psychographic Data

FIG. 10B

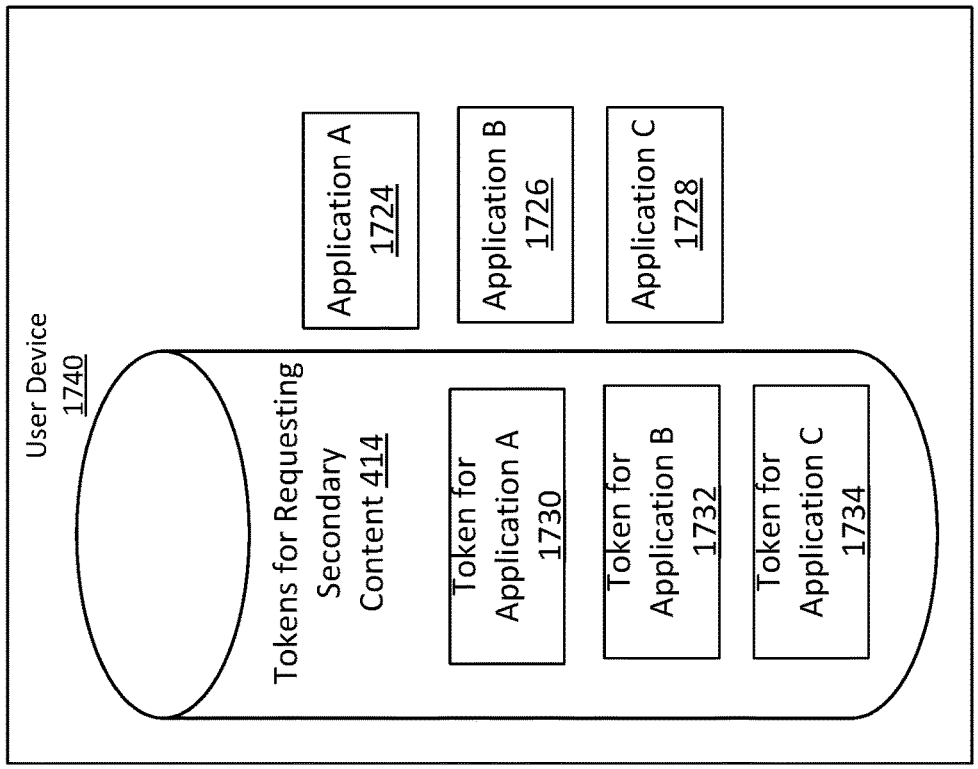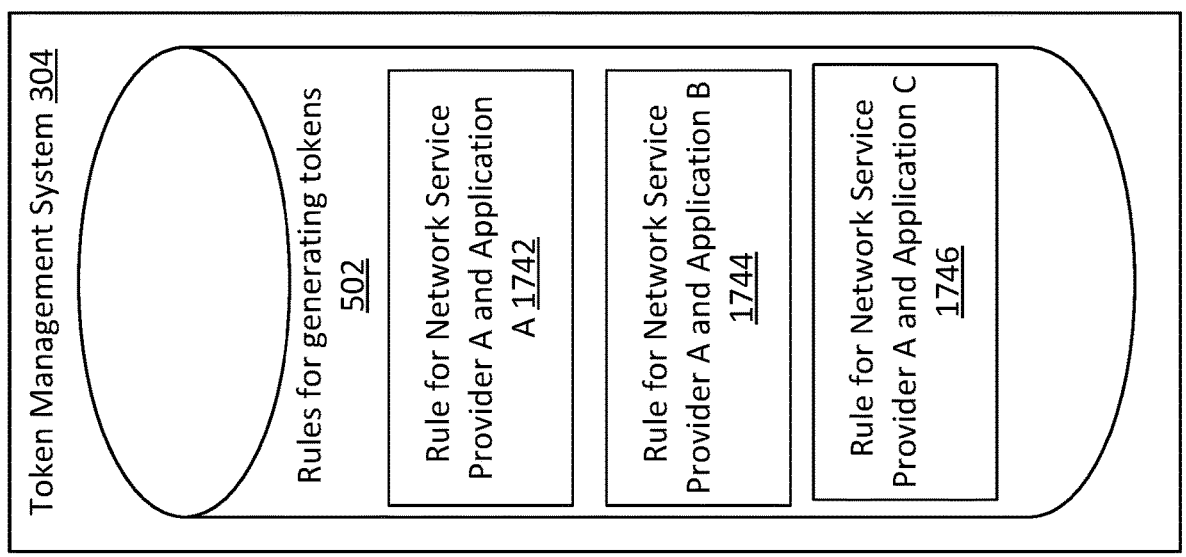
FIG. 17D

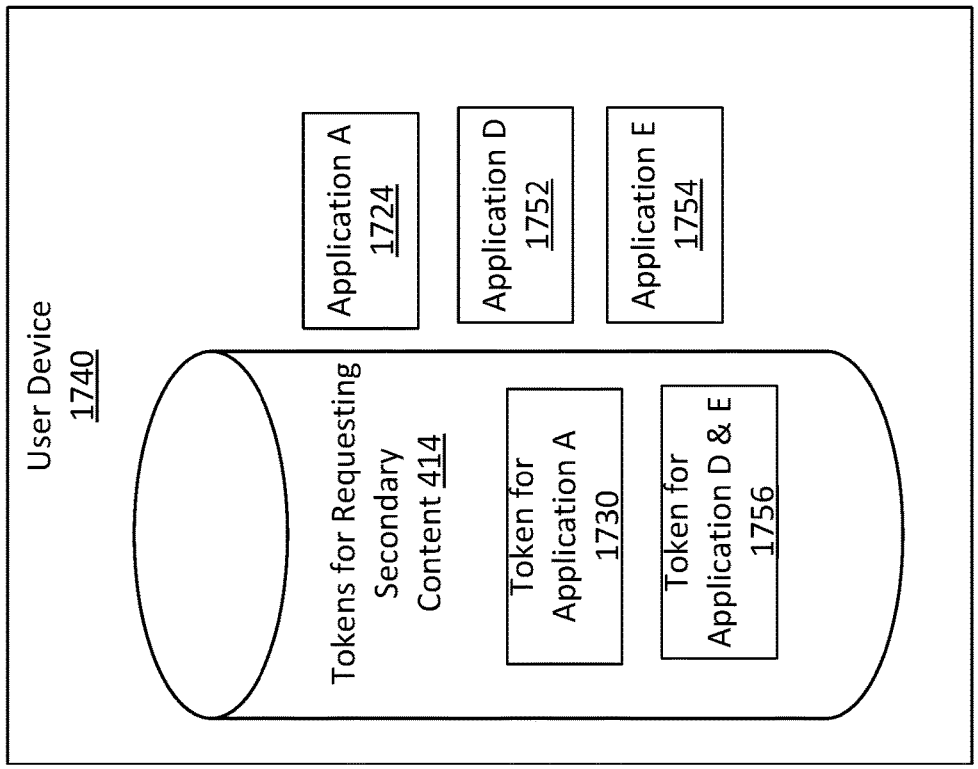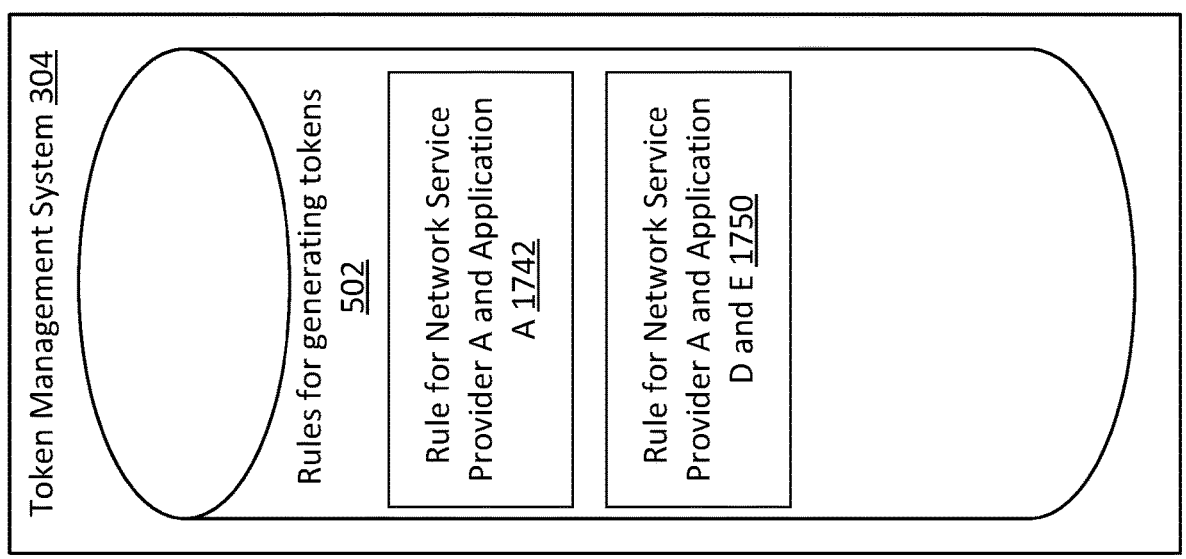
FIG. 17E

ARCHITECTURE AND METHOD FOR AGGREGATING AND INTERACTING WITH MULTIPLE THIRD-PARTY APPLICATIONS

BACKGROUND

User devices may use tokens to request content via one or more content delivery networks via networks provided by different network service providers. The content delivery networks may use such tokens to track the content sent to different user devices. However, different network service providers may have varying requirements for tokens.

SUMMARY

The following summary presents a simplified summary of certain features. The summary is not an extensive overview and is not intended to identify key or critical elements.

A user device may receive content (e.g., advertisements) from various content delivery networks (e.g., advertisement delivery networks) via various applications installed in the user device and via a network provided by a network service provider. The user device may use one or more tokens assigned to the user device to request the content (e.g., advertisements) from the content delivery networks (e.g., advertisement delivery networks). Systems, apparatuses, and methods are described for generating tokens for a user device based on rules provided by the network service provider associated with the user device. The network service provider may specify rules for generating tokens for a user device connected to its networks or a user account associated with the user device and the network service provider. For example, a network service provider may provide rules that specify generating tokens for each device associated with a user account and/or tokens for each application present in a user device. One or more tokens may be generated for a user device connected to a network service provider's networks based on the rules provided by the network service provider. The user device and/or applications present in the user device may use the tokens to request content from the content delivery networks. The content delivery networks (e.g., advertisement delivery networks) may use the tokens to track content (e.g., advertisements) being sent to the user devices to avoid repeated delivery of the same content. Tokens assigned to a user device may also indicate whether a user of the user device prefers to receive targeted content from the content delivery networks.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5 shows an example token.

FIG. 7 shows an example rule for generating tokens.

FIGS. 10A and 10B show example user interfaces for privacy settings of user devices.

FIGS. 17B, 17C, 17D, and 17E show example rules for generating tokens.

DETAILED DESCRIPTION

Figure 1A:
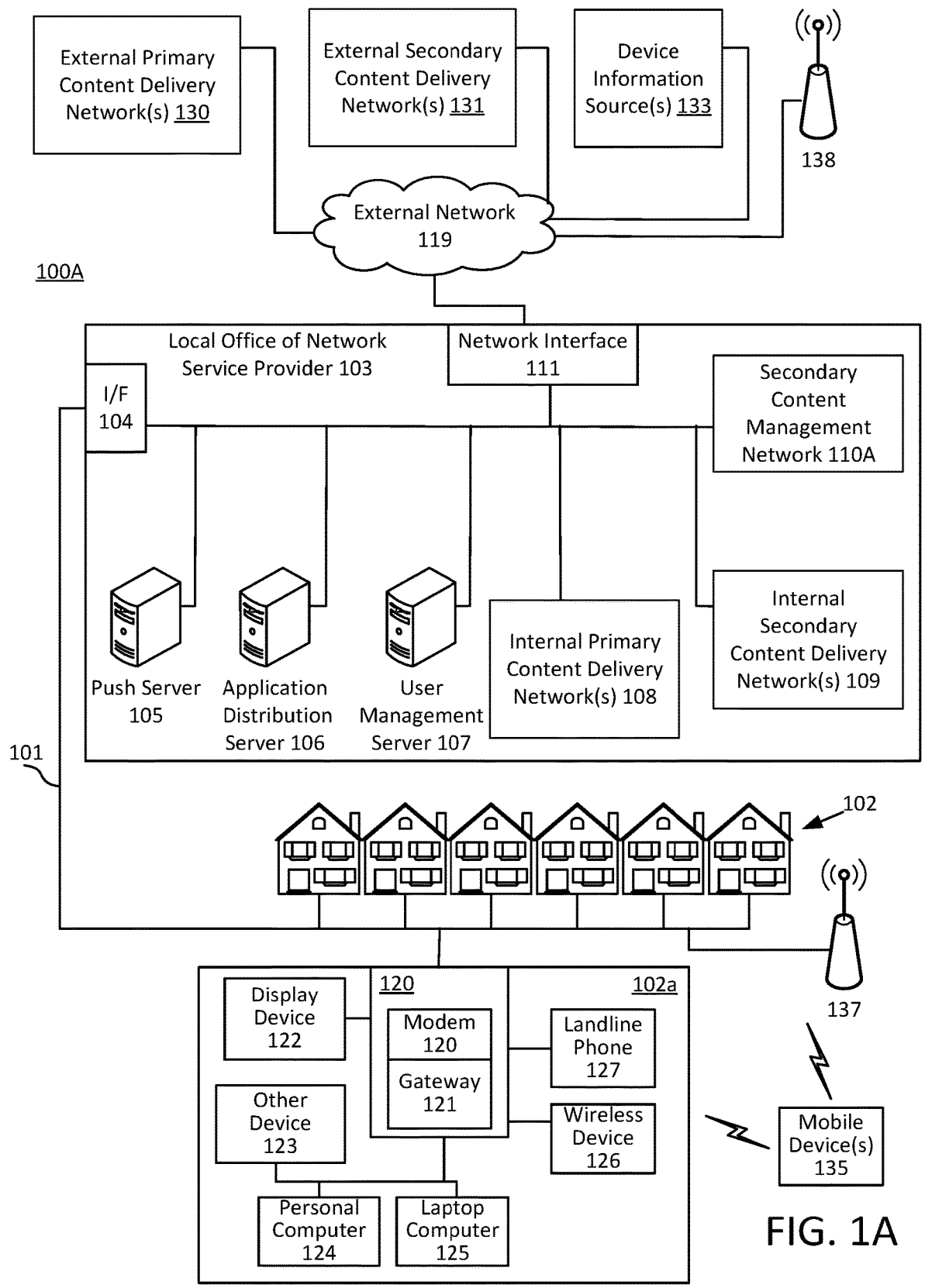
FIGS. 1A and 1B show example communication networks for providing primary and secondary content to user devices.

The accompanying drawings, which form a part hereof, show examples of the disclosure. It is to be understood that the examples shown in the drawings and/or discussed herein are non-exclusive and that there are other examples of how the disclosure may be practiced.

Primary content delivery networks (e.g., networks of broadcasters, platform operators, cable networks, network service providers, entities providing online streaming and/or download of content, channels, or media representative firms) may provide a variety of different types of primary content items (e.g., sporting events, documentaries, series, news programs, movies, etc.) to users and/or user devices belonging to the users. The primary content items may be accessible at different locations and/or via different user devices (e.g., via smart-TV, tablet, laptop, smartphone, etc.)

and/or network computing devices (e.g., via gateways, set-top boxes, etc.) to the users. Secondary content delivery networks (e.g., advertisers, retailers, advertisement agencies, advertisement recommendation engines, government entities, etc.) may provide secondary content items (e.g., advertisements, promotions, infomercials, banners, hyperlinks, public service announcements, etc.) that can be shown to a user between the showings of different portions of a primary content item and/or between the showings of two primary content items. The secondary content items may be directly or indirectly related to the primary content items or may be unrelated.

Primary content delivery networks may send a primary content item to a user device and may indicate to the user device one or more times and/or time periods within the display of the primary content item when one or more secondary content items can be inserted and also displayed by the user device. The user device may be responsible for requesting the secondary content items from secondary content delivery networks during available slots (e.g., slots corresponding to the indicated one or more times and/or time periods) in the delivery of a primary content item. A slot may be a period during the delivery of primary content items via which secondary content items may be delivered to users. For example, a stream for a soap opera or a movie may have several slots or opportunities (e.g., commercial breaks) to insert secondary content items. User devices streaming the same primary content item (e.g., a movie) may receive the same secondary content item during a slot (e.g., all viewers of a sporting event may watch an advertisement for one of the sponsors of the sporting event featuring one of the players), or may receive different secondary content items (e.g., half of the viewers of a sporting event may view an advertisement for car insurance while the other half may view an advertisement for a cat food product).

One type of secondary content items may be nontargeted secondary content items that may be designed and/or intended for delivery to any user despite the user's past viewership, demographic and psychographic characteristics (e.g., show an advertisement for a national car insurance company to all users watching a sporting event). A nontargeted secondary content item may be specific to users in a country (e.g., showing an advertisement for deals available only in the United States of America), county, neighborhood (e.g., showing an advertisement for a local coffee shop), or state (e.g., showing an advertisement for a retail store located only in Texas), and/or for a specific period (e.g., showing an advertisement for inflatable swimming pools from May to August).

Another type of secondary content item may comprise targeted content items (e.g., targeted advertisements) designed and/or intended for delivery to selected users and/or households that are likely to be most receptive to the messages embodied in the targeted secondary content items. Secondary content delivery networks may be requested to select users at geographic, demographic, and behavioral levels to deliver a targeted secondary content item. One way of targeting users may involve selecting targeted secondary content items for the users based on the users' demographic and psychographic characteristics (e.g., an advertisement for an expensive sports car may be wasted if delivered to users who are not able to afford or are otherwise uninterested in such cars). Additionally, the context of the primary content items may not be compatible with the particular types/themes of targeted content items (e.g., a movie having a non-violent theme may not mesh optimally with advertisements for UFC sporting or boxing events, regardless of demographics or geography). Users may receive targeted secondary content items via user devices (e.g., via smart-TV, tablet, laptop, gateway device, set-top box, or smartphone, etc.) configured to receive insertions of targeted secondary content items (e.g., in connection with receiving primary content items). A user and/or a household may be associated with a single user device configured to receive insertions of targeted secondary content items for that particular user or household. For example, a household may comprise a first user, associated with a laptop and interested in cars, who may receive targeted content items about cars via the laptop, and a second user, associated with a smartphone and seeking to book a vacation, may receive targeted content items about vacations via the smartphone.

A user device may request secondary content items from one or more secondary content delivery networks providing secondary content items that can be inserted between segments of primary content displayed to a user. However, the user may get frustrated if the same secondary content item is repeatedly sent to one or more user devices of the user, and may prefer to watch a variety of secondary content items. Moreover, a secondary content item may depreciate in value or be less interesting to a user if the secondary content item is repeatedly sent to the user. Therefore, the secondary content delivery networks may track secondary content items sent to a user device to avoid repeated sending of a particular secondary content item to the user device.

Tokens may be used to identify user devices requesting and receiving secondary content items from the secondary content delivery networks. For example, one or more tokens may be assigned to a user device. The user device may use the tokens to request secondary content items from secondary content delivery networks. The secondary content delivery networks may use the tokens to track secondary content items sent to the user device, times when the secondary content items have been sent to the user device, and/or the number of times a particular secondary content item has been sent to the user device. The secondary content delivery networks may also set one or more limits for a particular secondary content item that can be sent to a user device associated with a token. The limit can be associated with time (e.g., send the secondary content item only for the next one day or week to a user device associated with a particular token), frequency (e.g., send the secondary content item at most five times within a day to a user device associated with a particular token), and/or performance metrics of the secondary content item (e.g., consider not sending the secondary content item if the user had not responded to the message in the secondary content item). By using the token to track (e.g., anonymously track) delivery of secondary content items to the user device, a secondary content delivery network may prevent the same secondary content item from being repeatedly sent to the user device. For example, if a particular secondary content item has been sent multiple times in the last twenty-four hours, the secondary content delivery network may send another secondary content item instead of that particular secondary content item after the twenty-four hour period. As another example, if a particular secondary content item has been sent five times in the last one hour, the secondary content delivery network may send another secondary content item instead of that particular secondary content item.

The tokens may be configured to expire after a time period (e.g., a day, a week, duration of display of a primary content item) and/or be revoked at any time. Therefore, the user device may use each assigned token to maintain a semi-persistent session with the secondary content delivery networks during the time period between when the token is assigned to the user device and when the token expires or is revoked. Sending of secondary content items to user devices during a session may be controlled by any timing limit (e.g., send a particular secondary content item only on the first day of the session) and/or frequency limit (e.g., send a certain secondary content item at most five times in an hour) adopted by the secondary content delivery network. New tokens may be assigned to the user devices after expirations or revocations of previously assigned tokens, and the user devices may initiate new sessions with secondary content delivery networks based on the newly assigned tokens. Any tracking of the number of times a secondary content item has been sent to a user device or a time period within which the secondary content item may be sent can be reset upon receiving a new token from the user devices. For example, if a secondary content delivery network was not sending a particular secondary content item to a user device because the secondary content item was already sent the maximum number of times set by the frequency limit during a session associated with a previously assigned token of the user device, the particular secondary session can be sent again to the user device if a new session is initiated with a newly assigned token.

A user may also prefer to receive targeted secondary content items based on the user's location and/or user's past viewership, demographic and psychographic characteristics. Alternatively, the user may prefer not to receive targeted secondary content items. The secondary content delivery networks may also need to know whether a user of the user device requesting the secondary content items prefers or does not prefer targeted secondary content items. The tokens assigned to the user devices may indicate to the secondary content delivery networks whether the user associated with the user device prefers targeted or non-targeted secondary content items.

A secondary content management network described herein may be configured to generate tokens and manage tokens for user devices to request and receive secondary content items from one or more secondary content delivery networks. The secondary content management network may also be configured to generate tokens that indicate whether users or user devices associated with the tokens prefer not to receive targeted secondary content items. Furthermore, a user may prefer not to share content targeting data (e.g., personal information and/or device-specific information) with the secondary content delivery network, and the secondary content management network described herein may manage data flow to one or more secondary content networks based on the user's privacy preferences. Additionally, multiple secondary content delivery networks may be able to provide secondary content items to the user device. The secondary content management network described herein may receive a request for secondary content items from a user device and select one of the multiple secondary content delivery networks to forward the request from the user device. The secondary content management network may forward secondary content items from the selected content delivery networks to the user devices.

FIG. 1A shows an example communication network 100A of a network service provider in which features described herein may be implemented. The communication network 100A may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100A may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend) of the network service provider. The local office 103 may send downstream information signals and receive upstream information signals via the communication links 101. Each of the premises 102 may comprise devices, described below, to receive, send, and/or otherwise process those signals and information contained therein. The communication network 100A provided by the network service provider may enable the devices (e.g., user devices, networking devices) in premises 102 to communicate with other devices in the premises 102 and/or communicate with the local office 103.

The communication links 101 may originate from the local office 103 and may comprise components not shown, such as splitters, filters, amplifiers, etc., to help convey signals clearly. The communication links 101 may be coupled to one or more wireless access points 137 configured to communicate with one or more mobile devices 135 via one or more wireless networks. The mobile devices 135 may comprise smartphones, tablets, or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as devices 105-109, 110A, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS), or an integrated cable modem termination system (I-CMTS)), one or more digital subscriber line access modules (DSLAMs), and/or any other computing device(s).

The local office 103 may comprise one or more network interfaces 111 that comprise circuitry needed to communicate via the external networks 109. The external networks 109 may comprise networks of Internet devices, telephone networks, wireless networks, wired networks, fiber optic networks, and/or any other desired network. The local office 103 of the network service provider may also or alternatively communicate with the mobile devices 135 via the interface 111 and one or more of the external networks 109, e.g., via one or more of the wireless access points 138.

An internal primary content delivery network 108 (which may be part of the local office 103 or in communication with the local office 103) may be configured to provide primary content items to devices in the premises 102 and/or to the mobile devices 135. Primary content items stored in the primary content delivery network 108 may comprise movies, television programs, online video programming, Internet radio, any variety of audio files, etc. The primary content delivery network 108 may also store various video games that may be accessed by devices in the premises 102 via the communication link 101. The primary content items stored in the primary content delivery network 108 may include a single title or selection (e.g., a single song, a single video program, or a single video game title or portion thereof) or a collection of programs (e.g., an entire album, several episodes of a television program, different 'chapters' of a single video as it might otherwise appear on a DVD, or various levels of a video game). In addition, the internal primary content delivery network 108 may comprise software to validate user identities and entitlements, locate and retrieve requested primary content, and/or initiate delivery (e.g., streaming) of the primary content.

An internal secondary content delivery network 109 (which may be part of the local office 103 or in communication with the local office 103) may be configured to provide secondary content (e.g., advertisements, promotions, infomercials, banners, hyperlinks, public service announcements, etc.) to devices in the premises 102 and/or to the mobile devices 135. The secondary content items stored at the internal secondary content delivery network 109 may include downloadable content such as video data, audio data, still image data, binary program data, or any combination of the above that is not otherwise primary content. Examples of secondary content items include advertisements, which may be made up of video images, animations, sounds, applets, and any other variety of features (e.g., HTML links in an advertisement to a site for purchase of a particular advertised product).

Additionally, or alternatively, one or more external primary content delivery network(s) 130 and/or one or more external secondary content delivery networks 131 may be accessible via the external network 119. The external primary content delivery networks 130 and/or the external secondary content delivery networks 131 may be configured to communicate with the devices 105-109, 110A in the local office 103 and/or with computing devices located in or otherwise associated with one or more premises 102. The external primary content delivery networks 130 may be similar to the internal primary content delivery networks 108 and provide primary content items to devices in the premises 102 and/or mobile devices 135. Similar to the internal secondary content delivery network 109, the external secondary content delivery network 131 may provide secondary content items to devices in the premises 102 and/or mobile devices 135.

Devices in the premises 102 and/or the mobile devices 135 may comprise software applications (also referred to as an "app") to request primary content items from the internal primary content delivery networks 108 and/or the external primary content delivery networks 130. The internal primary content delivery networks 108 and/or the external primary content delivery networks 130 may send the requested primary content items to the applications. Applications may cause display and/or output of the requested primary content items to users of the devices in the premises 102 and/or to the mobile devices 135. An application may be configured to request primary content from a corresponding one of the primary content delivery networks 108 and/or a corresponding one of the external primary content delivery networks 130. The devices in the premises 102 and/or the mobile devices 135 may download the applications from an application distribution server 106 or one or more application distribution servers located outside the local office 103. The application distribution server 106 may be a server that provides various applications for downloading. Although the network service provider may maintain its own internal secondary content delivery networks 109, secondary content items may also be delivered from one or more external secondary content delivery networks 131. Some of the external secondary content delivery networks (e.g., advertisement networks) may be associated with applications installed or present in user devices.

Users of a device in the premises 102 and/or of the mobile devices 135 may create user accounts with the network service provider maintaining the local office 103. The account information for each created user account may be maintained in the user management server 107. The user management server 107 may store profile information for each user account, including a unique account identifier identifying the user account, personal information, username, password, email address, home address, credit card information, banking information, etc. The user management server 107 may also include account management information, such as data storage locations, security settings, personal configuration settings, etc. In addition, the user management server 107 may be responsible for monitoring user content viewing habits and collecting information from that monitoring for use in selecting primary and second content items.

A secondary content management network 110A, which may be part of the local office 103 or otherwise in communication with the local office 103, may be responsible for managing the delivery of secondary content items to devices in the premises 102 and/or to the mobile devices 135. For example, the secondary content management network 110A may generate and manage tokens for user devices in the premises 102 and/or the mobile devices 135. In addition, the secondary content management network 110A may store various rules provided by the network service provider of the local office 103, other network service providers, and/or various applications. A user device in the premises 102 and/or the mobile devices 135 may send a request to the secondary content management network 110A for a token, and the secondary content management network 110A may generate a token for the device based on the stored rules. For example, the network service provider may provide rules that specify generating one token for all devices of each user account of the network service provider, tokens for each device of a user account, and/or tokens for each application installed in a user device.

User devices in the premises 102 and/or the mobile devices 135 may request secondary content items from the secondary content management network 110A by using the tokens assigned to the devices. The secondary content management network 110A may be responsible for requesting the secondary content items from various secondary content delivery networks (e.g., the internal secondary content delivery networks 109 and/or the external secondary content delivery networks 131), receiving the secondary content items from the secondary content delivery networks, and forwarding the secondary content items to the user devices. The user devices in the premises 102 and/or the mobile devices 135 may receive the secondary content items and insert the secondary content items in a video or audio stream of a primary content item being displayed or outputted by the devices.

The secondary content management network 110A may store various rules provided by the network service provider of the local office 103, other network service providers, and/or various applications for routing requests for the secondary content items to one of the many available secondary content delivery networks (e.g., the internal secondary content delivery networks 109 and/or the external secondary content delivery networks 131). For example, the network service provider of the local office 103 may provide a rule for the secondary content management network 110A to forward every request from a particular application in all user devices in the premises 102 and the mobile devices 135 to the internal secondary content delivery network 109. Also, or alternatively, the network service provider of the local office 103 may provide a rule for the secondary content management network 110A to forward every request from another application in all user devices in the premises 102 and the mobile devices 135 to an external secondary content delivery network 131 associated with the other application. As another example, the network service provider of the local office 103 may provide a rule for the secondary content management network 110A to forward some of the requests to the internal secondary content delivery network 109 (e.g., 60% of the requests) and some to requests to an external secondary content delivery network 131 associated with the application (e.g., 40% of the requests). The secondary content management network 110A may use the rules provided by the network service provider of the local office 103, other network service providers, and/or various applications for routing requests for the secondary content items to one of the many available secondary content delivery networks (e.g., the internal secondary content delivery networks 109 and/or the external secondary content delivery networks 131).

The secondary content management network 110A may be configured to divide the revenue gained by outputting the secondary contents to the user devices in the premises 102 and/or to the mobile devices 135 among different recipients of the revenue. The recipients may be the network service providers, entities (e.g., companies) providing and/or otherwise associated with various applications installed in the user devices in the premises 102 and/or to the mobile devices 135, entities providing and/or otherwise associated to external primary or secondary content delivery networks, any manufacturer and/or retailer of the user devices in the premises 102 and/or to the mobile devices 135, etc. The secondary content management network 110A may also be connected to the device information sources 133 via the external network 119 to receive information about user devices in the premises 102 and/or the mobile devices 135 from the manufacturers or retailers of the devices. The secondary content management network 110A may store various rules provided by the network service provider and/or other recipients for dividing the revenue. For example, the network service provider of the local office 103 may provide a rule for the secondary content management network 110A to assign all the revenue to the network service provider. Alternatively, the network service provider of the local office 103 may provide a rule for the secondary content management network 110A to assign all the revenue to the entity providing and/or otherwise associated with the application displaying the secondary content items. As another example, the network service provider of the local office 103 may provide a rule for the secondary content management network 110A to assign a portion of the revenue to the network service provider, a portion of the revenue to the entity providing and/or associated with the application displaying the secondary content items, and some portion to the manufacturers and/or retailers of the user and mobile devices.

The push notification server 105 may be configured to generate push notifications to deliver information to devices in the premises 102 and/or to the mobile devices 135. The local office 103 may comprise additional servers, such as the additional push, content delivery networks, application distribution servers, and/or other types of servers. Although shown separately, the push server 105, the application distribution server 106, the user management server 107, the internal primary content delivery network 108, the internal secondary content delivery network 109, the secondary content management network 110, and/or other server(s) may be combined. The devices 105-107, and/or devices associated with the internal networks 108, 109, 110A, and/or other devices, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 120, which may comprise transmitters and receivers used to communicate via the communication links 101 with the local office 103 of the network service provider. The modem 120 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1A, but a plurality of modems operating in parallel may be implemented within the interface 120. The interface 120 may comprise a gateway 121. The modem 120 may be connected to, or be a part of, the gateway 121. The gateway 121 may be a computing device that communicates with the modem(s) 120 to allow one or more other devices in the premises 102a to communicate with the local office 103 and/or with other devices beyond the local office 103 (e.g., via the local office 103 and the external network(s) 109). The gateway 121 may comprise a set-top box (STB), digital video recorder (DVR), a digital transport adapter (DTA), a computer server, and/or any other desired computing device.

The gateway 121 may also comprise one or more local network interfaces to communicate, via one or more local networks, with devices in the premises 102a. Such devices may comprise, e.g., display devices 122 (e.g., televisions), other devices 123 (e.g., a DVR or STB), personal computers 124, laptop computers 125, wireless devices 126 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 127 (e.g., Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 135, which may be on- or off-premises.

The mobile devices 135, one or more of the devices in the premises 102a, and/or other devices may download one or more applications from the application distribution server 106. The mobile devices 135, one or more of the devices in the premises 102a, and/or other devices may request primary content items from the internal primary content delivery network 109 and/or the external primary content delivery network 130. The mobile devices 135, one or more of the devices in the premises 102*a*, and/or other devices may receive, store, output, and/or otherwise use assets. An asset may comprise a video, a game, one or more images, software, audio, text, webpage(s), and/or other content.

The secondary content management network 110A may provide tokens and/or secondary content items to user devices connected to networks provided by a single network service provider (e.g., the user devices in the premises 102 and/or the mobile devices 135 connected to networks provided the local office 103 of one network service provider). Also, or alternatively, a secondary content management network may provide tokens and/or secondary content items to devices connected to networks of multiple network service providers.

Figure 1B:
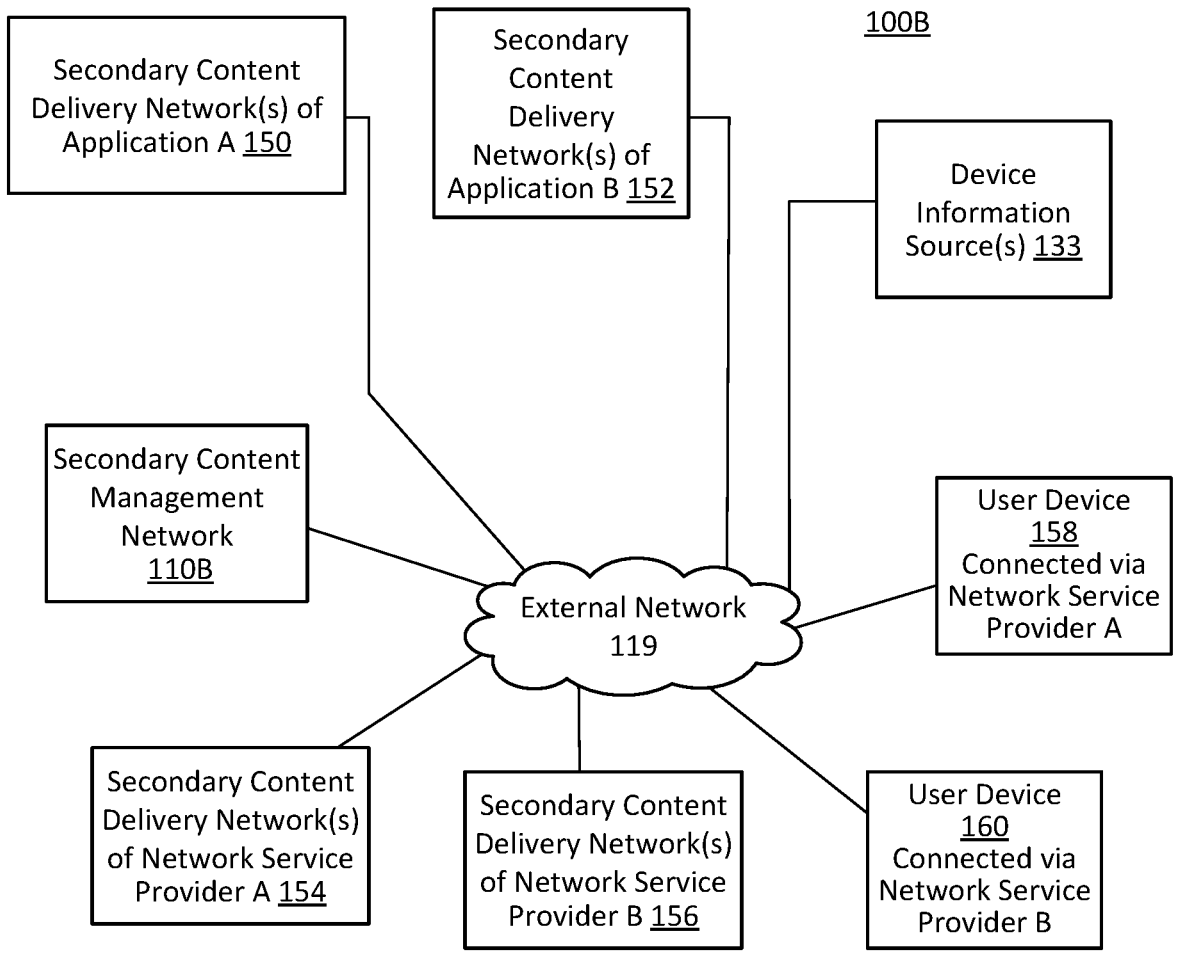

FIG. 1B shows a communication network 100B where another example secondary content management network 110B may provide tokens and/or secondary content items to user devices of multiple network service providers. For example, the secondary content management network 110B may be in communications with the user device 158 associated with the network service provider A and the user device 160 associated with the network service provider B via the external network 119. The secondary content management network 110B may also be connected to one or more secondary content delivery networks associated with different network service providers via the external network 119, such as the secondary content delivery networks 154 associated with the network service provider A and the secondary content delivery networks 156 associated with the network service provider B. Additionally, the secondary content management network 110B may also be connected via the external network 119 to one or more secondary content delivery networks associated with entities providing and/or associated with applications installed in the user devices 158, 160 for streaming primary content items. For example, one or more applications (e.g., applications A and B) may be installed on (e.g., stored in memory of and/or executing on) the user devices 158 and 160 and may be configured to access primary content items delivered via primary content delivery networks (e.g., external primary content delivery networks 130, primary content delivery networks associated with entities providing applications A and B) associated with those one or more applications. The secondary content management network 110B may also be in communications with the secondary content delivery networks 150 associated with the entity providing the application A and the secondary content delivery networks 152 associated with the entity providing the application B. The secondary content management network 110B may also be connected to the device information sources 133 via the external network 119 to receive information about user devices 158, 160 from the manufacturers or retailers of the user devices 158, 160.

The secondary content management network 110B may provide tokens and/or secondary content items to user device 158 connected to networks of network service provider A and also to user device 160 connected to networks provided by network service provider B. The network service provider A and network service provider B maybe have different rules for generating tokens for user devices in communications with their networks. The rule for the network service provider A may indicate providing a single token for the user device 158 connected to networks provided by the network service provider A. Both applications A and B installed in the user device 158 may request secondary content items with the single token. Alternatively, the rule for the network service provider B may indicate to provide a token for each application installed in the user device 160 connected to networks provided by the network service provider B such that applications A and B installed in the user device 160 may request secondary content items with different tokens.

The applications installed in the user devices 158, 160 may use the tokens to request secondary content from the secondary content management network 110B. The secondary content management network 110B may forward the request to one of the secondary content delivery networks (e.g., the secondary content delivery network associated with the application A 150, the secondary content delivery network associated with the application B 152, the secondary content delivery network of network service provider A 154, the secondary content delivery network of the network service provider B 156, etc.) The network service providers and/or the applications may also provide rules to the secondary content management network 110B for routing the request for secondary content to the different secondary content delivery networks. For example, the network service provider A may provide a rule for the secondary content management network 110B to forward every request from all user devices connected to its network (e.g., the user device 158) to the secondary content delivery network of the network service provider A 154. Alternatively, the network service provider B may provide a different rule for the secondary content management network 110B to forward every request from all user devices connected to its network (e.g., the user device 160) to the secondary content delivery network associated with the entity providing and/or associated with the application requesting the secondary content items (e.g., forward request to the secondary content delivery network of application A 150 if application A in the user device 160 requested the secondary content items or to the secondary content delivery network of application B 152 if application B in the user device 160 requested the secondary content items). As another example, either one of the network service providers A and B may provide a rule for the secondary content management network 110B to forward some of the requests to the secondary content delivery networks belonging to the network service providers (e.g., 60% of the requests) and some to the secondary content delivery networks of the entities providing and/or associated with the application requesting the secondary content items (e.g., 40% of the requests).

Figure 2:
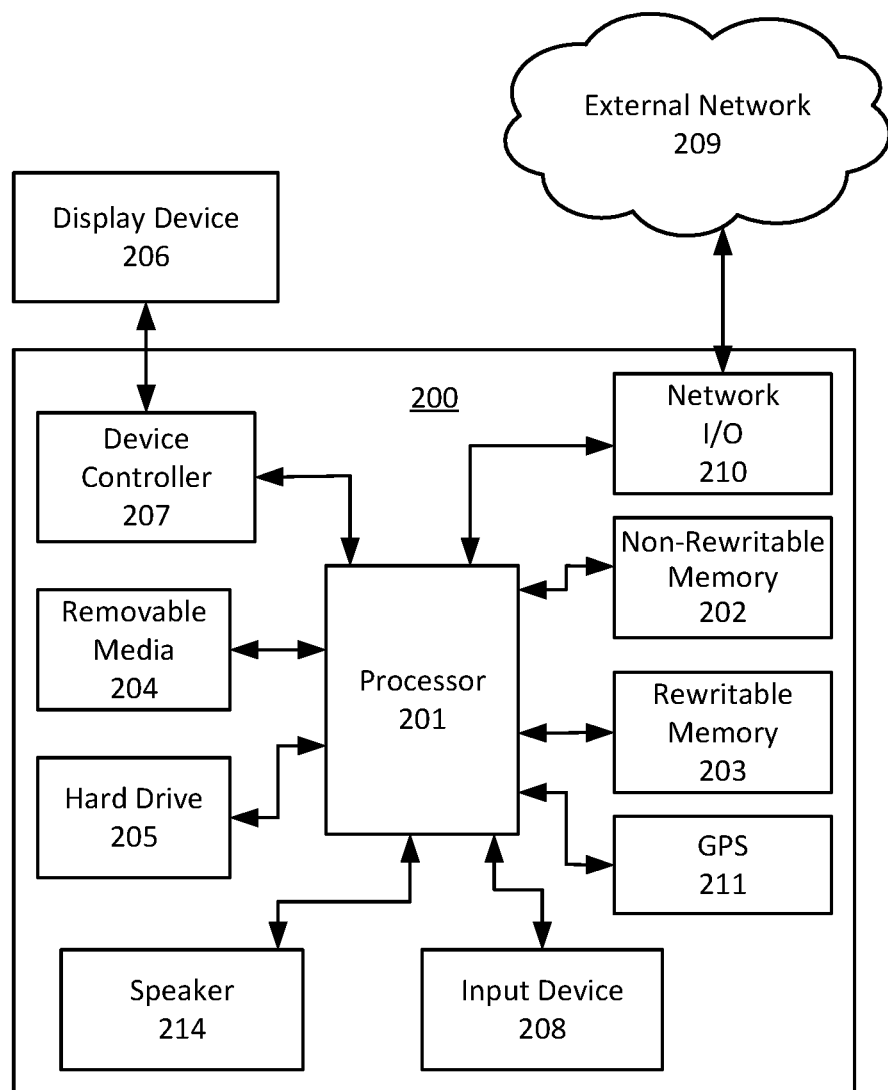
FIG. 2 shows hardware elements of a computing device.

FIG. 2 shows hardware elements of a computing device 200 that may be used to implement any of the computing devices shown in FIG. 1 (e.g., the mobile devices 135, any of the devices shown in the premises 102*a*, any of the devices shown in the local office 103, any of the wireless access points 127, any devices associated with and/or accessed via the external network 119) and any other computing devices discussed herein (e.g., a token manager, a secondary content request router, primary content delivery networks, secondary content request delivery network, a user management server, etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLU-ETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 119, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc., components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations, and other operations described herein. An IC may perform some operations based on the execution of programming instructions read from ROM or RAM, with other operations hardwired into gates or other logic. Further, an IC may be configured to output image data to a display buffer.

Figure 3:
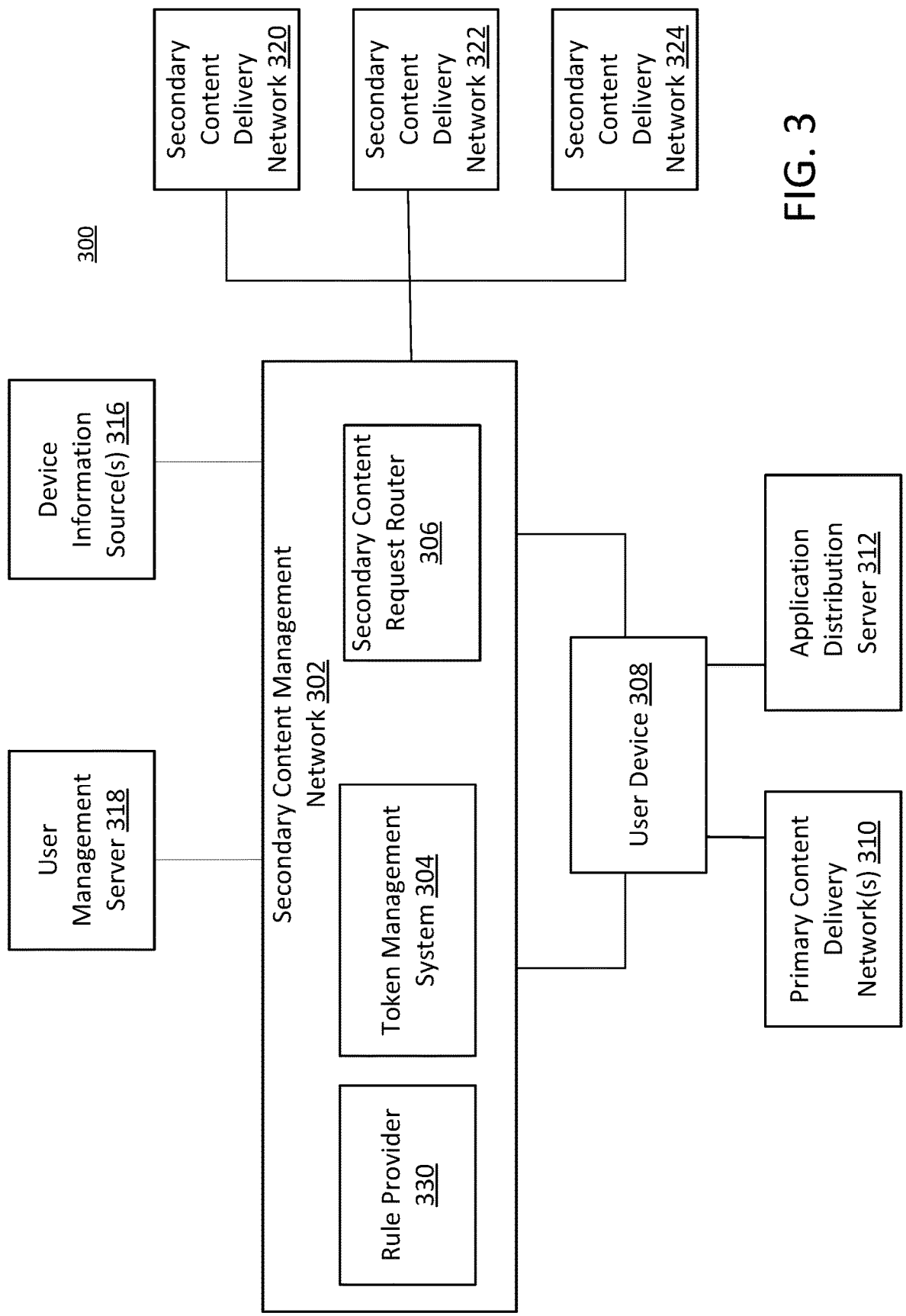
FIG. 3 shows an architectural level schematic of an environment that includes a secondary content management network.

FIG. 3 shows an architectural level schematic of an environment 300 that includes a secondary content management network 302 (e.g., the secondary content management network 110A in FIG. 1A, the secondary content management network 110B in FIG. 1B, etc.). The secondary content management network 302 may comprise one or more computing device(s) and/or may be implemented on a cloud service, as a Software-as-a-Service (SaaS) application, or a web-architected application. The secondary content management network 302 may be implemented in the context of any computer-implemented system, including a database system, a multi-tenant environment, or a relational database implementation. The secondary content management network 302 may comprise a token management system 304 (e.g., the network service provider token management system 2312 in FIG. 23), a secondary content request router 306 (e.g., the advertisement addressability and inventory management server 2302 in FIG. 23), and/or a rule provider 330. The token management system 304, the secondary content request router 306, and/or the rule provider 330, and/or other elements of the secondary content management network 302, may comprise one or more computing devices and/or one or more software components executing on one or more computing devices.

Figure 23:
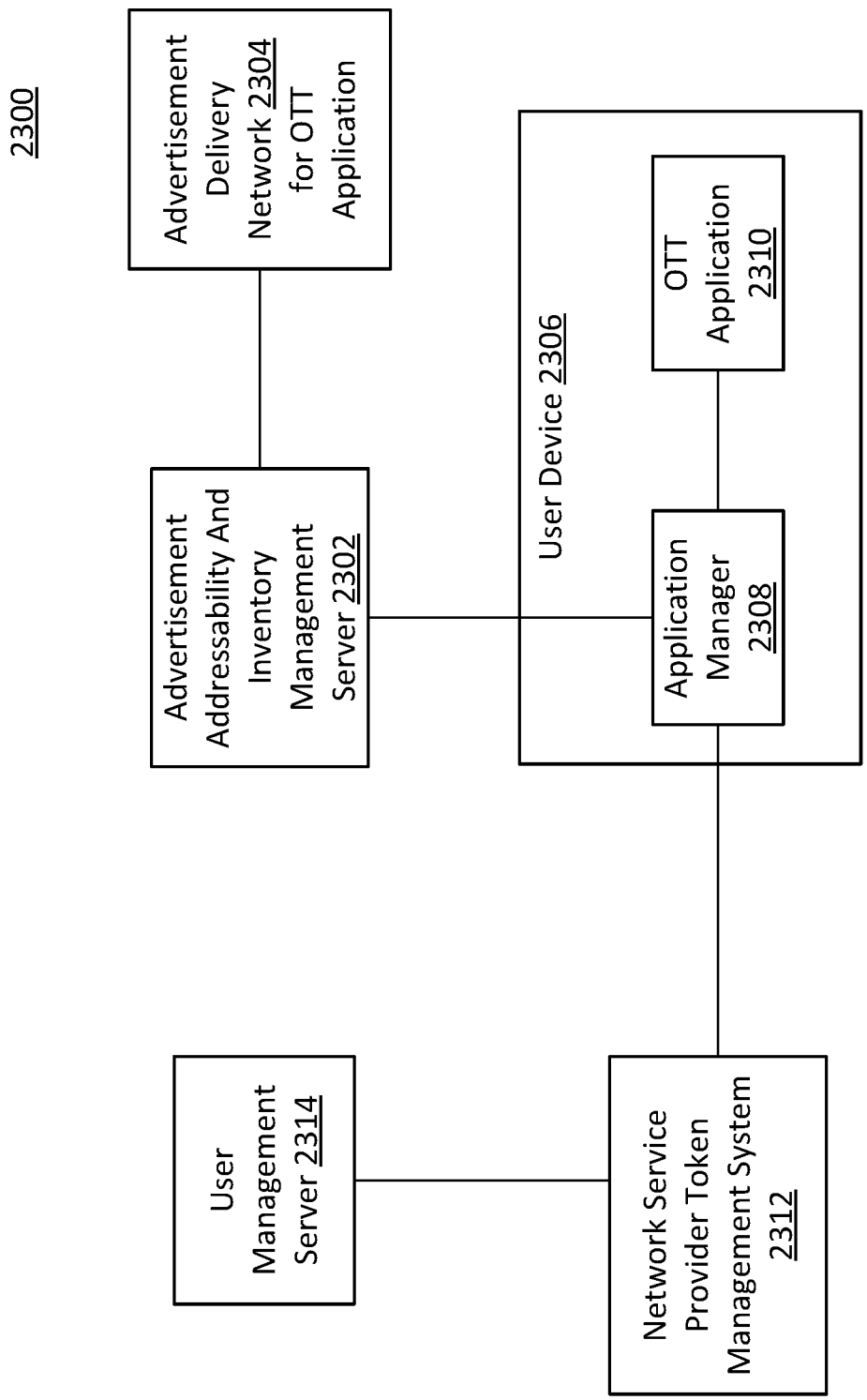
FIG. 23 shows an architectural level schematic of an environment that includes an advertisement addressability and inventory management server.

The token management system 304 (e.g., the network service provider token management system 2312 in FIG. 23) may manage tokens of user devices configured to display or output secondary content items, such as the user device 308 (e.g., any one of the user devices in the premises 102, the mobile devices 135, the user devices 158, 160, user device 2306). The user device 308 may request a token from the token management system 304. The token management system 304 may store rules provided by a network service provider (e.g., the network service provider of the local office 103 in FIG. 1A, the network service providers A and B in FIG. 1B). The network service provider may provide communication networks (e.g., the communication network 100A, the communication network 100B) that allow the user device to request, access, and/or output primary content via different applications (e.g., applications A and B in FIG. 1B) installed in the user device 308 from external and/or internal primary content delivery networks. The token management system 304 may generate a token for the user device based on the stored rules for generating tokens and send the token to the user device 308. If the user device 308 does not yet have an assigned token, the user device may send a request for a new token to the token management system 304. Additionally, or alternatively, the token management system 304 may determine that the token for the user device 308 has expired and generate a new token for the user device 308. The network service provider of the user device 308 may also request the token management system 304 to revoke a token previously assigned to the user device 308 and generate a new token for the user device 308. The user device 308 may send request information specific to the user device 308, and/or information specific to the users of the user device 308 to the token management system for generating and managing the tokens of the user device 308. Additionally, or alternatively, the token management system 304 may receive the user- and/or device-specific information from the user management server 318 (e.g., the user management server 107, the user management server 2314).

The user device 308 may host one or more applications that the user device has installed from the application distribution server 312 (e.g., the application distribution server 106 in FIG. 1A or any other application distribution server external to the local office 103 in FIG. 1A). The user device 308 may connect to the application distribution server 312 and display one or more lists of applications available for download from the application distribution server 312 to users of the user device 308. A user may select one of the available applications, and the selected application may be downloaded and installed on the user device. The user device 308 may initiate or execute the application to connect to various primary content delivery networks 310 (e.g., the internal primary content delivery network 109, any one of the external primary content delivery network(s) 130). Initiating or executing an application may initiate streaming of a primary content item from one of the primary content delivery networks 310. Alternatively, the application may display one or more lists of primary content items available for display from the primary content delivery networks 310. Upon selection of a primary content item from the displayed lists, the application may send a request to the primary content delivery networks 310 to deliver the requested primary content item to the user device 308.

The application delivering the primary content item may send a request to the user device 308 for secondary content items that can be displayed between segments of primary content. Alternatively, the user device 308 may identify various time points during the display of the primary content item where one or more secondary content items may be inserted and outputted by the user device 308. Either the application or the user device 308 may request the secondary content items from the secondary content request router 306 using the token generated by the token management system 304 for the user device 308.

The secondary content request router 306 (e.g., the advertisement addressability and inventory management server 2302 in FIG. 23) may receive the token and/or requests for secondary content items from the user device 308. The secondary content request router 306 may store rules provided by a network service provider (e.g., the network service provider of the local office 103 in FIG. 1A, the network service providers A and B in FIG. 1B), where the network service provider provide communication networks (e.g., the communication network 100A, the communication network 100B) that allow the user device 308 to request and/or receive secondary content items from one of the secondary content delivery networks 320, 322, 324 (e.g., the internal secondary content delivery network 109, the external secondary content delivery network 131, the secondary content delivery network 154 for network service provider A, the secondary content delivery network 156 for network service provider B, the secondary content delivery network 150 for application A, the secondary content delivery network 152 for application B, the advertisement delivery network 2304, etc.). The secondary content request router 306 may select one of the secondary content delivery networks 320, 322, 324 based on the stored rules and route the token and/or the requests for secondary content items from the user device 308 to the selected secondary content delivery network. The secondary content request router 306 may also store rules for dividing revenues earned by outputting secondary content items via the user device 308. The revenues may be divided among the network service provider associated with the user device 308, entities (e.g., businesses) associated with the application in the user device 308 requesting the secondary content items, entities providing and/or associated with the secondary content delivery networks 320, 322, 324, and/or the manufacturer or retailer of the user device 308. Information about the manufacturer or the retailer of the user device may be received from the user device 308, the user management server 318, and/or the device information sources 318 (e.g., the device information sources 133 in FIGS. 1A and 1B).

The user device 308 may also indicate to the token management system 304 that one or more users of the user device 308 prefer or do not prefer to receive targeted secondary content items from the secondary content delivery networks 320, 322, 324. The user device 308 may send the preference of the one or more users to the token management system 304 along with a request for a new token. Alternatively, when a user for the user device 308 changes the user's preference for targeted secondary content items, the user device 308 may send the updated preference to the token management system 304. In another example, the user device 308 may send the user's preference for targeted secondary content items to the user management server 318 (e.g., the user management server 107 of FIG. 1A), and the user management server 318 may provide the user's preference to the token management system 304.

When the secondary content request router 306 receives a token and/or a request for secondary content items from the user device 308, the secondary content request router 306 may determine whether the user device 308 has opted for targeted secondary content items (e.g., whether the preference of the one or more users of the user device 308 indicates that the user prefers or does not prefer targeted secondary content item). If the user device 308 has opted for targeted secondary content items, the secondary content request router 306 may retrieve information related to the user device 308, a user account associated with the user device 308, and/or users of the user device 308 from the user management server 318 (e.g., the user management server 107 in FIG. 1A), and forward the information to the secondary content delivery network selected by the secondary content request router 306 (e.g., selected based on the stored rules by the secondary content request router 306 for routing requests for secondary content items). The secondary content request router 306 may also retrieve user content viewing habits, demographic characteristics, and psychographic characteristics associated with the users of the user device 308 from the user management server 318 (e.g., the user management server 107 in FIG. 1A) and/or the user device, and forward such information to the selected secondary content delivery network. The selected secondary content delivery network may select a targeted secondary content item based on the user- and/or device-specific information provided by the secondary content request router 306 and send the targeted secondary content item to the secondary content request router 306. The secondary content request router 306 may forward the targeted secondary content item to the user device 308 for display.

Alternatively, if the user device 308 has opted not to receive targeted secondary content items, the secondary content request router 306 may forward only the token for the user device 308 to the selected secondary content delivery network. The selected secondary content delivery network may select a nontargeted secondary content item and send the nontargeted secondary content item to the secondary content request router 306. The secondary content request router 306 may forward the nontargeted secondary content item to the user device 308 for display.

The rule provider 330 may provide the rules for generating tokens to the token management system 304. Additionally, the rule provider 330 may provide the rules for routing requests for secondary content items to the secondary content request router 306. The rule provider 330 may also provide the rules for dividing revenue earned by outputting secondary content items via the user device 308 to the secondary content request router 306. The rule provider 330 may determine the rules provided to the token management system 304 and/or the secondary content request router 306 from information and/or inputs from the network service provider servicing the user device 308, a manufacturer of the user device 308, a retailer of the user device 308, the primary content delivery networks 310 of various applications that can be installed in the user device 308, and/or other entities.

Figure 4:
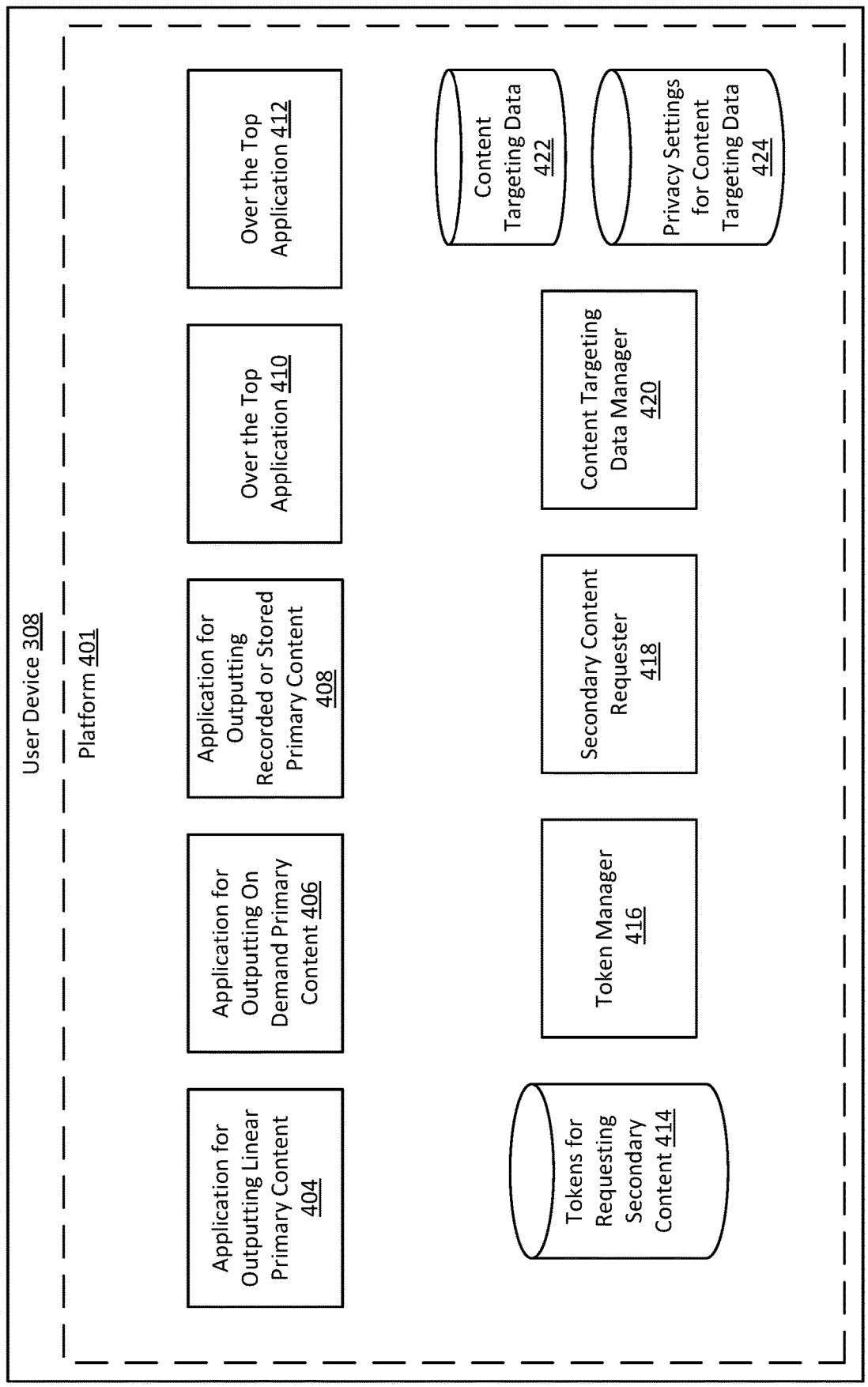
FIG. 4 shows a block diagram showing an example of a user device.

FIG. 4 shows a block diagram showing additional details of the user device 308 (e.g., any one of the user devices in the premises 102a, the mobile devices 135, the user devices 158, 160, the user device 2306). The user device 308 may comprise a platform 401. The platform 401 may comprise an operating system of the user device 308 and/or one or more software frameworks providing generic functionality to the user device 308.

One or more applications for primary content items may be installed on the platform 401 (e.g., the applications 404, 406, 408, 410, 412). Such applications may be downloaded from the application distribution server 106, the application distribution server 312, or any application distribution server associated with the platform 401. Various applications present in the user device 308 may comprise an application for streaming linear primary content 404, an application for streaming on demand primary content 406, an application for streaming recorded or stored primary content 408, and over the top (OTT) applications 410, 412. The application for streaming linear primary content 404 may be configured to stream linear primary content from various services. A service, for example, may comprise specific content providers, such as entities associated with "cable networks" or "broadcast networks," entities providing real-time streaming and/or download of content, selectable content collections (e.g., "content channels") assigned by a network operator, and/or any other source of content. The application for streaming on demand primary content 406 may be configured to stream primary on demand primary content items from one or more content sources of the network service provider associated with the user device 308 (e.g., from the internal primary content delivery network 108). The application for streaming recorded or stored primary content 408 may be configured to output primary content items recorded and stored by the user device 308 and/or by a set-top box connected to the user device 308. The over the top applications 410, 412 may be configured to stream primary content items from one or more content sources associated with the over the top applications (e.g., from the external primary content delivery network 130, the primary content delivery networks 310). Examples of over the top applications may include applications used to access specific services.

The user device 308 may also include other software components such as a token manager 416, a content targeting data manager 420, and/or a secondary content requester 418. The user device 308 may also include a database 414 for storing content targeting data 422, a database 424 to store privacy settings for the content targeting data, and/or a database 414 for storing tokens for requesting secondary content.

The database 422 for the content targeting data may store content targeting data for one or more users and/or the user device 308. The content targeting data may be used to select targeted secondary content items for the user device 308. The database 422 for the content targeting data may store content targeting data comprising user-specific data for one or more users of the user device 308 and/or device-specific data for the user device 308. The user-specific data may comprise information for a user account associated with the user device 308, a unique user account identifier identifying the user account, personal information, username, password, email address, home address, zip code, credit card information, banking information, a household identifier associated with the user account, a user account for the network service provider providing data communications capabilities to the user device 308, user accounts for various applications present in the user device 308, etc. The user-specific data may also comprise viewing data, demographic data, and/or psychographic data of various users of the user device 308. The user device 308 may be configured to monitor users' content viewing habits and collect information from that monitoring for requesting targeted secondary content items. The device-specific data may include a unique device identifier of the user device 308, Internet Protocol (IP) address of the user device 308, a Media Access Control (MAC) address of the user device 308, a serial number of the user device 308, Original Equipment Manufacturer (OEM) identifier of the user device 308, and/or identifier of the retailer of the user device 308.

The database for the privacy settings 424 may comprise personal configuration settings of the user device 308. The privacy settings may indicate whether the user device 308 prefers receiving targeted secondary content items, and whether any, some, or all of the content targeting data may be shared with secondary content delivery networks for receiving targeted secondary content items.

The applications 404, 406, 408, 410, 412 and/or the second content requester 306 may request content targeting data stored in the database 422. The content targeting data manager 420 may determine if the requested data will be used for operations related to outputting primary content items by the applications 404, 406, 408, 410, 412 (e.g., ZIP code associated with the user account of an application may be needed to initiate the operation of the application), or to request targeted secondary content items. The content targeting data manager 420 may provide the requested data to the applications 404, 406, 408, 410, 412 if the data was requested to output primary content items. However, if the content targeting data manager 420 determines that the requested data will be used to request secondary content items, the content targeting data manager may determine whether any, some, or all of the content targeting data may be shared with secondary content delivery networks for receiving targeted secondary content items based on the privacy settings stored in the database 424. If the privacy settings stored in the database 424 indicate that certain data (e.g., ZIP code, age groups of users, etc.) may be shared for requesting secondary content items, the content targeting data manager 420 may send the requested data to the applications 404, 406, 408, 410, 412 and/or the second content requester 306. Alternatively, if the privacy settings stored in the database 424 indicate that certain data (e.g., content viewing history) may not be shared for requesting secondary content items, the content targeting data manager 420 may decline to send the requested data to the applications 404, 406, 408, 410, 412 and/or the second content requester 306.

The database 414 for tokens may comprise various tokens assigned to the user device 308. The token manager 416 may request tokens for the user device 308 and/or various applications in the user device 308 (e.g., the applications 404, 406, 408, 410, 412) and store the tokens in the database 414. If any one of the tokens in the database 414 expires, the token manager 416 may request a new token to replace the expired token. Additionally, or alternatively, the token manager 416 may request a new token whenever one of the various applications in the user device 308 (e.g., the applications 404, 406, 408, 410, 412) is initiated for streaming primary content items. Additionally, the token manager 416 may receive tokens from the token management system 304 without requesting a new token.

The secondary content requester 418 may receive a request for secondary content items from one of the various applications in the user device 308 (e.g., the applications 404, 406, 408, 410, 412). After receiving the request, the secondary content requester 418 may choose a token from the database 414 and send the token and the request to the secondary content request router 306. The secondary content requester 418 may receive any secondary content items sent by the secondary content request router 306 and forward the received secondary content items to the application from which the secondary content requester received the request for secondary content items.

FIG. 5 shows an example token 502 that may be stored in the database 414 of the user device 308 and used for requesting secondary content items from the secondary content request router 306. The token 502 may comprise various fields that may be used by the user device 308 and/or the token management system 304 to manage the token 502 and by the secondary content request router 306 to request secondary content items for the user device 308. For example, the token 502 may comprise a unique identifier 504 (of a string data type or a universally unique identifier (UUID)) for the token 502 that may be generated by the token management system 304. The token 502 may comprise a rule identifier 506 (of a string data type or a UUID) used to generate the token 502. The rule corresponding to the rule identifier 506 may be stored in the token management system 304. The token 502 may also comprise a token value 510 that may be used by various secondary content delivery networks (e.g., one of the secondary content delivery networks 320, 322, 324, the internal secondary content delivery network 109, the external secondary content delivery network 131, the secondary content delivery network 154 for network service provider A, the secondary content delivery network 156 for network service provider B, the secondary content delivery network 150 for application A, the secondary content delivery network 152 for application B, etc.) to identify the user device 308. The token value 510 may be a string or a UUID comprising thirty-two hexadecimal characters presented in the format 8-4-4-4-12 (e.g., the token value 01234567-89AB-CDEF-GH01-23456789ABCD). The token 502 may be associated with an expiration date and/or time 510 (of the datatype DateTime). The field "last rotated on behalf of" 512 may indicate which entity last requested the token 502 to be updated or generated the token 502 to replace a previously assigned token after expiration or revocation of the previously assigned token. The field "last rotated on behalf of" 512 (of the enum data type) may be set to "not Applicable" if there is no expired or revoked previously assigned token, "network service provider" if the token 502 was generated or rotated based on a request by the network service provider, or "user" if the token 502 was generated based on a request by the user device 308. The token type data field 514 (of the enum data type) may indicate whether the token 502 is for a particular application (e.g., one of the applications 404, 406, 408, 410, 412 and represented by the string "ppid") or can be used by any applications hosted by the user device 308 (e.g., represented by the string "dpid"). Furthermore, if the user device 308 opts out of receiving targeted secondary content items, the token type data field 514 may be tied to a session between the user device 408 and one of the secondary content delivery networks (e.g., represented by the string "sessionid"). If a secondary content delivery network (e.g., one of the secondary content delivery networks 320, 322, 324, the internal secondary content delivery network 109, the external secondary content delivery network 131, the secondary content delivery network 154 for network service provider A, the secondary content delivery network 156 for network service provider B, the secondary content delivery network 150 for application A, the secondary content delivery network 152 for application B, etc.) and/or the secondary content request router 306 receives a token of the token type "sessionid," the token type data field 514 may indicate to the secondary content delivery network and/or the secondary content request router 306 that the user device associated with the token has opted out of receiving targeted secondary content items. The token 502 may also comprise an application identifier 518 for an application (e.g., one of the applications 404, 406, 408, 410, 412) present in the user device 308 for which the token 502 was generated. The token 502 may also comprise a device identifier 520 for the user device 308 for which the token 502 was generated, a user account identifier 522 for the user account associated with the user device 308, and a network service provider identifier 524 for the network service provider associated with the user device 308. The token 502 may also comprise a Boolean data field "targeted secondary content?" 526, which may indicate whether the user device 308 or one or more users of the user device 308 have opted out of receiving secondary content items or permitted receiving targeted secondary content items. The token 502 may comprise additional data, such as the date and time the token 502 was created, and/or other data.

Figure 6:
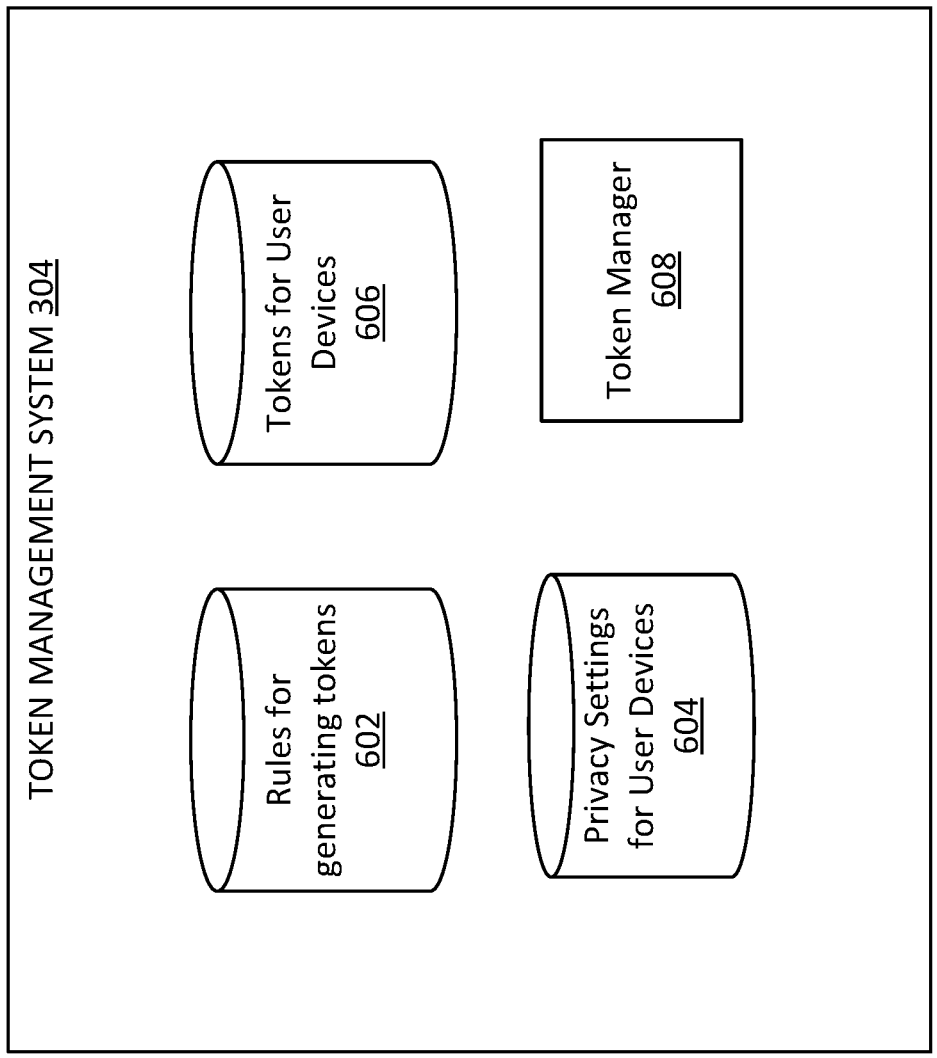
FIG. 6 shows a block diagram showing an example of a token management system.

FIG. 6 shows a block diagram showing additional details of the token management system 304. The token management system 304 may comprise various software components, such as the token manager 608 that may create new tokens, update expired tokens, delete expired tokens, revoke tokens, and/or replace expired or revoked tokens. The token management system 304 may also include a database 602 for storing rules for generating tokens, a database 606 for storing the generated tokens, and/or a database 604 for storing privacy settings of various user devices (e.g., whether users of the user devices have opted in or out of targeted secondary content items). The rules for generating tokens in the database 602 may be provided by one or more network service providers (e.g., the network service provider of the local office 103 in FIG. 1A, the network service providers A and B in FIG. 1B). A rule for a particular network service provider in the database 602 may specify whether to generate one token for all devices of each user account of the network service provider, a token for each device of a user account, and/or a token for each application present in a user device (e.g., the user device 308). A network service provider may also provide a rule that specifies generating session tokens for a user device until an application installed in the user device requests a token.

FIG. 7 shows an example rule 732 stored in the database 602 storing rules for generating tokens. The rule 732 may comprise various fields that may be used by the token management system 304 to create and/or manage tokens. For example, the rule 732 may comprise a unique identifier 734 (of a string data type or a UUID) for the rule 732. The rule 732 may comprise a network service provider identifier 744 (of the string data type) for the network service provider that provided the rule 734. When the token manager 608 receives a request to create a new token for a user device associated with a particular network service provider, the token manager 608 may select one or more rules from the database 602 with a network service provider identifier 744 that indicates the particular network service provider. A "default" data field 736 (of Boolean data type) may indicate whether the rule 732 is the default rule of the network service provider with the network service provider identifier 744. A network service provider may want the token manager 608 to generate a single token for a user device so that all applications installed in the user device may use the same token. There may be a single default rule for such a network service provider stored in the database 602. Also, or alternatively, the network service provider may want the token manager 608 to generate a token for each application in the user device. In that case, multiple rules may be stored for the network service provider, such as a rule for each application which may be identified by an application identifier 742 data field of the rule 732. Additionally, a default rule for the network service provider may be used when information about the application requesting the token is not available. The rule 732 may be used to generate tokens of a lifespan as indicated in the expiration data field 738 (of the DateTime data type). The rules may also indicate what type of token to generate in the token type data field 740. For example, the token type data field 740 (of the enum data type) may indicate whether to generate a token 502 for the particular application requesting the token (represented by the string "ppid") or a device where all the applications in the user device 308 use the same token (e.g., represented by the string "dpid"). Furthermore, the token type data field 740 may generate a token with the token type "sessionid" such that user devices and/or applications using such tokens will be opted out of receiving targeted secondary content items by default. The rule 732 may comprise additional data fields, such as the date and time the rule 732 was created, the date and time the rule 732 was last updated, and/or other data.

Referring back to FIG. 6, the tokens generated for various user devices (e.g., the user device 308, any one of the user devices in the premises 102, the mobile devices 135, the user devices 158, 160, user device 2306) may be stored in the database 606 configured to store tokens of the user devices. The tokens in the database 606 may be stored token objects such as the token object 502 in FIG. 5.

The token manager 608 may be configured to monitor the tokens in the database 606 to identify any expired tokens, and update the expired tokens by generating a new expiration date for the tokens. The updated tokens may be sent to the user devices associated with the tokens (e.g., devices indicated in the device identifier data fields 522 of the expired tokens). Additionally, or alternatively, the token manager 608 may remove the expired tokens from the database 606, generate new tokens, and send the new tokens to the user devices. Furthermore, the token manager 608 may receive one or more criteria from a network service provider (e.g., criteria indicating all tokens comprising the identifier of the network service provider in the network service provider data fields 524 of the tokens, criteria indicating all tokens comprising the identifier of the network service provider in the network service provider data fields 524 of the tokens and an identifier of a certain application in the application identifier data fields 520, etc.), and remove tokens that satisfy the criteria from the database 606. The token manager 608 may generate new tokens to replace the tokens that satisfied the criteria and send the new tokens to corresponding devices (e.g., devices indicated in the device identifier data fields 522).

Figure 8:
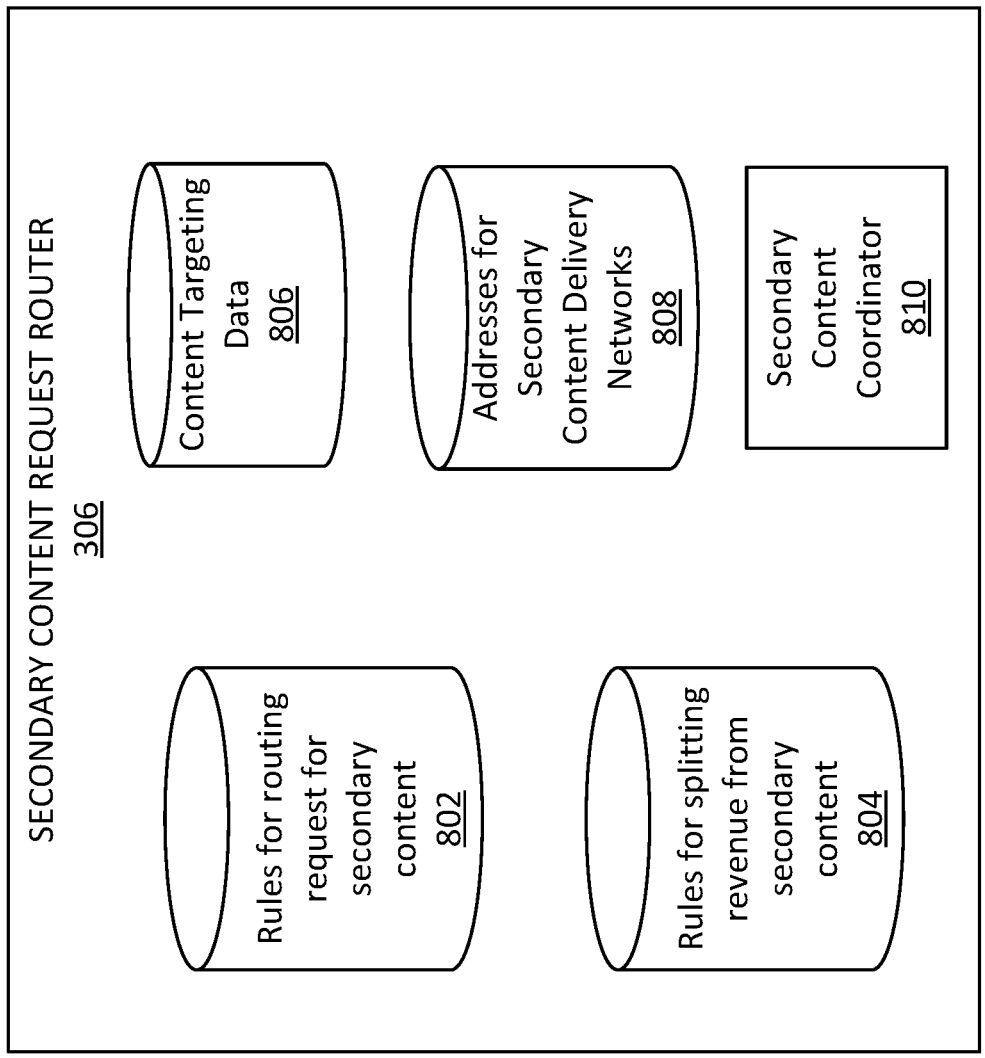
FIG. 8 shows a block diagram showing an example of a secondary content request router.

FIG. 8 shows a block diagram showing additional details of the secondary content request router 306. The secondary content request router 306 may comprise a software component, such as a secondary content coordinator 810. The secondary content request router 306 may also include a database 802 that stores rules for routing requests for secondary content items to one of various secondary content delivery networks (e.g., one of the secondary content delivery networks 320, 322, 324, the internal secondary content delivery network 109, the external secondary content delivery network 131, the secondary content delivery network 154 for network service provider A, the secondary content delivery network 156 for network service provider B, the secondary content delivery network 150 for application A, the secondary content delivery network 152 for application B, etc.). The rules for routing the requests for secondary content items in the database 802 may be provided by one or more network service providers (e.g., the network service provider of the local office 103 in FIG. 1A, the network service providers A and B in FIG. 1B) associated with user devices (e.g., any one of the user devices in the premises 102, the mobile devices 135, the user devices 158, 160, the user device 2306) and/or different applications (e.g., applications A and B in FIG. 1B, the applications 404, 406, 408, 410, 412 in the user device 308) installed in the user devices to different networks. Addresses (e.g., Internal Protocol (IP) address, Media Access Control (MAC) address) for the various secondary content delivery networks (e.g., one of the secondary content delivery networks 320, 322, 324, the internal secondary content delivery network 109, the external secondary content delivery network 131, the secondary content delivery network 154 for network service provider A, the secondary content delivery network 156 for network service provider B, the secondary content delivery network 150 for application A, the secondary content delivery network 152 for application B, etc.) may be stored in the database 808.

The secondary content request router 306 may also include a database 804 that stores rules for dividing the revenue gained by outputting the secondary contents to the user devices among different recipients of the revenue. The recipients may comprise one or more of the network service providers, entities (e.g., companies) providing and/or otherwise associated with various applications installed in the user devices, entities providing and/or otherwise associated with external primary or secondary content delivery networks, any manufacturer and/or retailer of the user devices, etc. The secondary content request router 306 may also include a database 806 for storing content targeting data for user devices and/or users of the user devices. The content targeting data stored in the database 806 for a user and/or a user device may be forwarded to a secondary content delivery network to select targeted secondary content items for output at the user device if the user has opted for receiving targeted secondary content items. The database 806 for storing the content targeting data may store user-specific data of the users and/or device-specific data for the user devices.

When the secondary content coordinator 810 receives a token and/or a request for secondary content items from a user device (e.g., the user device 308, any one of the user devices in the premises 102, the mobile devices 135, the user devices 158, 160, the user device 2306), the secondary content coordinator 810 may also receive an identifier of the network service provider of the user device, an identifier for the application in the user device requesting the secondary content item, an identifier for the platform (e.g., operating system) installed in the user device, and/or an identifier of the user device. The secondary content coordinator 810 may use the received identifiers of the network service provider, application, platform, and/or the user device to select a rule from the database 802. After selecting a rule from the database 802, the secondary content coordinator 810 may use the rule to select a secondary content delivery network to which the request for the secondary content items will be forwarded. The secondary content coordinator 810 may look up the address of the selected secondary content delivery network from the database 808. After receiving the secondary content items from the selected secondary content delivery network, the secondary content coordinator 810 may forward the received secondary content items to the user device that requested the secondary content items.

Figure 9A:
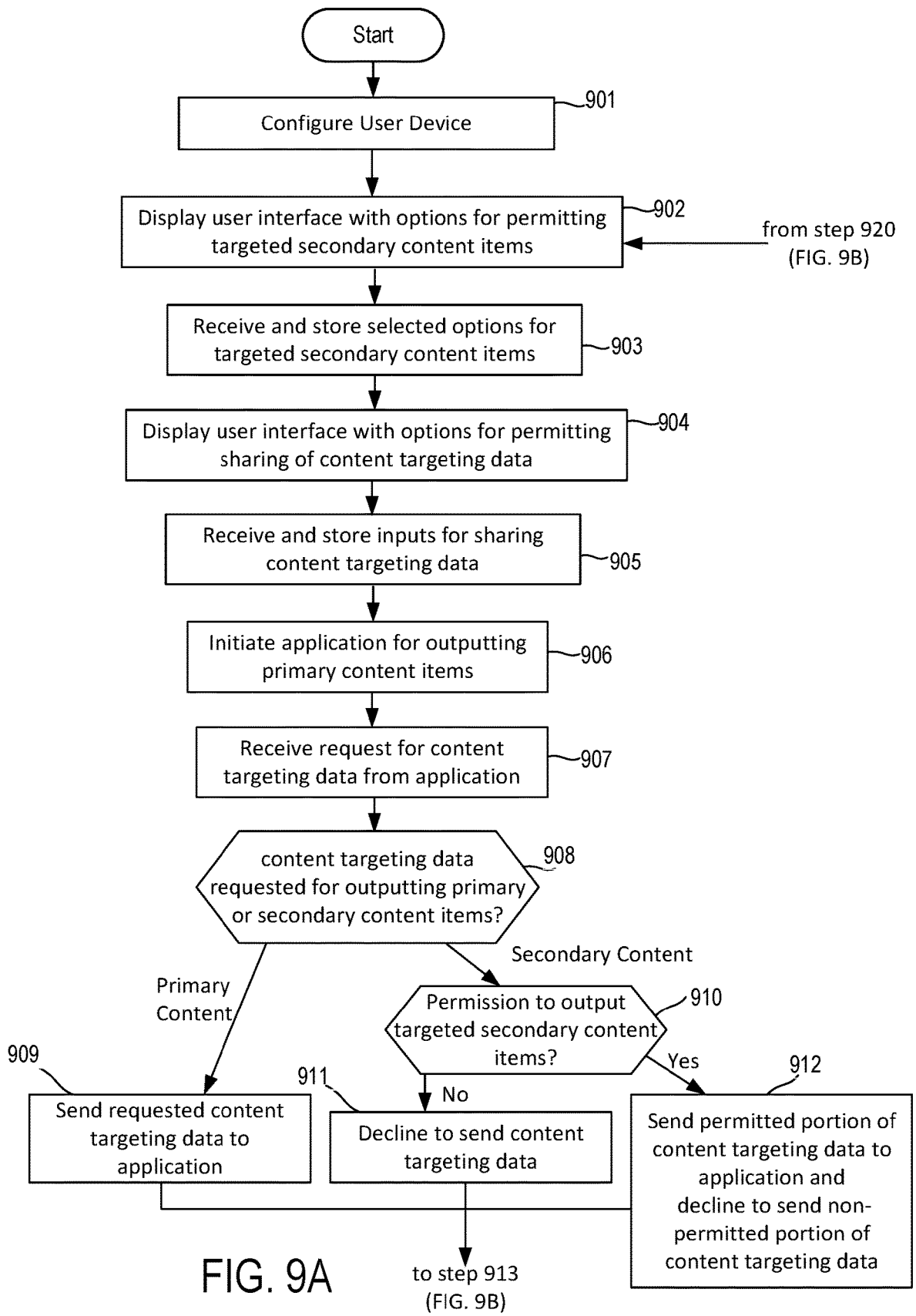
FIGS. 9A and 9B show a flow chart showing steps of an example method for a user device to output primary and secondary content.
Figure 9B:
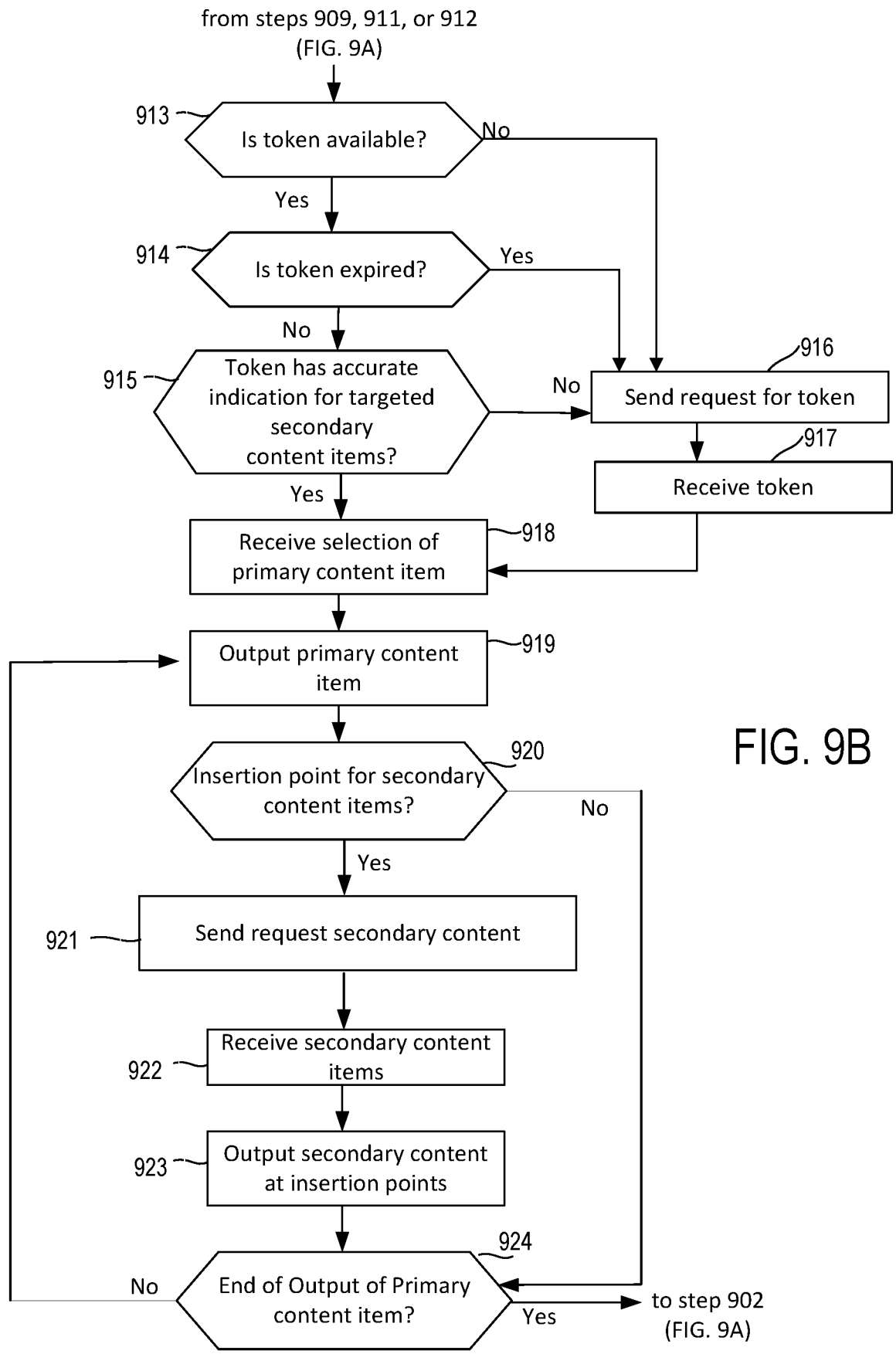

FIGS. 9A and 9B are a flow chart showing an example method for outputting primary and secondary content items by a user device. For convenience, FIGS. 9A and 9B are described by example of performance of the method by the user device 308. However, the method of FIGS. 9A and 9B may also or alternatively be performed by another user device (e.g., any one of the user devices in the premises 102a, the mobile devices 135, the user devices 158, 160, the user device 2306). The steps in FIGS. 9A and 9B may be performed by various software components of the user device 308, such as the applications 404, 406, 408, 410, 412, the token manager 416, the secondary content requester 418, and/or the content targeting data manager 420 in FIG. 4. One, some, or all steps of the method may also or alternatively be performed by one or more other computing devices (e.g., a computing device other than a user device). One, some, or all of the steps may be rearranged or otherwise modified. Steps may be omitted and/or other steps added.

In step 901, the user device 308 may be configured to request, receive, and output primary content items from various primary content delivery networks (e.g., internal primary content delivery networks 108, the external primary content delivery networks 130, primary content delivery networks 310, etc.) and/or secondary content items from various secondary content delivery networks (e.g., one of the secondary content delivery networks 320, 322, 324, the internal secondary content delivery network 109, the external secondary content delivery network 131, the secondary content delivery network 154 for network service provider A, the secondary content delivery network 156 for network service provider B, the secondary content delivery network 150 for application A, the secondary content delivery network 152 for application B, etc.). Configuring the user device 308 to request, receive, and output the secondary content items may comprise downloading a software installation package, installing the software installation package, configuring the user device to communicate with some or all of the elements shown of the secondary content management network 302 in FIG. 3 (e.g., the token management system 304 and the secondary content request router 306), and downloading and/or creating the database 414 for storing tokens for requesting secondary content items, the database 422 for storing content targeting data, the database 424 for storing privacy settings for the content targeting data, and any of the other data described herein. The database 422 for storing content targeting data may comprise user-specific data, such as information for a user account associated with the user device, a unique user account identifier identifying the user account, personal information, username, password, email address, home address, zip code, credit card information, banking information, a household identifier associated with the user account, etc. The content targeting data may also comprise viewing data, demographic data, and/or psychographic data of various users of the user device 308. The user device 308 may be configured for monitoring content viewing habits of users and collecting information from that monitoring for requested targeted secondary content items. The device-specific data may include a unique device identifier of the user device 308, Internet Protocol address of the user device 308, serial number of the user device 308, Original Equipment Manufacturer (OEM) identifier of the user device 308, and/or identifier of the retailer of the user device 308.

Configuring the user device 308 to request, receive, and output the primary content items may comprise communicating with an application distribution server (e.g., the application distribution server 312 in FIG. 3, the application distribution server 106 in FIG. 1A, or any other application distribution server external to the local office 103 in FIG. 1A) to download software installation packages for one or more applications (e.g., the applications 404, 406, 408, 410, 412), installing the software installation packages, configuring the applications to communicate with the primary content delivery networks and some or all of the other elements of the user device 308 in FIG. 4 (e.g., the token manager 416, the secondary content requester 418, the content targeting data manager 420, the database 414 for storing tokens for requesting secondary content items, the database 422 for storing content targeting data, and/or the database 424 for storing privacy settings for the content targeting data). Additionally, some of the applications may be installed in the user device 308 (e.g., the application 404 for streaming linear primary content items, the application 406 for streaming on demand primary content items, and/or the application 408 for outputting recorded or stored primary content items) before the user device 308 was sold or provided to a user.

The user device 308 may be further configured to monitor content viewing habits and/or behaviors of one or more users of the user device 308 and/or other devices (e.g., any of the devices 123-127) and collect information from that monitoring for use by a secondary content request router (e.g., the secondary content request router 306) to request targeted secondary content items. The information about the content viewing habits and/or behaviors of the users may comprise viewing data indicating primary content viewing history of the users, frequently viewed genres of primary content items by the users, viewing times associated with the different primary content items and/or genres, and/or other primary content viewing characteristics. For example, the viewing data for a user may show that the user likes watching soap operas on weekdays, but crime series on weekends. The viewing data may comprise viewing history of various applications in the user device. The viewing data may also or alternatively be based on the most frequently used applications. The user device 308 may send the information about the content viewing habits and/or behaviors of the users to the user management server 318, and/or store the information in the database 422 for storing content targeting data.

The user device 308 may also be configured to determine demographic and/or psychographic data associated with the users. The demographic data associated with the users may comprise data indicating one or more of age, gender, sexual orientation, race, marital status, number and/ages of children, occupation, income, education level, political affiliation, religious affiliation, nationality, and/or any other characteristics. The demographic data for the user may be determined, e.g., based on a ZIP code, a geographic location, and/or any other data associated with that user and/or other users. The psychographic data associated with the users may comprise personal preferences, opinions on certain products, interests, activities, lifestyles, subject matter expertise, and/or other characteristics of the users. The demographic and/or psychographic data associated with the users may be determined from various sources, such as textual input data (e.g., electronic communications submitted by the users, such as social media posts, product reviews, blogs, articles, papers, email messages, text messages, etc.), clickstream data (e.g., information related to what webpages a user visits, how long he/she remains on a web page, hyperlinks selected, and generally, any information related to a succession of selections made by the user via mouse clicks and/or touch screen selections), past-purchase information (e.g., data indicating a number of purchases completed by a user as well as data identifying the purchased items), survey response data (e.g., responses provided by a user in response to one or more questionnaires), population and housing censuses, and/or education, health, and employment statistics. The user device 308 may send the information about the demographic and/or psychographic data of the users to the user management server 318 and/or store the information in the database 422 for storing content targeting data.

Referring back to FIG. 9A, privacy may be an important concern to a user of the user device 308, and the user may prefer not to receive targeted secondary content items. In step 902, the user may be prompted to indicate whether the user prefers to view targeted secondary content items by displaying one or more user interfaces. The user interfaces may prompt the user to indicate whether the user wants to receive targeted secondary content items when viewing primary content items from all or some of the applications present in the user device 308. FIG. 10A shows an example user interface 1002 that may be displayed to the user. The user interface 1002 in FIG. 10A may ask the user to select the applications in the user device that may be permitted to request and display targeted secondary content items. The user may choose to allow only some of the applications to display targeted secondary content items (e.g., only application B is selected to display targeted secondary content items in FIG. 10A). Alternatively, the user may choose to allow all the applications in the user device to display targeted secondary content items (e.g., by selecting the all applications option in FIG. 10A). At step 903, the user device may receive the one or options selected by the user via the user interface displayed at step 902 and store the options (e.g., in the database 424 for storing privacy settings for content targeting data).

If the user allows some or all of the applications to display targeted secondary content items, at step 904, the user may be prompted to indicate what content targeting data may be shared with secondary content delivery networks (e.g., one of the secondary content delivery networks 320, 322, 324, the internal secondary content delivery network 109, the external secondary content delivery network 131, the secondary content delivery network 154 for network service provider A, the secondary content delivery network 156 for network service provider B, the secondary content delivery network 150 for application A, the secondary content delivery network 152 for application B, etc.) when requesting the secondary content items. FIG. 10B illustrates an example user interface 1004 that may be displayed to the user. The user interface 1104 may provide the user options to share, for purposes of selection of targeted secondary content items, an identifier associated with the user, an identifier associated with the user device, the user's account number with a network service provider, Internet Protocol (IP) address of the user device, address, country, and/or zip code of the user, a Designated Market Area (DMA) of the user, information about the primary content items being displayed by the user device 308, genre of the primary content items being displayed, user rating for the displayed primary content items, primary content viewing data of the user, demographic data of the user, psychographic data of the user, and/or other data. The user device 308 may use selected data in the user interface 1004 with secondary content delivery networks to request targeted secondary content items. At step 905, the user device 308 may receive the one or options selected by the user via the user interface displayed at step 904 and store the options (e.g., in the database 424 for storing privacy settings for content targeting data).

At step 906, the user device 308 may initiate execution of an application installed on the user device (e.g., initiate execution of any one of the applications 404, 406, 408, 410, 412). The application may be initiated after the user device 308 receives user inputs (e.g., via a remote control, mouse clicks, and/or touch screen selections) requesting the user device 308 to initiate the application such that the user device 308 may view primary content items via the application, and/or view primary content items available for viewing via the application.

At step 907, the application, initiated at step 906, may request content targeting data from the content targeting data manager 420 of the user device 308. The content targeting data requested by the application may be available or stored in the database 422 for content targeting data. For example, the application may request, among other content targeting data, the identifier of a user account associated with the user device 308 or the application, an email address, zip code, a unique device identifier of the user device 308, and/or the IP address of the user device 308.

Figure 11:
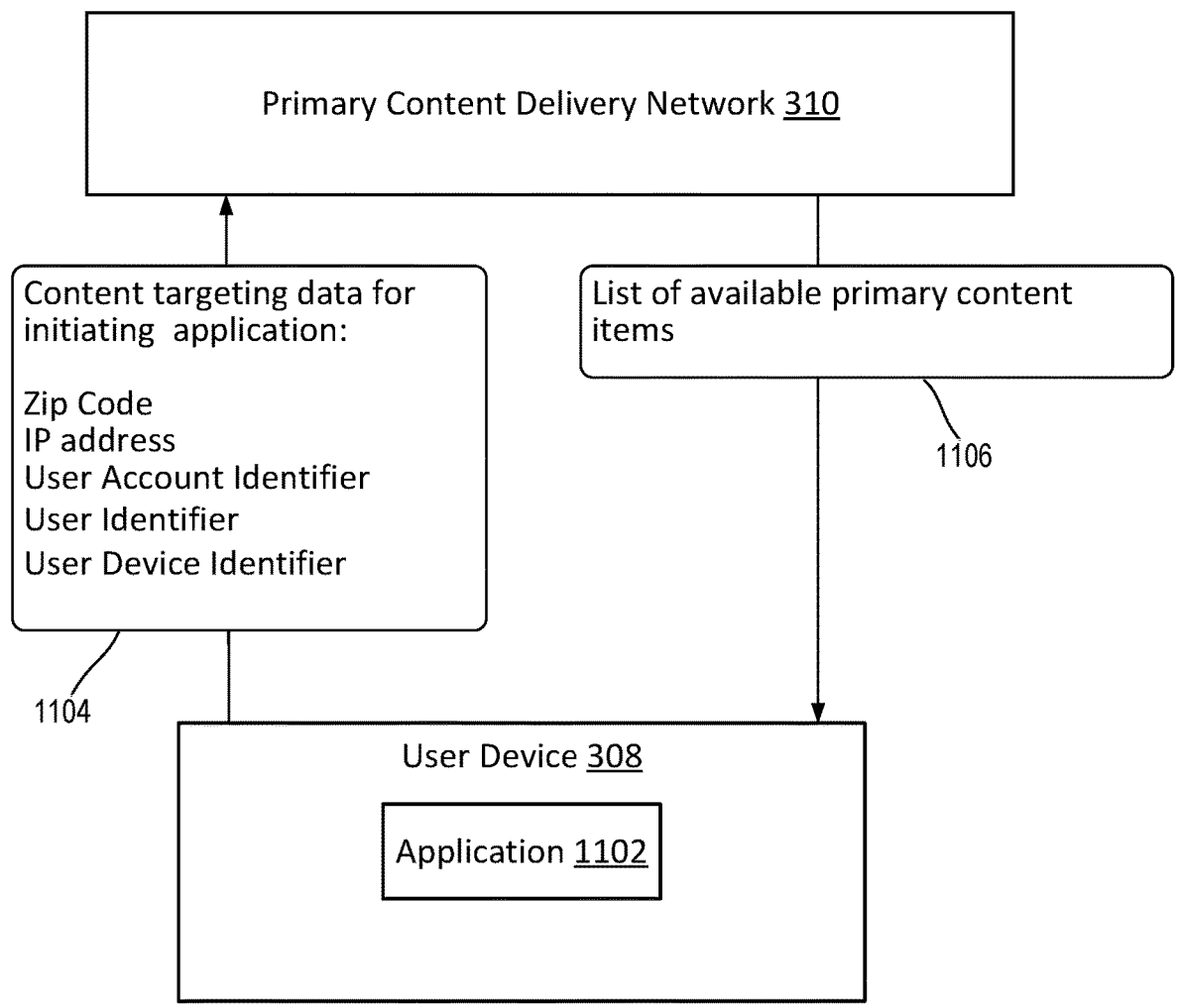
FIG. 11 is a diagram showing example communications and/or data flow between a user device and a primary content delivery network for outputting a list of primary content items.

After receiving the request for the content targeting data from the application, the content targeting data manager 420 of the user device 308 may determine, at step 908, whether the content targeting data requested by the application will be used to select and/or cause the output of primary content items or secondary content items. For example, the content targeting data manager 420 of the user device 308 may determine whether the content targeting data will be used to start execution of the application and/or display available primary content items available for outputting by the application. As shown in FIG. 11, an application (e.g., the application 1102) may provide information 1104 to the primary content delivery network 310 to initiate the application and receive a list of available primary content 1106 that can be displayed via the user device 308. The information 1104 may comprise a user account associated with the application and/or the network service provider of the user device 308 or an email account associated with the user account for the application, an identifier for a user, an identifier for the user device 308, and/or other data. Additionally, the information 1104 may comprise a zip code where the user device 308 is located or IP address of the user device 308 such that information about primary content items available from local services (e.g., local radio stations, local television stations, etc.) may be displayed. The application may also request the IP address of the user device 308 to send, to the primary content delivery network 310 associated with the application, a request for a list of primary content items 1106 (FIG. 11) available for display or a request for the primary content item. If the content targeting data manager 420 determines that the application has requested content targeting data to start execution of the application, display available primary content items available for outputting by the application, and/or cause outputting of a primary content item by the application, at step 909, the content targeting data manager 420 may send the requested content targeting data to the application, and step 913 in FIG. 9B may be performed.

Alternatively, a user of the user device 308 may indicate that the user prefers not to share content viewing habits and/or behaviors, demographic characteristics, and/or psychographic characteristics of the user even if the application is requesting the data to determine a list of primary content items available for outputting by the application to the users (e.g., display a list of primary content items 1106 that are preferred by the users). In such a case, the content targeting data manager may decline to share the content viewing habits and/or behaviors, demographic characteristics, and/or psychographic characteristics of the users with the application.

If the content targeting data manager 420 determines at step 908 that the application requested the content targeting data for requesting secondary content items, step 910 may be performed. At step 910, the content targeting data manager 420 may determine if the user has given permission to the application or the user device 308 to output targeted secondary content items. For example, the content targeting data manager 420 may access the information stored in the database 424 that stored the user inputs from the user interfaces displayed at step 902 to determine whether the application or all of the applications installed on the user device 308 have permission to output targeted secondary content items and/or whether the user device 308 has permission to share the content targeting data for receiving targeted secondary content items. If the content targeting data manager 420 determines that the user device 308 has permission to share the content targeting data, at step 911, the content targeting data manager 420 may decline to send or provide the requested content targeting data to the application, and step 913 (FIG. 9B) may be performed. The content targeting data manager 420 may send a message to the application indicating that the request has been declined.

If the content targeting data manager 420 determines at step 910 that the requesting application or all of the applications installed on the user device have permission to output targeted secondary content items and/or that the user device 308 has permission to share some portions of the requested content targeting data for targeted secondary content items, step 912 may be performed. The content targeting data manager 420 may access the information stored in the database 424 for storing the privacy settings for content targeting data to determine whether some or all of the requested content targeting data may be shared for targeted secondary content items. For example, as shown in FIG. 10B, a user may have given permission to the user device 308 to share the user's ZIP code and/or genre of the primary content item being outputted by the application. However, the user may not have given permission for the user device 308 to share any other content targeting data, such as the primary content viewing habits and/or behaviors, demographic characteristics, and/or psychographic characteristics of the users as shown in FIG. 10B. If the content targeting data manager 420 determines that the user device 308 has permission to share the requested content targeting data (e.g., zip code or primary content item being outputted by the application as shown in FIG. 11B), the content targeting data manager 420 may at step 912 provide the permitted content targeting data. If the content targeting data manager 420 does not have permission to share the content targeting data (e.g., primary content viewing habits and/or behaviors, demographic characteristics, and/or psychographic characteristics of the users as shown in FIG. 10B), the content targeting data manager 420 may decline to send or provide the non-permitted content targeting data to the application or a secondary content delivery network. In addition, the content targeting data manager 420 may send a message to the application indicating that the request has been declined.

Alternatively, at step 912, the content targeting data manager 420 may determine that the application has requested both permitted and non-permitted content targeting data. For example, the application may request both the zip code and demographic characteristics, and the content targeting data manager 420 may decline to send the demographic characteristics as the privacy settings in the database 424 indicate that the demographic characteristics may not be shared for requesting targeted secondary content items. The content targeting data manager 420 may send a message to the application indicating that the request has been partially declined, and only the permitted content targeting data (e.g., the zip code) will be provided. Based on performing step 909, step 911, or step 912, step 913 in FIG. 9B may be performed.

At step 913 of FIG. 9B, the user device 308 may determine whether a token is available for use, by the application initiated in step 906, to request secondary content items. For example, the token manager 416 may access the database 414 that stores tokens for requesting secondary content items, and determine if the database 414 has a token that the application can use. The token manager 416 may determine whether there is a token in the database 414 for the particular application or a token that may be used by any applications installed on the user device 308. If the token manager 416 does not find an available token, the token manager 416 may request a new token at step 916. If the token manager 416 determines that a token is available, step 914 may be performed.

At step 914, the user device 308 may determine whether the available token determined in step 913 has expired. For example, the user device 308 may access a data field of the available token that indicates the life span of the token (e.g., the expiration data field 510 of the token 502) and determine if the life span of the token has expired. If the user device 308 determines that the available token has expired, the user device 308 may request a new token at step 916. If the user device 308 determines in step 914 that the available token has not expired, step 915 may be performed. Additionally, or alternatively, instead of requesting a new token, the user device 308 may send a request to renew an expired token (e.g., update the expiration data field 510 of the token 502).

At step 915, the user device 308 may determine whether the token comprises an accurate indication for whether the user device 308 has permission to display or request targeted secondary content items. For example, the data stored in the database 424 for the privacy settings of the content targeting data may have been updated after the token was generated or last renewed (e.g., the privacy settings may have been updated to opt in or out of receiving targeted secondary content items after the token was generated or last renewed). If the user device 308 determines in step 915 that the token comprises an inaccurate indication of whether the user device 308 has permission to display or request targeted secondary content items, a new token may be requested at step 916. The user device 308 may, as part of step 915, access the information stored in the database 424 for storing the privacy settings of the content targeting data to determine whether the application associated with the token, or all of the applications in the user device, have permission to output targeted secondary content items and check the permission indicated by the Boolean field for "targeted secondary content" data field 526 in the token 502. If the parameter or information in the "targeted secondary content" data field 526 reflects the setting stored in the database 424, the user device 308 may determine that the user device 308 has permission to display or request targeted secondary content items, and that the token has an accurate indication of whether the user device 308 has permission to display or request targeted secondary content items. If the token manager 416 determines in step 915 that the token comprises an accurate indication for whether the user device 308 has permission to display or request targeted secondary content items, step 918 (described below) may be performed.

Figure 12:
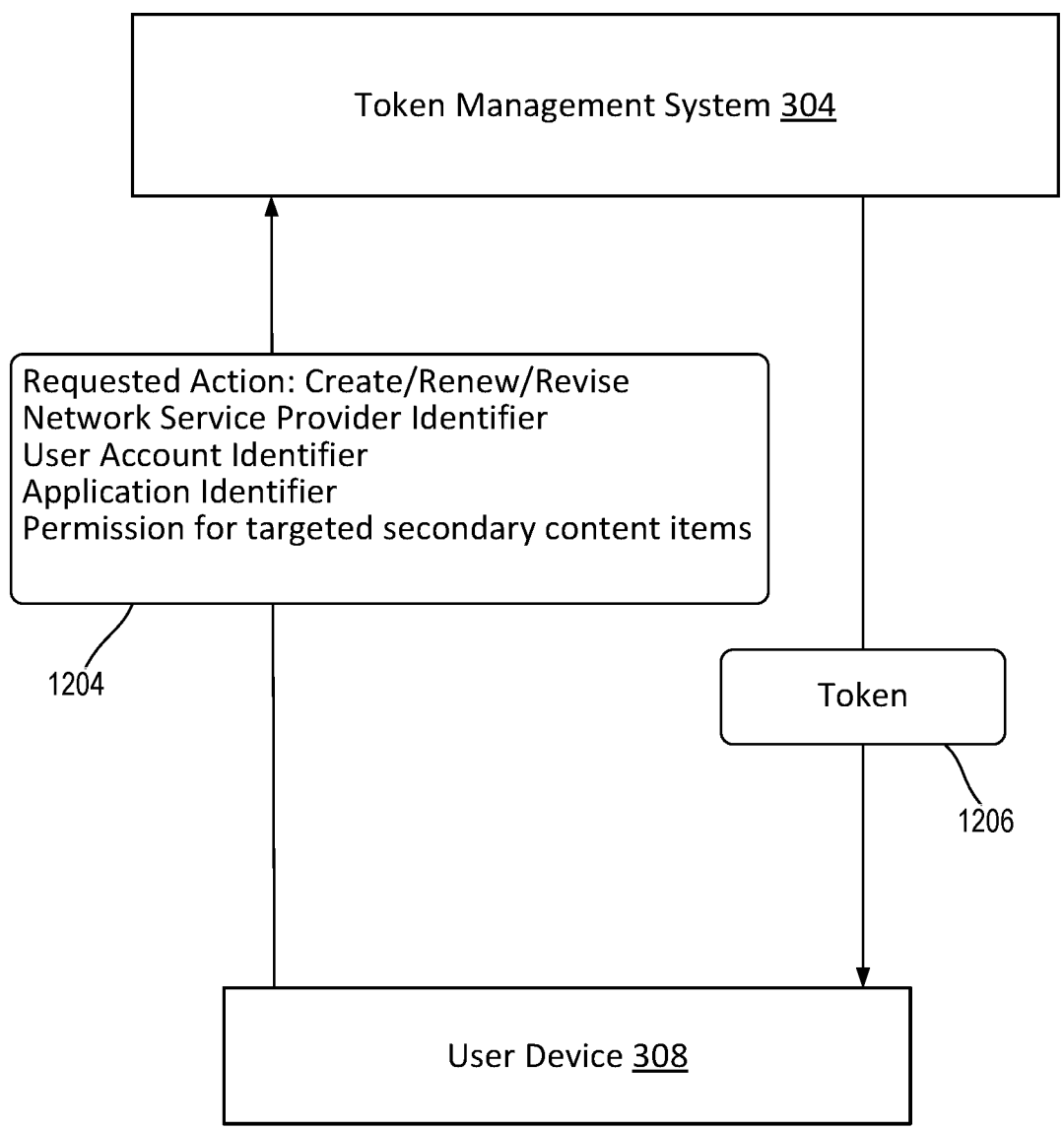
FIG. 12 is a diagram showing example communications and/or data flow between a user device and a token management system.

At step 916, if a new token is needed, the user device 308 may send a request for a new token to the token management system 304 of the secondary content management network 302 (or to a token manager of another secondary content management network). Alternatively, if an expired token was identified at step 914 or if it was determined at step 915 that the token does not comprise an accurate indication for whether the user device 308 has permission to display or request targeted secondary content items, the user device 308 may in step 916 send a request for a revised token to the token management system 304. FIG. 12 shows example communications and/or data flow between the token management system 304 and the user device 308. To request a new token, the user device 308 may send a request 1204 to the token management system 304, where the request 1204 may comprise additional data. The token management system 304 may use the additional data in the request 1204 to generate a new token or revise an old token (e.g., an expired token or a token with wrong privacy indications for targeted secondary content items) and/or may determine a rule (e.g., rule 702) stored in the token management system 304 (e.g., in the database 602 storing rules for generating tokens) to regenerate, renew, or revise a token. The additional data in the request 1204 may indicate an action requested from the token management system 304 (e.g., create a new token or renew or revise a token), an identifier for a network service provider associated with the user device 308, an identifier for a user account for the user device 308 with the network service provider, an application for which the token is requested (e.g., an identifier for any one of the applications 404, 406, 408, 410, 412), and/or an indication of whether the application or the user device 308 has permission to display targeted secondary content items. At step 917, a new token, a renewed token with a new expiration date, or a revised token indicating the accurate permission for targeted secondary content items (e.g., token 1206 in FIG. 12) may be received by the token management system 304 and stored (e.g., stored in the database 414 for storing tokens for requesting secondary content).

Figure 13:
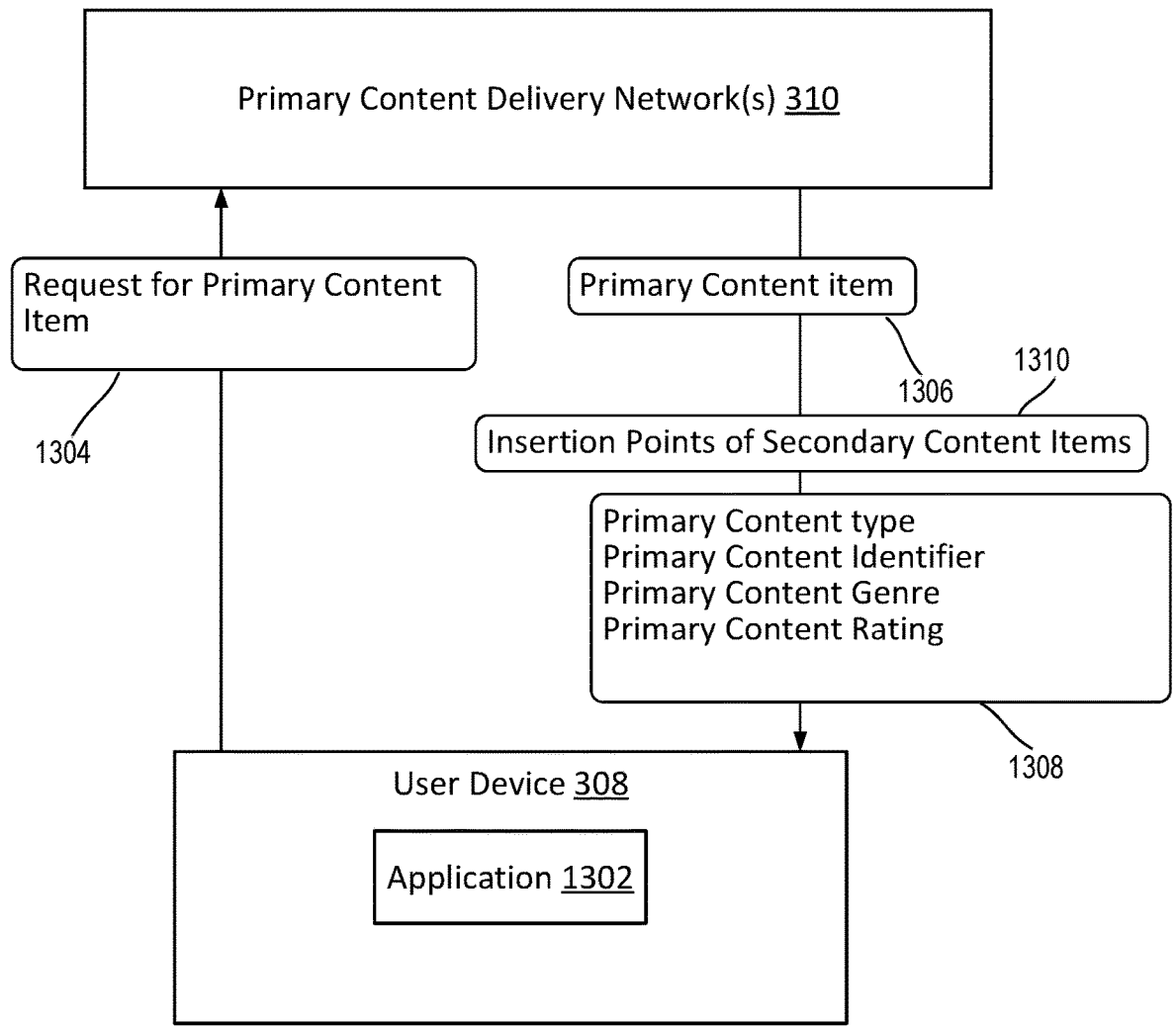
FIG. 13 is a diagram showing example communications and/or data flow between a user device and a primary content delivery network for outputting primary content items.

At step 918, the application initiated at step 906 may display a list of primary content items available for outputting via the application and receive user inputs (e.g., via a remote control, mouse clicks, and/or touch screen selections) for the selection of a primary content item from the list. At step 919, the application may start outputting a primary content item (e.g., a movie, a sporting event, a documentary, or an episode of a series). The application may send a request to a primary content delivery network for the selected primary content item. For example, FIG. 13 shows example communications and/or data flow between the user device 308 hosting an application 1302 and a primary content delivery network (e.g., a primary content delivery network 310). The application 1302 may send a request 1304 for the selected primary content item and receive data packets and/or data streams comprising the selected primary content item 1306. The application 1302 may also receive other data 1308 associated with the selected primary content item. The other data 1308 may comprise an indication of the type of the selected content item (e.g., a movie, an episode of a series, a documentary, etc.), an identifier for the primary content item, a genre associated with the selected primary content item, and/or other data. After receiving the selected primary content, the application may output the primary content item (e.g., display the primary content item via a screen of the user device, and/or display the primary content item via a screen of another device connected wirelessly or through wires to the user device).

At step 920, during or before the output of the primary content item, the application of step 906 may determine whether there are one or more insertion points in the primary content item where secondary content items may be inserted and displayed. For example, as shown in FIG. 13, while receiving the selected primary content item 1306 from the primary content delivery network 310, the application 1302 may also receive indications of various insertion points 1310 in the primary content item 1306 where secondary content items may be inserted and displayed along with the primary content item 1306. For example, for a primary content item of twenty-five minutes in length, one or more secondary content items may be inserted at a twelve-minute point in a run-time of the primary content item 1306 and at a twenty-minute point in the run-time of the primary content item 1306. The insertion points 1310 may also indicate the duration of slots, associated with the insertion points, into which secondary content items may be inserted. For example, the insertion points 1310 for the primary content item 1406 may indicate that two minutes of secondary content items will be inserted beginning at the twelve-minute insertion point, and three minutes of secondary content items may be inserted beginning at the twenty-minute insertion point. If the application determines that there are no insertion points, step 924 may be performed. If the application determines that there are one or more insertion points, step 921 may be performed.

Figure 14:
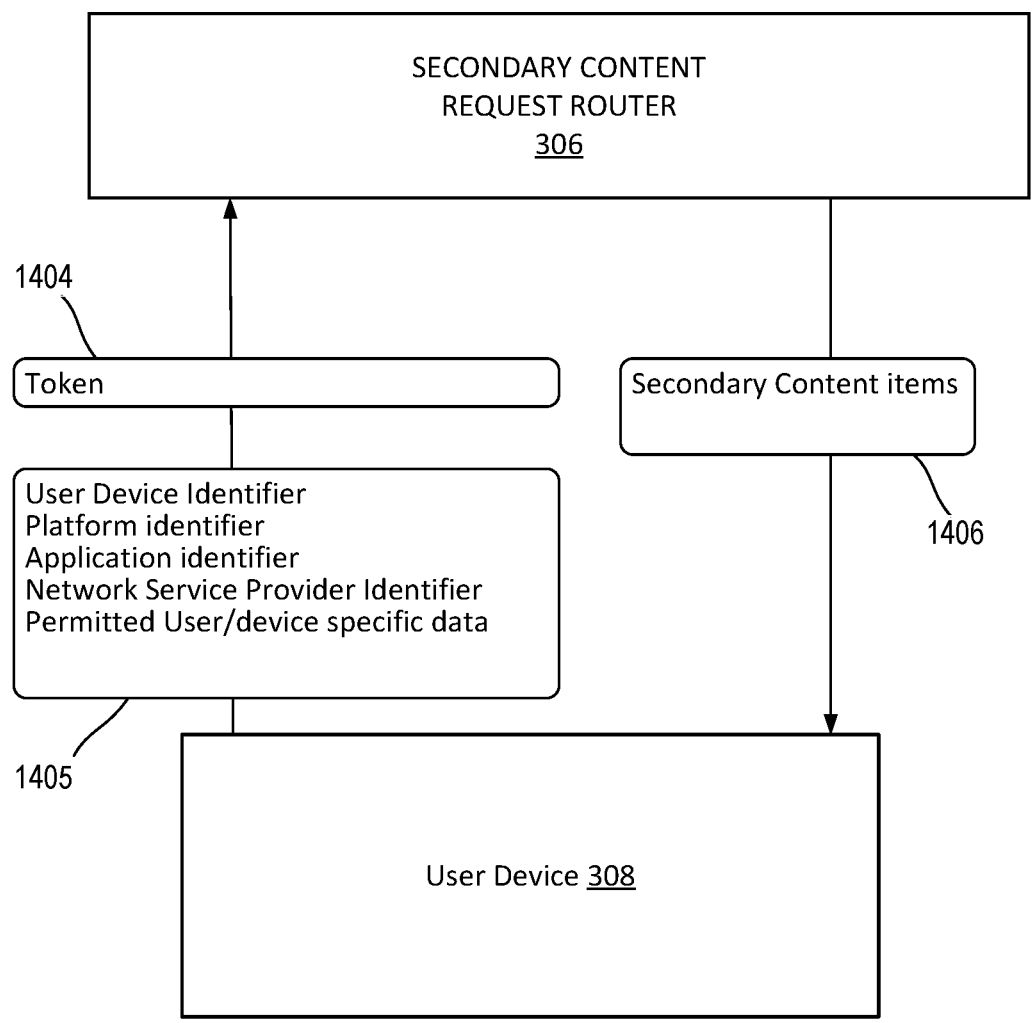
FIG. 14 is a diagram showing example communications and/or data flow between a user device and a secondary content request router.

At step 921, the user device 308 may send, to the secondary content request router 306 (or to a secondary content request router of another secondary content management network), a request for secondary content items. The request may comprise a token. FIG. 14 shows example communications and/or data flow between the user device 308 and the secondary content request router 306. The user device may send a request to the secondary content request router 306 to deliver one or more secondary content items to the user device 308. The request may comprise the token 1404 (e.g., the token identified at step 913 or the token received at step 917). The user device 308 may also send other data 1405 in addition to the token 1404. The secondary content request router 306 may use the other data 1405 to determine a rule for routing the token and the request for secondary content items to one or more secondary content delivery networks. The other data 1405 may comprise an identifier for a network service provider associated with the user device 308, an identifier for the user device 308, an identifier for the application requesting the secondary content items, an identifier for the platform installed in the user device 308, and/or other data. Additionally, if the user device 308 or the application has permission to output secondary content items, the user device 308 may also send the permitted content targeting data determined at step 912 to the secondary content request router 306 such that the secondary content request router 306 may use the permitted content targeting data to deliver targeted secondary content items to the user device 308.

At step 922, the user device 308 may receive one or more secondary content items (e.g., the secondary content items 1406 in FIG. 14) from the secondary content request router 306. The user device may send the received secondary content items to the application displaying the primary content item. The application may output the received secondary content item at step 923 via one or more insertion points during the output of the primary content item. Finally, at step 924, it may be determined whether the output of the primary content item has ended (e.g., if the user stopped watching the primary content item, closed the application, switched to a different screen, etc.). If the output of the primary content item has ended, step 901 (FIG. 9A) may be performed. If the output of the primary content item has not ended, step 919 may be performed, and new insertions points may be determined.

Figure 15A:
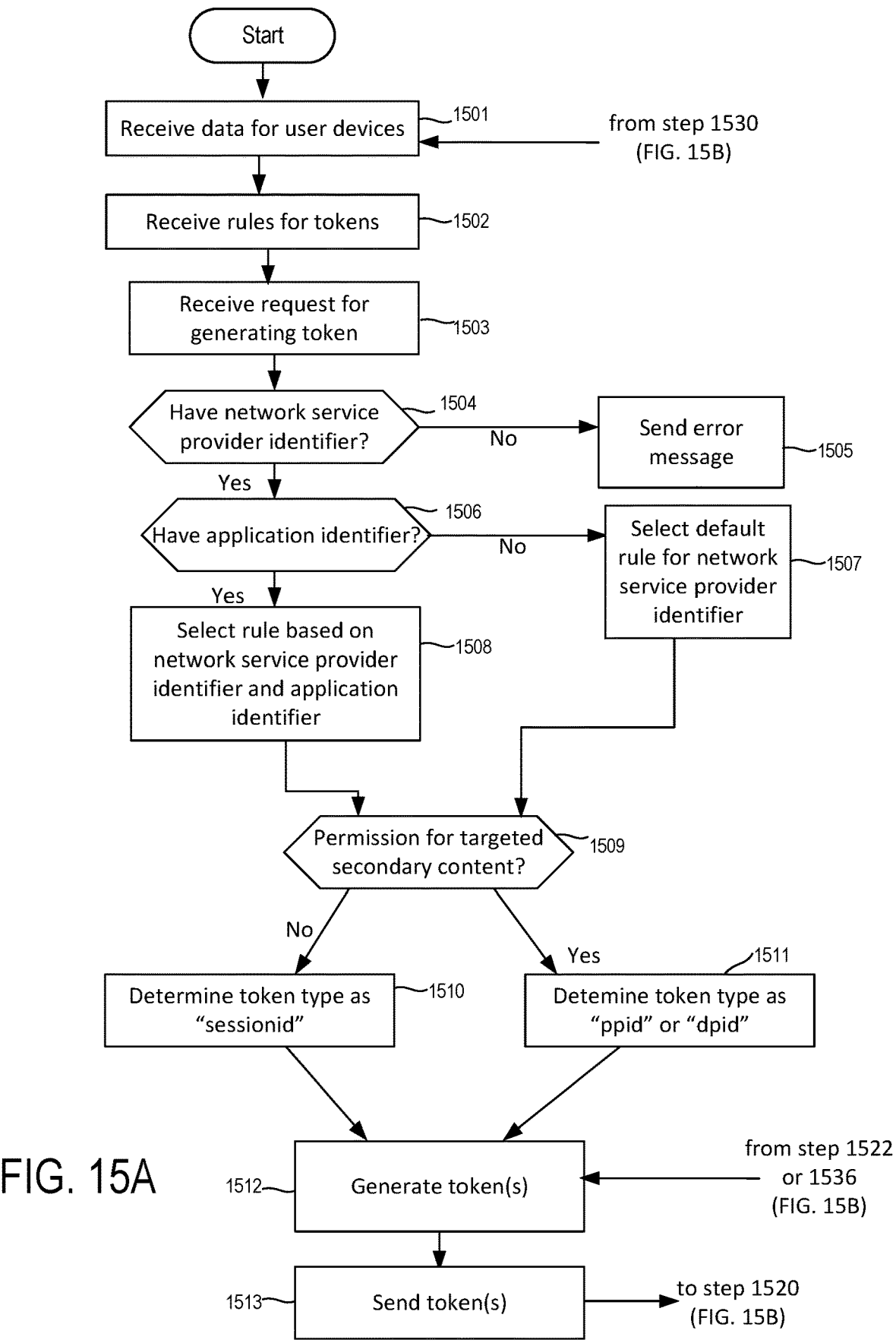
FIGS. 15A and 15B show a flow chart showing steps of an example method for a token management system.
Figure 15B:
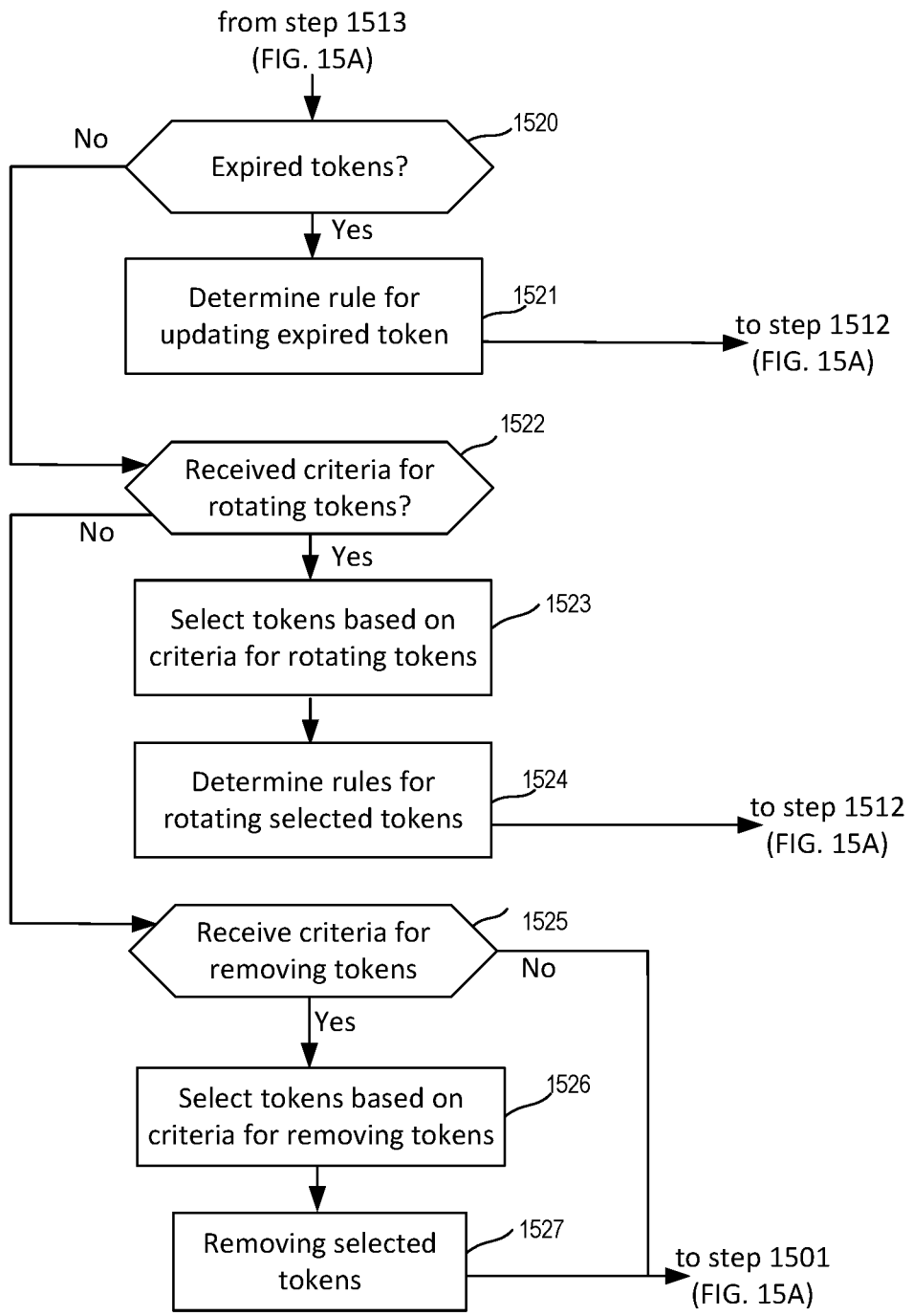

FIGS. 15A and 15B are a flow chart showing an example method for managing tokens by a token management system. For convenience, FIGS. 15A and 15B are described by example of performance of the method by the token management system 304. The steps in FIGS. 15A and 15B may be performed by various software components of the token management system 304, such as the token manager 608 in FIG. 6 and/or other software components. One, some, or all steps of the method may also or alternatively be performed by one or more other computing devices (e.g., a computing device other than a token management system). One, some, or all of the steps may be rearranged or otherwise modified. Steps may be omitted and/or other steps added.

In order to create and manage tokens for user devices, the token management system 304 may be provided with information about the user devices (e.g., the user devices' user accounts for a network service provider, privacy settings for the user devices, or the user account, etc.). In step 1501, the token management system 304 may receive data about the user devices requesting tokens from the token management system 304. The user devices (e.g., the user devices in the premises 102, the mobile device 135, the user device 308, the user devices 158, 160, the user device 2306, etc.) may be communicating with the token management system 304 via networks provided by one network service provider, and the token management system 304 may receive the data about the user devices from a user management server (e.g., the user management server 107, the user management server 318) located in the local office (e.g., the local office 103 of the network service provider) that is also hosting the secondary content management network (e.g., the secondary content management network 110A in FIG. 1A) comprising the token management system 304.

Figure 16:
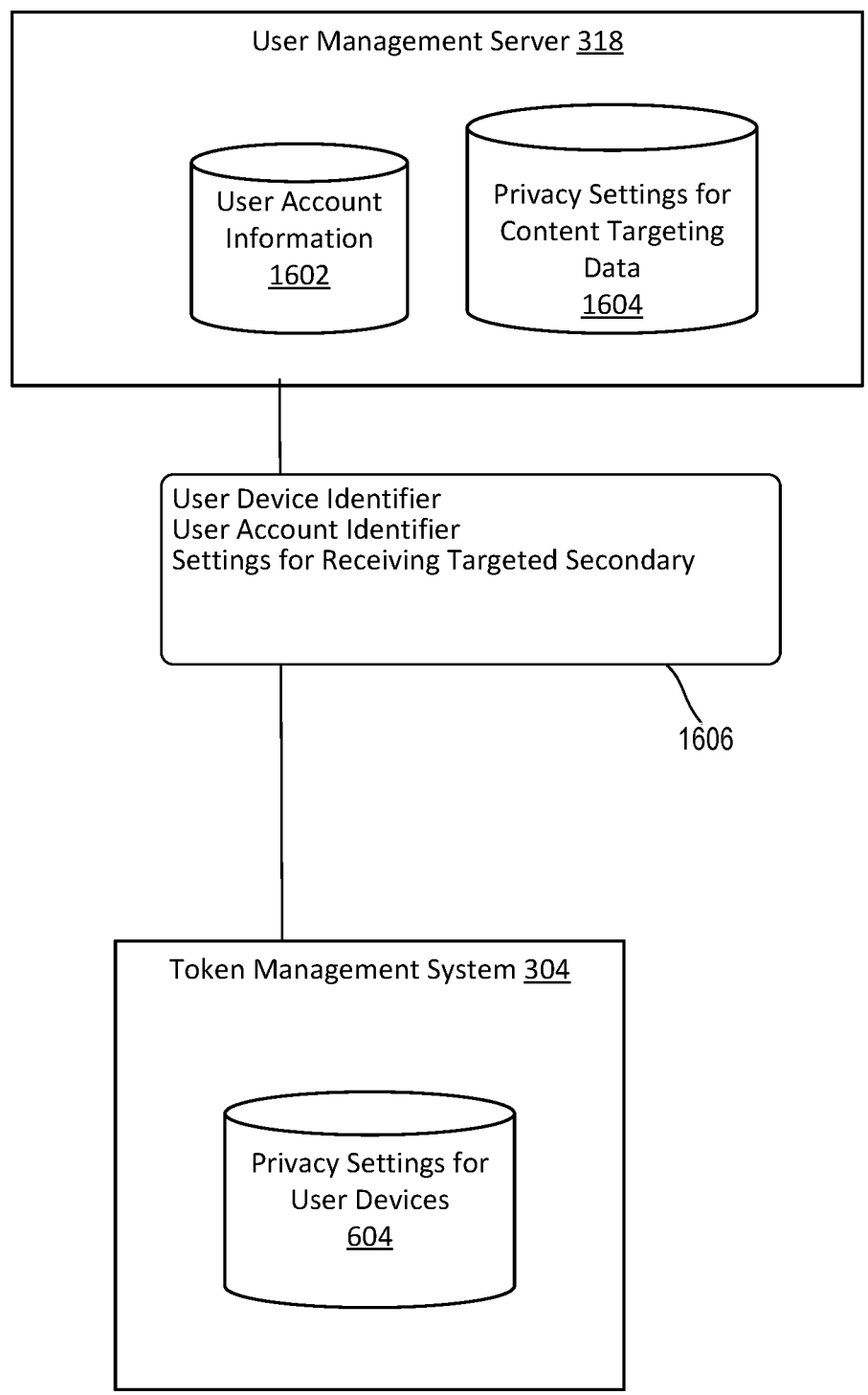
FIG. 16 is a diagram showing example communications and/or data flow between a user management server and a token management system.

FIG. 16 shows example communications and/or data flow between the user management server 318 and the token management system 304. The user management server 318 may comprise various databases, such as the database 1602 for storing user account information and the database 1604 for storing the various privacy settings for the content targeting data of the user devices. The database 1602 may store profile information for each user account, including a unique account identifier identifying the user account, personal information, username, password, email address, home address, credit card information, banking information, etc. The database 1602 may also store user device identifiers of various user devices using the user accounts to access the networks used by the network service provider. The database 1604 may store privacy settings that indicate whether the user devices associated with a user account prefer to receive targeted secondary content items. Information 1606 about the various user devices may be sent once or periodically (e.g., once a day, once a week, once a month) from the user management server 318 to the token management system 304. Information 1606 may comprise unique account identifiers of the user accounts in the network service provider, user device identifiers of the user devices using the user accounts, settings that indicate whether the user devices prefer or have permitted receiving targeted secondary content items, and/or other data. The token management system 304 may store the information 1606 received from the user management server 318 (e.g., the information 1606 may be stored in the database 604 for storing privacy settings of user devices).

Also, or alternatively, a user device (e.g., the user devices in the premises 102, the mobile device 135, the user device 308, the user devices 158, 160, the user device 2306) may be communicating with the token management system 304 (e.g., the token management system of the secondary content management network 110B in FIG. 1B) via networks provided by multiple network service providers (e.g., the network service provider A and B). The token management system 304 may receive information about the user devices from various user management servers of the multiple network service providers (e.g., user management servers of network service providers A and B).

Figure 17A:
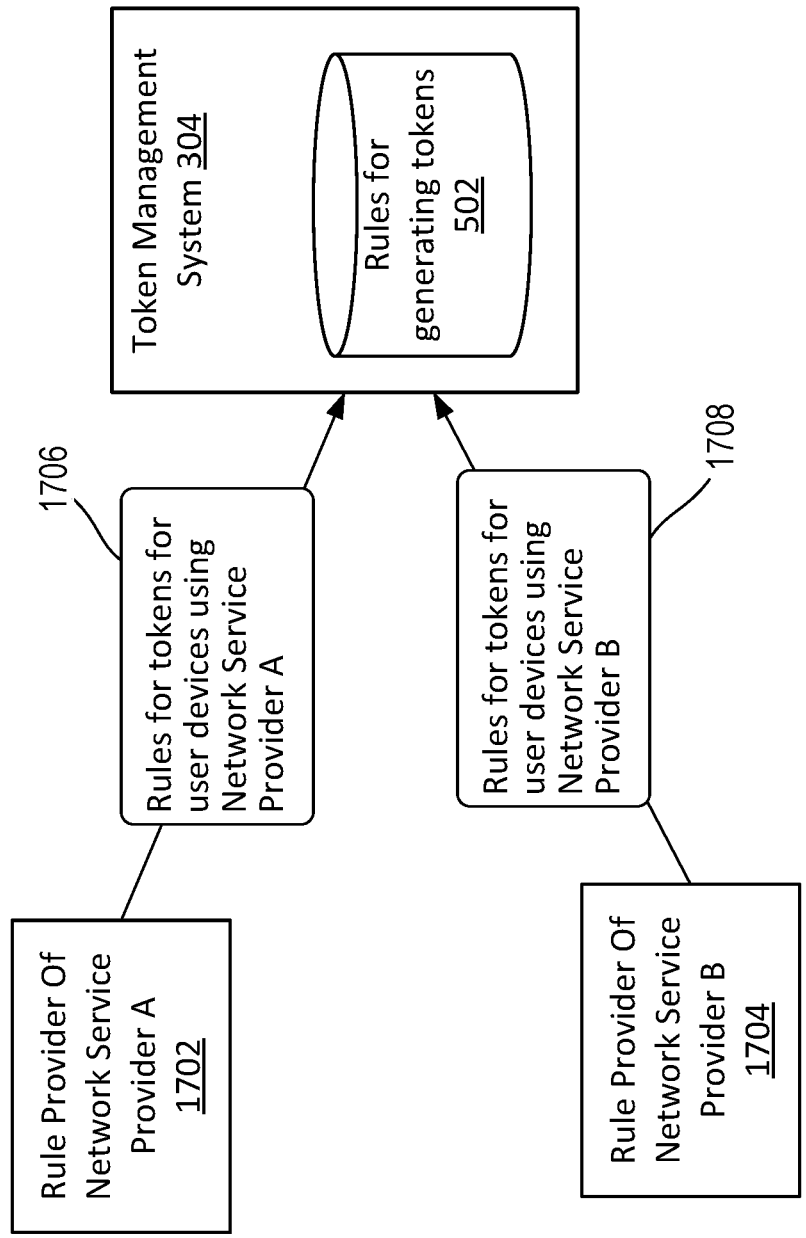
FIG. 17A is a diagram showing example communications and/or data flow between local offices of network service providers and a token management system.

At step 1502, the token management system 304 may receive rules for generating tokens. For example, the token management system 304 may receive rules for generating tokens for user devices associated with a network service provider from that particular network service provider. Alternatively, the token management system 304 may generate tokens for user devices using networks provided by multiple network service providers and may receive rules from each or some of the multiple network service providers. For example, FIG. 17A shows a rule provider (e.g., the rule provider 330) of the network service provider A 1702 providing rules 1706 for generating tokens for user devices associated with the network service provider A and the rule provider of the network service provider B 1704 providing rules 1708 for generating tokens for user devices associated with the network service provider B. The rules 1706 for generating tokens for user devices associated with the network service provider A may be different than the rules 1708 for generating tokens for user devices associated with the network service provider B. The rules 1706 for generating tokens for user devices associated with the network service provider A and/or the rules 1708 for generating tokens for user devices associated with the network service provider B may be provided as rule objects (e.g., the rule object 702 shown in FIG. 7). Also, or alternatively, the rule provider of the network service provider A 1702 and/or the rule provider of the network service provider B 1704 may provide information for the rules to the token management system 304, and the token management system 304 may create one or more rule objects (e.g., the rule object 702). The rules and/or the rule objects may be stored in a database (e.g., the database 502 for storing rules for generating tokens).

Figure 17B:
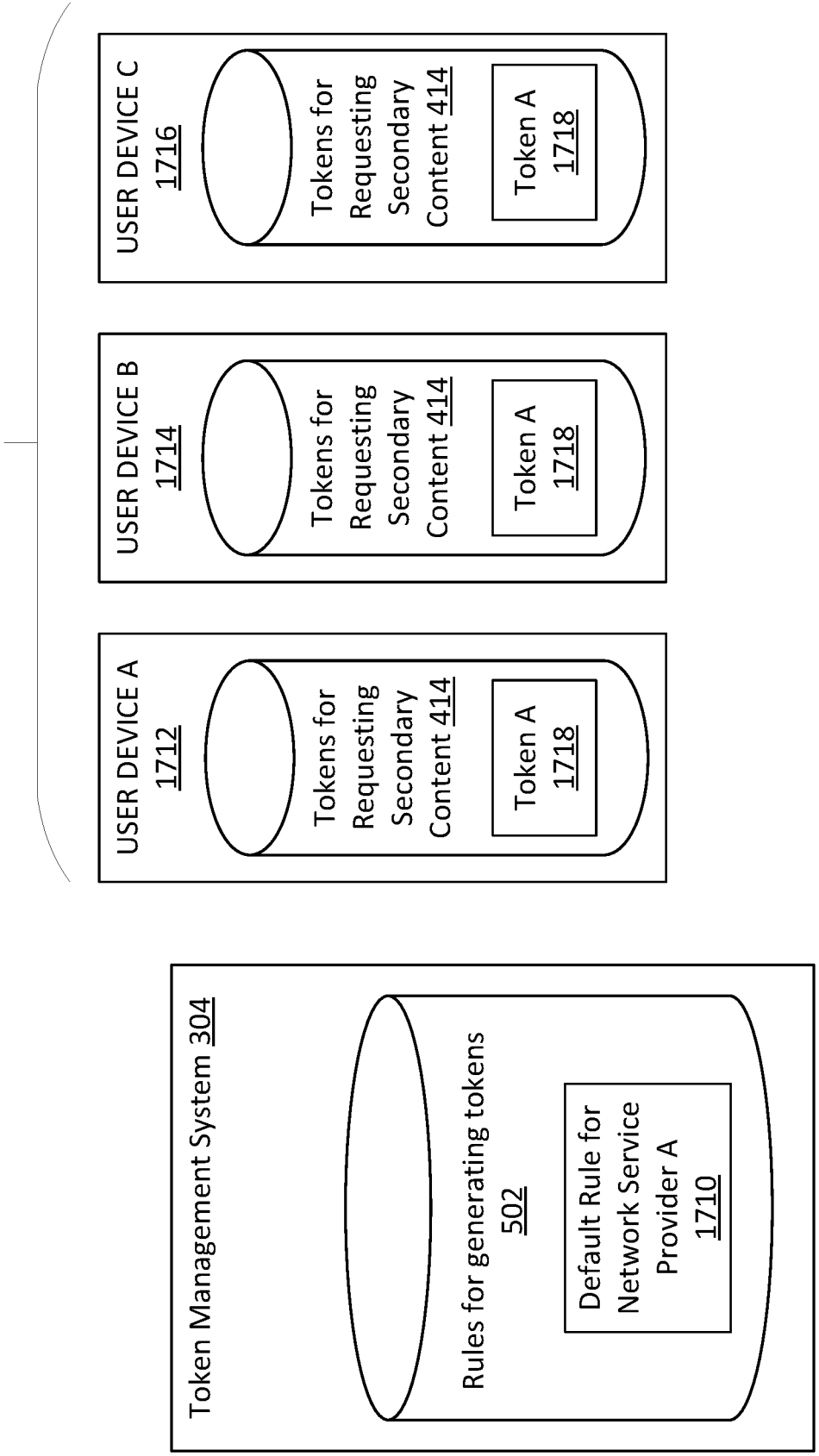

FIGS. 17B, 17C, 17D, and 17E show different rules that may be provided to the token management system 304. For example, as shown in FIG. 17B, the token management system 304 may store a default rule 1710 (e.g., stored in the database 502 for storing rules for generating tokens) for the network service provider A. The default rule 1710 for the network service provider A may indicate generating one token for some or all of multiple user devices (e.g., the user device A 1712, the user device B 1714, and the user device C 1716) associated with a user account (e.g., the user account 1711 of the network service provider A). A token 1718 may be generated based on the default rule 1710 for the network service provider A and that token 1718 may be used by all the devices associated with the user account 1711 to request secondary content items. If the token 1718 is generated based on the request of one of those devices, the token may automatically be forwarded to the others of those devices. If the token management system 304 updates the token 1718, the updated token may be sent to all the user device A 1712, the user device B 1714, and the user device C 1716. If the token management system 304 revokes the token 1718, and creates a new token to replace the revoked token 1718, the token management system 304 may send the new token to the device A 1712, the device B 1714, and the device C 1716.

Figure 17C:
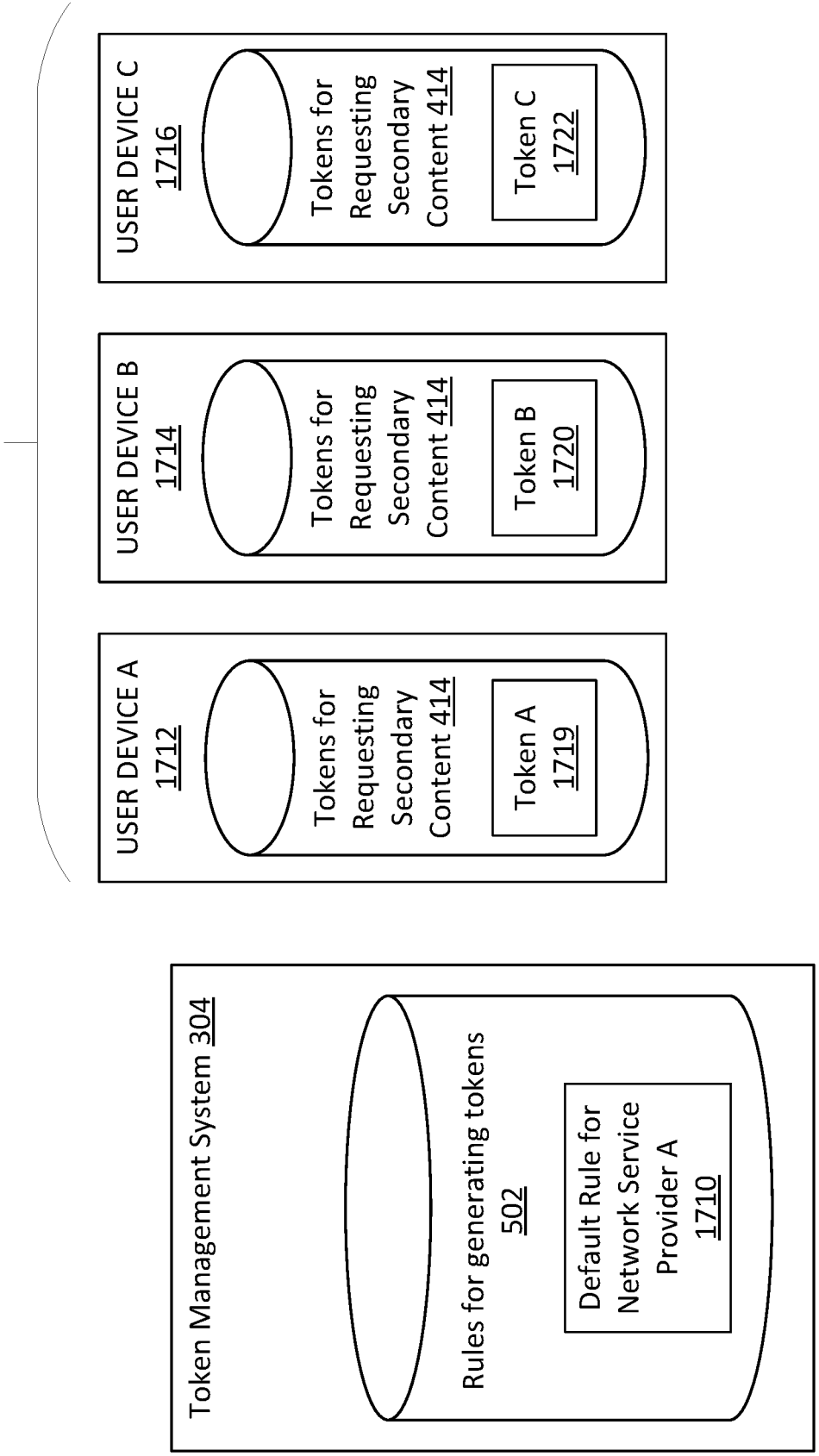

Also, or alternatively, instead of generating one token for all user devices of a user account and as shown in FIG. 17C, the default rule 1710 may indicate generating one token for each user device (e.g., each one of the user device A 1712, the user device B 1714, and the user device C 1716) associated with the user account (e.g., the user account 1711 of the network service provider A). Based on the default rule 1710 for the network service provider A, a token A 1719 may be generated for the user device A 1712, a token B 1720 may be generated for the user device B 1714, and a token C 1722 may be generated for the user device C 1716. The token A 1719 may be generated based on a request from the user device A 1712, the token B 1720 may be generated based on a request from the user device B 1714, and/or the token C 1722 may be generated based on a request from the user device C 1716. If the token management system 304 updates one of those tokens, the updated token may be sent to the corresponding user device. If the token management system 304 revokes one of those tokens, and creates a new token to replace the revoked token, the token management system 304 may send the new token to the corresponding user device associated with the revoked token. The corresponding user device of a token may be identified by a data field (e.g., the device identifier field 502) in the token.

FIG. 17D shows an example in which the network service provider A may indicate to the token management system 304 to generate a token for each application (e.g., the application A 1724, the application B 1726, and the application C 1728) associated with the user device 1740. In the example of FIG. 17D, there may be multiple rules for the network service provider. For example, the token management system may store a rule 1742 for application A, a rule 1744 for application B, and a rule 1746 for application C. The token management system 304 may generate the token 1730 for the application A 1724 based on rule 1742, the token 1732 for the application B 1726 based on the rule 1744, and the token 1734 for the application C 1734 based on the rule 1746. The data field in the tokens 1730, 1732, 1734 indicating an identifier for the applications (e.g., the application identifier data field 518) may differ. Each of the applications (e.g., the application A 1724, the application B 1726, and the application C 1728) may request secondary content items based on the token assigned to the application. If the token management system 304 updates one of those tokens, the updated token may be sent to the user device 1740 to be stored for later use by the corresponding application. If the token management system 304 revokes one of the tokens and creates a new token to replace the revoked token, the token management system 304 may send the new token to the user device 1740 for later use by the corresponding application.

As another example, as shown in FIG. 17E, a single rule 1750 may apply to multiple applications (e.g., the application D 1752 and the application E 1754) in the user device 1740. This is because the application D 1752 and the application E 1754 may belong to the same content providing services, entity (e.g., companies), and/or primary content delivery networks. Therefore, a single token 1756 may be generated for the application D 1752 and the application E 1754 based on the rule 1750.

Referring back to FIG. 15A, at step 1503, the token management system 304 may receive a request to generate a token for a user device (e.g., the user device 308). As shown in FIG. 12, the user device 308 may send additional data 1204 along with the request for a new or updated token from the user device. The additional data 1204 may indicate an action requested from the token management system 304 (e.g., create a new token or renew or revise a token), an identifier for a network service provider associated with the user device (e.g., the network service providers providing networks for the user device to connect to various networks and elements described herein), an identifier for a user account for the user device with the network service provider, an application for which the token is requested (e.g., an identifier for any one of the applications 404, 406, 408, 410, 412), and/or an indication of whether the application or the user device has permission to display targeted secondary content items.

At step 1504, the token management system 304 may determine whether an identifier for the network service provider associated with the user device is available. For example, an identifier of the network service provider may be received from the user device 308 at step 1503 and/or determined based on the information received at step 1501 from the user management servers. If an identifier for the network service provider associated with the user device is not available, the token management system 304 may send an error message to the user device 308 at step 1505. Otherwise, step 1506 may be performed.

At step 1506, the token management system 304 may determine whether an identifier for an application installed on the user device 308 and requesting the token is available. For example, an identifier of the application may be received from the user device 308 at step 1503. If an identifier for the application is not available, at step 1507, the token management system 304 may select a default rule for a network service provider associated with the identifier for the network service provider determined at step 1504. The token management system 304 may select one of the rules received at step 1502 and/or stored in a database of the token management system (e.g., the database 602 for storing rules for generating tokens). For example, multiple rules 732 may be stored by the token management system 304 (e.g., stored in the database 602 for storing rules for generating tokens). The token management system may select a subset of rules 732 for the network service provider for which the data stored in the data fields 744 of the rules (indicating the network service provider associated with the rules) match the identifier of the network service provider determined at step 1505. The default rule for the network service provider may be selected by checking the "default" data fields 736 of the rules in the subset of rules. The default rule for the network service provider may be rule 1710 in FIGS. 17B and 17C. The rules in FIGS. 17B and 17C are not dependent on the application requesting the token and/or outputting primary content items.

If an identifier for the application is available, at step 1508, the token management system 304 may select a rule for the network service provider associated with the identifier for the network service provider determined at step 1504 and an application associated with the application identifier determined at step 1506. For example, the token management system may select a rule 732 for the network service provider for which the data stored in the data field 744 of the selected rule (indicating the network service provider associated with the rule) match the identifier of the network service provider determined at step 1504 and the data field 742 of the rule (indicating the application associated with the rule) match the application identifier determined at step

1506. Any one of the rules 1742, 1744, 1746 in FIG. 17D and the rule 1750 in FIG. 17B, and/or other rules depending on the application requesting the token may be selected.

After selecting a rule at step 1507 or 1508, at step 1509, the token management system 304 may determine whether the user device 308 or the application requesting a new token has been given permission to output targeted secondary content items. For example, the token management system 304 may receive an indication of whether the application or the user device 308 has permission to display targeted secondary content items from the additional data received at step 1503, along with a request for a new or updated token. Additionally, or alternatively, the token management system 304 may determine whether the user device 308 or the application requesting a new or updated token has been given permission or prefers to output targeted secondary content items based on the information received for various user devices at step 1501. If it is determined that the user device 308 or the application requesting a new or updated token has permission to output targeted secondary content items and a default rule is selected at 1507, the token management system 304 may determine to set the token type of the new or updated token as "dpid" (indicating that the token that can be used by any application at step 1511). If it is determined that the user device 308 or the application requesting a new or updated token has permission to output targeted secondary content items and a rule is selected at 1508 based on the application identifier, the token management system 304 may determine to set the token type of the new or updated token as "ppid" (indicating that the token is for a particular application) at step 1511. If it is determined that the user device 308 or the application requesting a new or updated token does not have permission to output targeted secondary content items, the token management system may determine to set the token type of the new or updated token as "sessionid" (indicating that the user device or the application has opted out of receiving targeted secondary content items) at step 1510.

After determining the token type at step 1510 or 1511, at step 1512, the token management system 304 may generate the requested token based on the rule selected in step 1507 or 1508. For example, the token management system 304 may generate a new token, such as the token 502 in FIG. 5. The new token may be assigned a unique identifier (e.g., the unique identifier 502). The new token may comprise a rule identifier (e.g., stored in rule identifier data field 506) indicating the rule used to generate the new token (e.g., the rule selected at step 1507 or the rule selected at step 1508) and/or a token value (e.g., stored in the data field 508) that various secondary content delivery networks may use to identify the user device. An expiration date (e.g., stored in the expiration data field 510) for the new token may be determined based on the rule identified at step 1507 or 1508 (e.g., based on the lifespan indicated in the expiration data field 738 of the rule). The new token may comprise a "last rotated on behalf of" data field (e.g., the "last rotated on behalf of" data field 512) that may be set to "not applicable" if the new token is not replacing any old tokens or "user" if the token was generated based on a request by the user device. The new token may also comprise a token type data field (e.g., the token type data field 514) that may be set to the token type determined at step 1510 or 1511. The application identifier data field 518 of the new token may be set to the application identifier determined at step 1506. The new token may comprise a device identifier (e.g., stored in the device identifier data field 520) that may be set to an identifier of the user device received at step 1503 and/or a network service provider identifier (e.g., the network service provider identifier data field 524) that may be set to the identifier for the network service provider determined at step 1504. The new token may also comprise a Boolean data field "targeted secondary content?" (e.g., the Boolean data field 526), which may indicate whether the user device has opted out of receiving secondary content items or permitted receiving targeted secondary content items. After generating the new token at step 1512, the token management system 304 may send the new token to the user device 308 at step 1513. The token management system may store the new token (e.g., stored in the database 606 for storing tokens for user devices). After that, step 1520 of FIG. 15B may be performed.

At step 1520 in FIG. 15B, the token management system 304 may determine whether one or more tokens have expired. For example, the token management system 304 may check the expiration dates (e.g., the expiration date stored in the expiration data field 510) of tokens stored by the token management system 304 (e.g., tokens stored in the database 606 for storing tokens for user devices) and identify tokens with expiration dates past the current date and time. If one or more expired tokens are not identified at step 1520, step 1522 may be performed. If one or more expired tokens are identified, at step 1521, the token management system 304 may determine the rules used to generate the expired tokens. For example, the rules may be identified based on the rule identifiers (e.g., stored in rule identifier data field 506) in the expired tokens. The rule identifiers in the expired tokens may indicate the rules used to generate the expired tokens (e.g., rules stored in the database 602). Alternatively, a network service provider associated with an expired token (e.g., indicated by the network service provider identifier data field 524 of the expired token) and/or an application associated with the expired token (e.g., indicated by the application identifier data field 518 of the expired token) may be used to select a rule for updating the expired token or generating a new token to replace the expired token. After the rule for updating the expired token is determined at step 1521, step 1512 may be performed to generate a new token to replace the new token or to update the new token. If the expired token is updated, the expiration date (e.g., stored in the expiration data field 510) of the expired data may be updated with a new expiration date. The new expiration date may be based on the lifespan indicated in the expiration data field 738 of the rule determined at step 1521. The new token that replaced the expired token or the updated token with a new expiration date may be forwarded to the device associated with the token (e.g., the device indicated by the device identifier data field 520 of the token).

At step 1522 in FIG. 15B, the token management system 304 may determine whether it received one or more criteria for rotating tokens. Rotating tokens may involve replacing tokens that satisfy the criteria with new tokens. The token management system 304 may receive the one or more criteria from a network service provider and/or primary content delivery networks. The one or more criteria may indicate to the token management system to replace every token associated with the network service provider, replace every token associated with the network service providers and a particular application, replace tokens with token type "sessionid," "dpid," or "ppid," and/or other criteria. If criteria for rotating tokens was not received at step 1522, step 1525 may be performed. If criteria for rotating tokens was received, at step 1523, the token management system 304 may select tokens stored by the token management system 304 (e.g., tokens stored in the database 606 for storing tokens for user devices) that satisfy the received criteria at step 1522. For example, if the criteria indicate to replace every token associated with a particular network service provider, the token management system 304 may select tokens comprising a network service provider identifier (e.g., the network service provider identifier data field 524) that matches with an identifier of the particular network service provider. As another example, if the criteria indicate to replace every token associated with a particular network service provider and a particular application, the token management system 304 may select tokens comprising a network service provider identifier (e.g., the network service provider identifier data field 524) that matches with an identifier of the particular network service provider and an application identifier (e.g., application identifier data field 518) that matches with an identifier of the particular application.

At step 1524, the token management system 304 may determine the rules used to generate the tokens that need to be rotated. For example, the rules may be identified based on the rule identifiers (e.g., stored in rule identifier data field 506) in the tokens selected at step 1523. Also, or alternatively, a network service provider associated with the selected tokens of step 1523 (e.g., indicated by the network service provider identifier data field 524 of the selected tokens) and/or an application associated with the selected tokens of step 1523 (e.g., indicated by the application identifier data field 518 of the selected tokens) may be used to select a rule for updating the selected tokens. After the rules for rotating the selected tokens are determined at step 1524, step 1512 may be performed to generate new tokens to replace the selected tokens of step 1523. The token management system 304 may be forward the new tokens to the user devices associated with the selected tokens of step 1523 (e.g., the user devices indicated by the device identifier data field 520 of the tokens).

At step 1525, the token management system 304 may determine whether it received one or more criteria for removing tokens. The token management system 304 may receive the one or more criteria from a network service provider and/or primary content delivery networks. The one or more criteria for removing the tokens may indicate to the token management system 304 to remove every token associated with the network service provider or remove every token associated with the network service provider and a particular application. If criteria for removing tokens was not received at step 1525, step 1501 of FIG. 15A may be performed. If criteria for removing tokens was received, at step 1526, the token management system 304 may select tokens stored by the token management system 304 (e.g., tokens stored in the database 606 for storing tokens for user devices) that satisfy the received criteria at step 1525. At step 1527, the selected tokens of step 1526 may be removed. Based on performing step 1527, step 1501 of FIG. 15A may be performed.

Figure 18A:
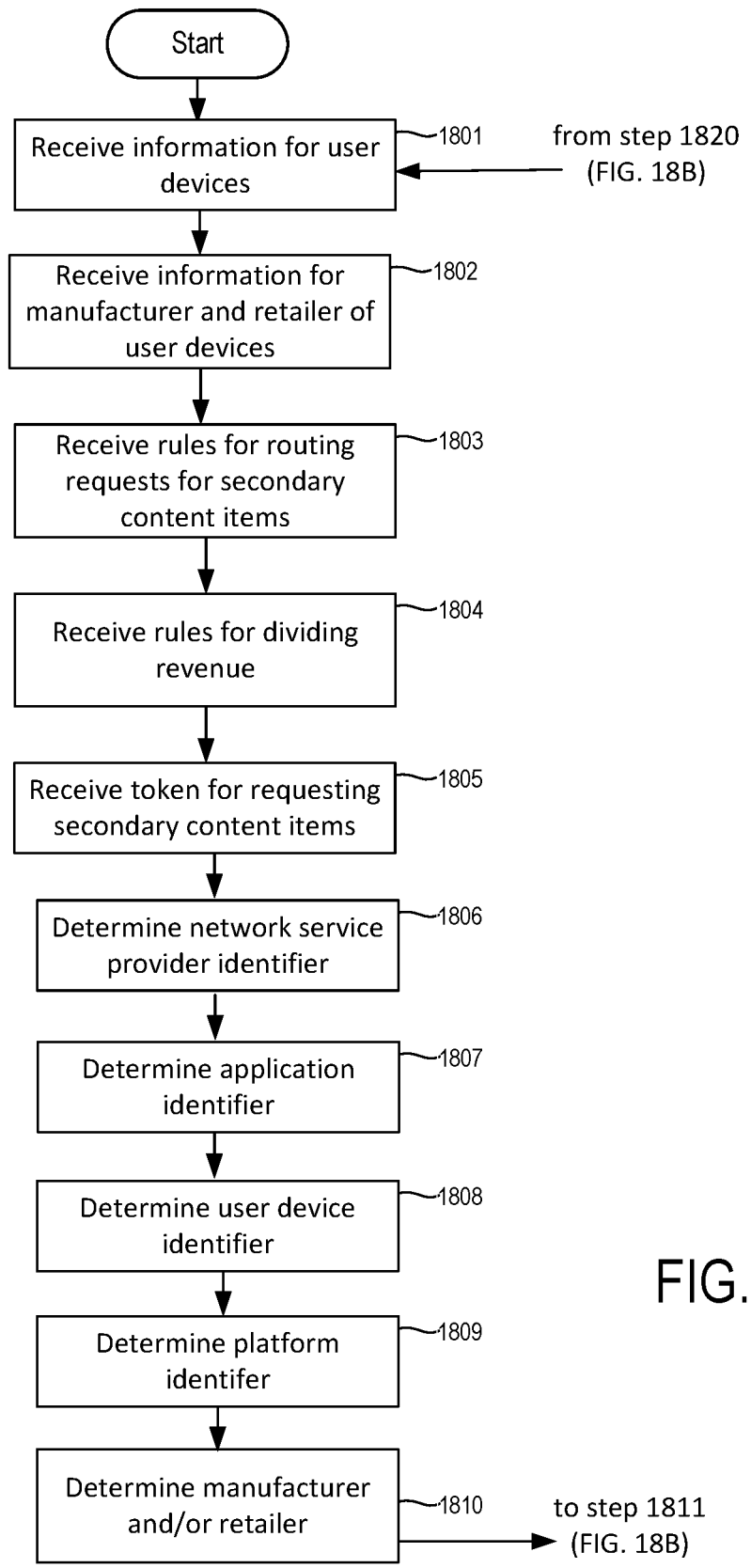
FIGS. 18A and 18B show a flow chart showing steps of an example method for a secondary content request router to provide secondary content to user devices.
Figure 18B:
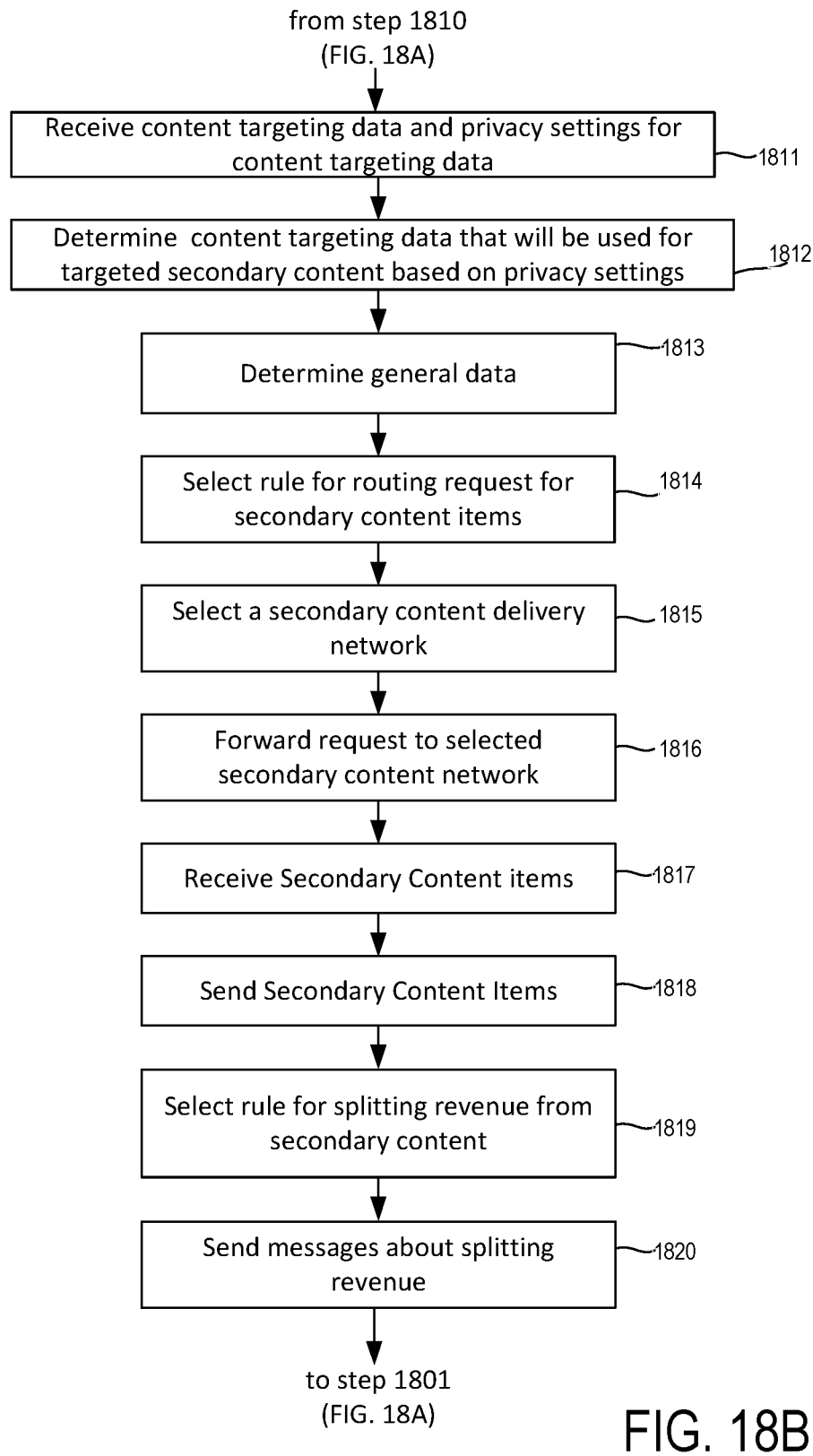

FIGS. 18A and 18B show a flow chart showing an example method for providing secondary content items to a user device (e.g., any one of the user devices in the premises 102, the mobile devices 135, the user devices 158, 160, the user device 308, the user device 2306) by a secondary content request router. For convenience, FIGS. 18A and 18B are described by example of performance of the method by the secondary content request router 306. The steps in FIGS. 18A and 18B may be performed by various software components of the secondary content request router 306, such as the secondary content coordinator 810 in FIG. 8 and/or other software components. One, some, or all steps of the method may also or alternatively be performed by one or more other computing devices. One, some, or all of the steps may be rearranged or otherwise modified. Steps may be omitted and/or other steps added.

In order to provide secondary content items for user devices, the secondary content request router 306 may be provided with information about the user devices, whether the user devices prefer to receive targeted secondary content items, and/or other data. In step 1801, the secondary content request router 306 may receive such information from various sources. For example, the secondary content request router 306 may receive the information from user management servers (e.g., the user management server 107, the user management server 318) of one or more network service providers. The user management servers of a particular network service provider may provide information about the user devices associated with the particular network service provider.

Figure 19:
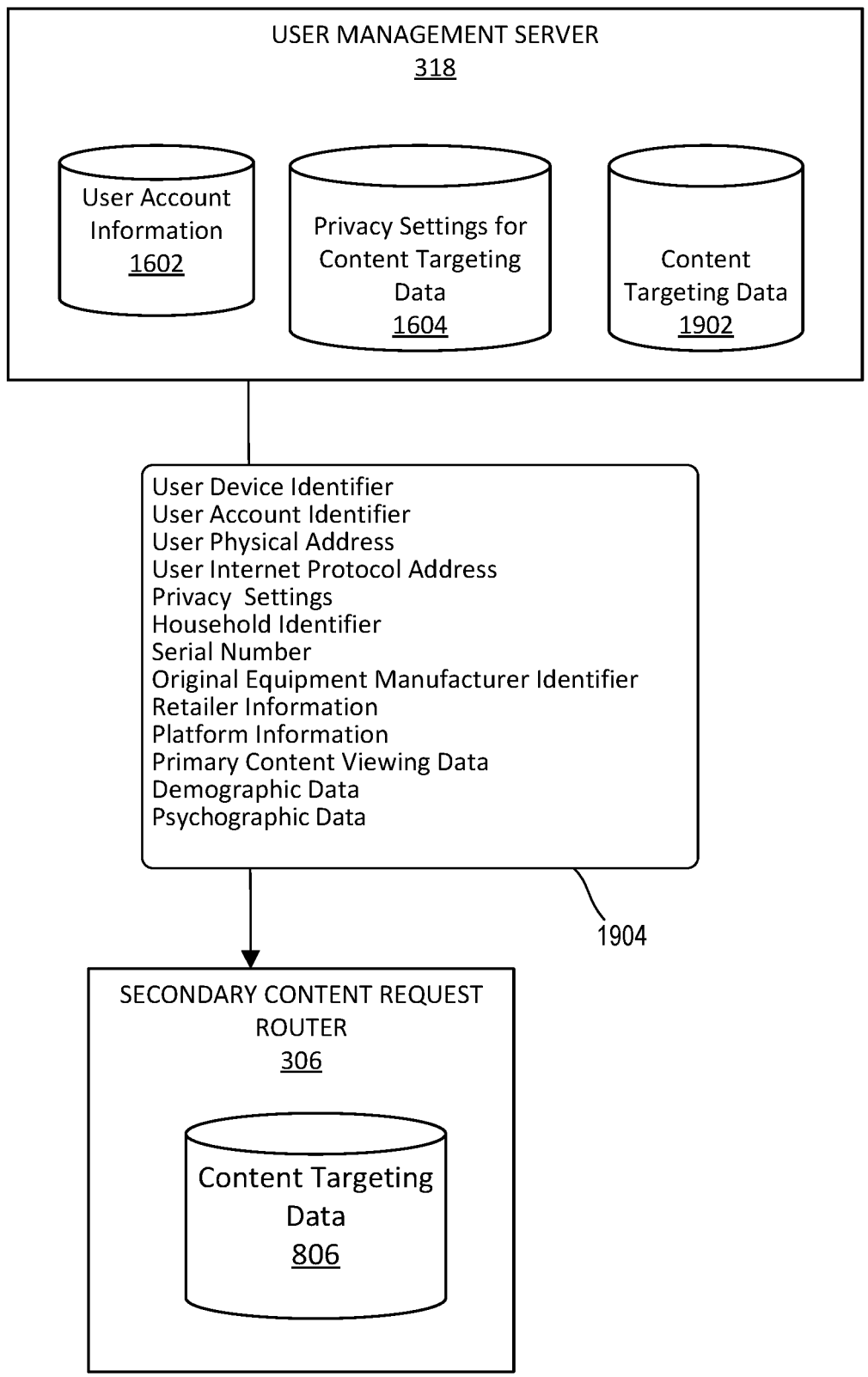
FIG. 19 is a diagram showing example communications and/or data flow between a user management server and a secondary content request router.

FIG. 19 shows example communications and/or data flow between the user management server 318 and the secondary content request router 308. In addition to the database 1602 for storing user account information and the database 1604 for storing the various privacy settings for the content targeting data of the user devices (as shown in FIG. 16), the user management server 318 may comprise an additional database 1902 for storing content targeting data of the user devices. The database 1902 for storing content targeting data of the user devices may comprise content viewing habits, demographic characteristics, and psychographic characteristics associated with the users of the user devices. The data stored in the database 1902 may be sent by the user devices and/or collected by the user management server 318. Information 1904 about the various user devices may be sent once or periodically (e.g., once a day, once a week, once a month) from the user management server 318 to the secondary content request router 306. Information 1904 may comprise unique account identifiers of the user accounts in the network service provider, user device identifiers of the user devices using the user accounts, physical address of the users (e.g., house number, street number, city, state, ZIP code, etc.), IP addresses of the user devices, MAC addresses of the user devices, any household identifier associated with the user devices, privacy settings that indicate whether the user devices prefer or have permitted receiving targeted secondary content items, what content targeting data may be shared with secondary content delivery networks, OEM identifiers of the user devices, serial numbers of the user devices, platforms installed on the user devices, content viewing habits or patterns of the users of the user devices, demographic characteristics of the users of the user devices, psychographic characteristics of the users of the user devices, and/or other data. The secondary content request router 306 may store the information 1904 received from the user management server 318 (e.g., the information 1904 may be stored in the database 806 for storing content targeting data).

Figure 20:
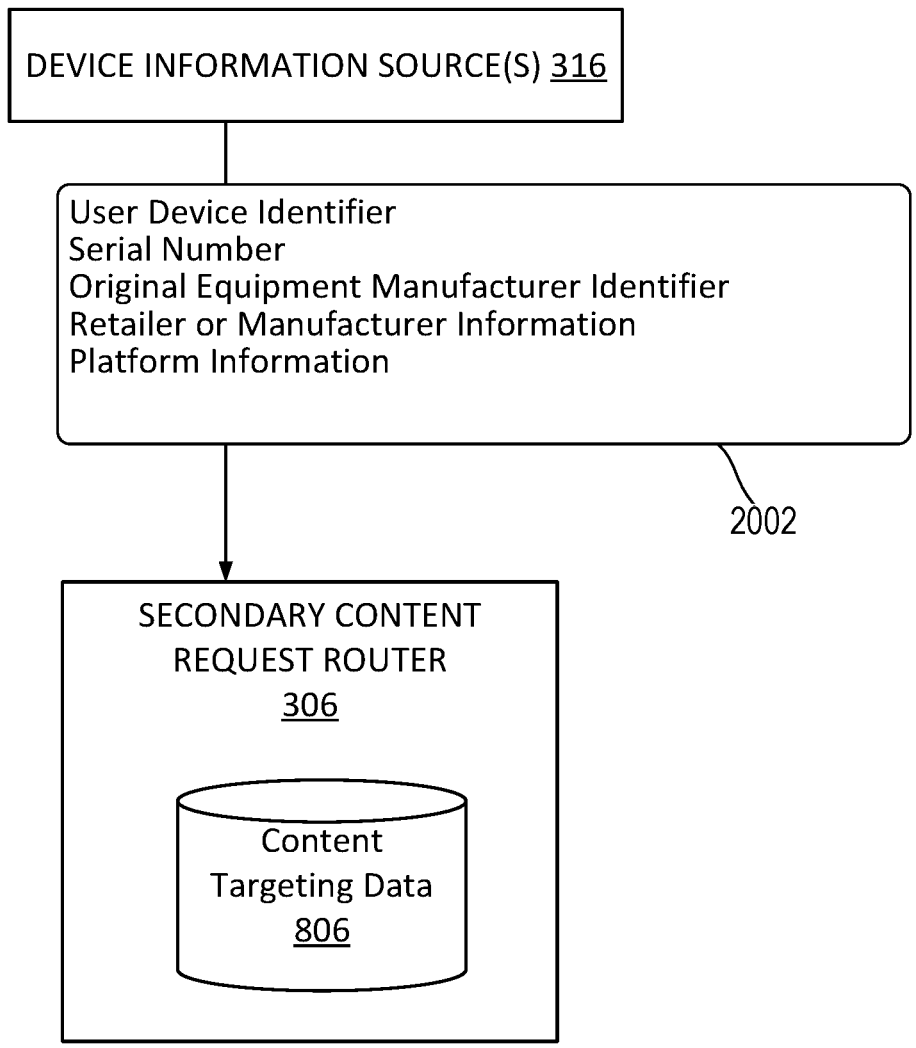
FIG. 20 is a diagram showing example communications and/or data flow between various device sources and a secondary content request router.

Referring back to FIG. 18A, at step 1802, the secondary content request router 306 may receive additional information about the user devices from manufacturers and/or retailers of the user devices. For example, the secondary content request router 306 may receive the information at step 1802 from various device information sources (e.g., the device information sources 133, the device information sources 316). The device information sources may be servers associated with retailers and/or manufacturers of the user devices. FIG. 20 shows example information 2002 sent by the device information sources 316 to the secondary content request router 306. The information 2002 may comprise any unique user device identifiers of user devices sold by retailers and/or manufactured by the manufacturer, information about the retailer and/or the manufacturer, OEM identifiers of the user devices, serial numbers of the user devices, platforms installed on the user devices, and/or other data. The secondary content request router 306 may store the information 2002 received from the device information sources 316 (e.g., the information 2002 may be stored in the database 806 for storing content targeting data).

Figure 21:
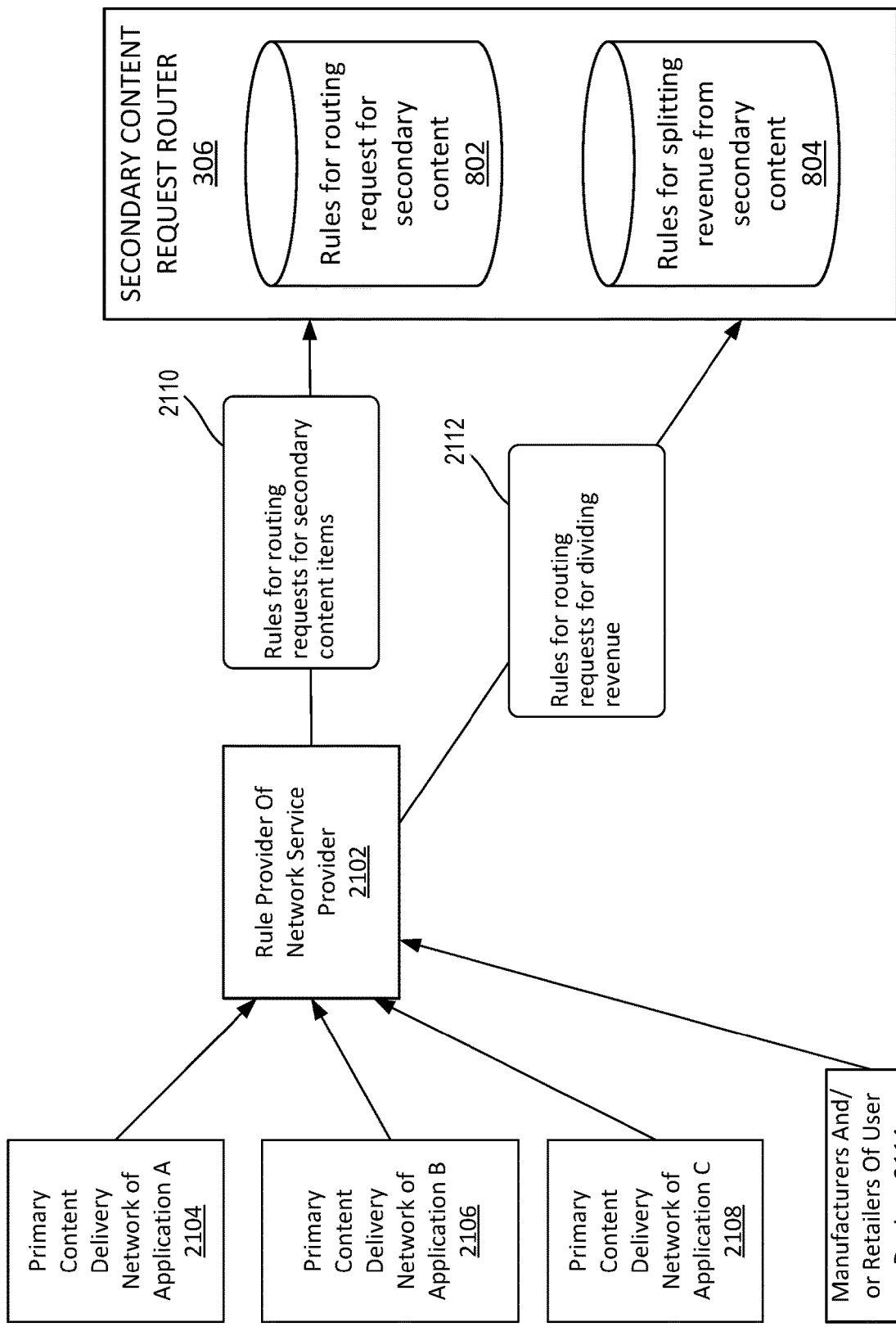
FIG. 21 is a diagram showing example communications and/or data flow between local offices of network service providers and a secondary content request router.

Referring back to FIG. 18A, at step 1803, the secondary content request router 306 may receive rules for routing requests for secondary content items to one of many secondary content delivery networks. A network service provider may provide rules for routing requests from user devices using the network service provider's networks to output primary and secondary content items. For example, FIG. 21 shows a rule provider 2102 (e.g., the rule provider 330) of a network service provider that may provide rules 2110 for routing requests for secondary content items from the user devices using the network service provider. The rule provider 2102 may determine the rules 2110 based on information and/or inputs from manufacturers and/or retailers 2114 of the user devices and/or primary content delivery networks of various applications that can be installed in the user devices (e.g., the primary content delivery network 2104 for application A, the primary content delivery network 2106 for application B, and the primary content delivery network 2108 for application C). A primary content delivery network for an application (e.g., one of the primary delivery networks 2104, 2106, 2108) may indicate that a certain portion of requests for secondary content items from the application may be forwarded to a secondary content delivery network associated with the primary content delivery network. Similarly, a manufacturer of user devices may indicate that a certain portion of requests for secondary content items from the user devices manufactured by the manufacturer be forwarded to a secondary content delivery network associated with the manufacturer. A retailer for user devices may also indicate that a certain portion of requests for secondary content items from the user devices sold by the retailer be forwarded to a secondary content delivery network associated with the retailer. The rules 2110 for routing requests for secondary content items may be stored in a database (e.g., the database 802 for storing rules for routing requests for secondary content items).

Figure 22A:
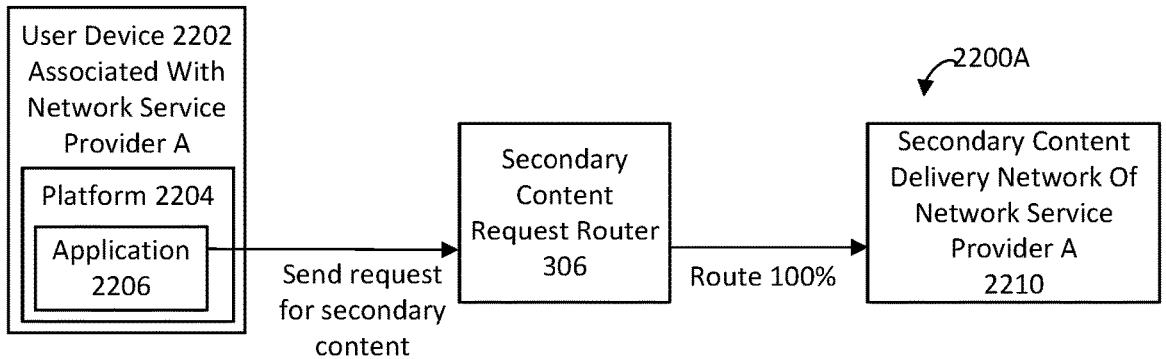
FIGS. 22A, 22B, 22C, and 22D show example rules for routing requests for secondary content.
Figure 22B:
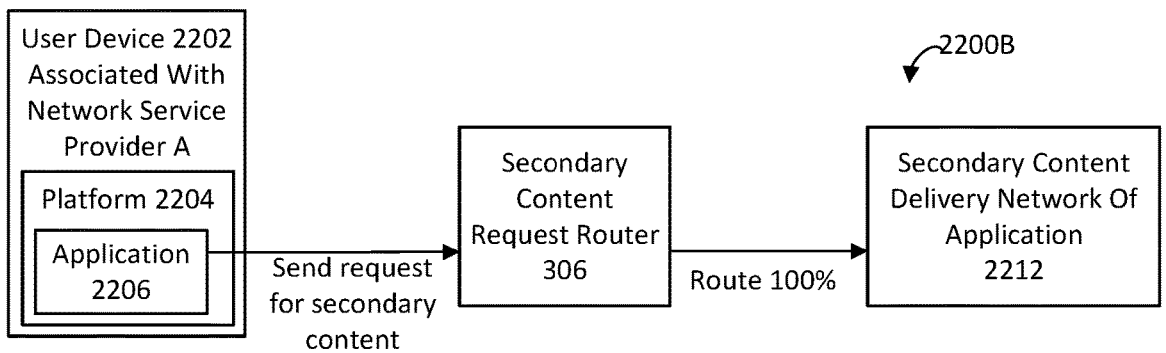
Figure 22C:
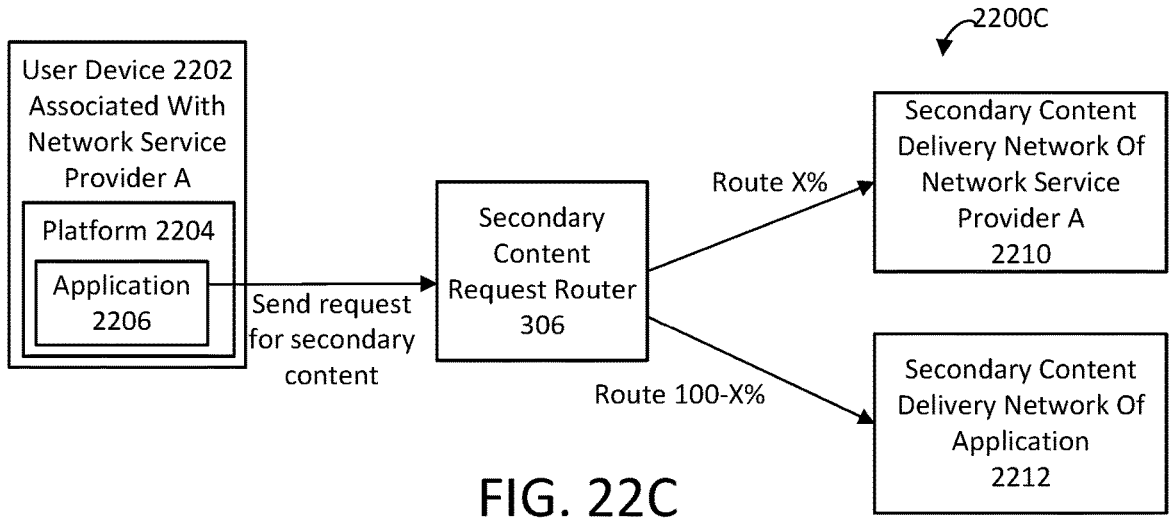
Figure 22D:
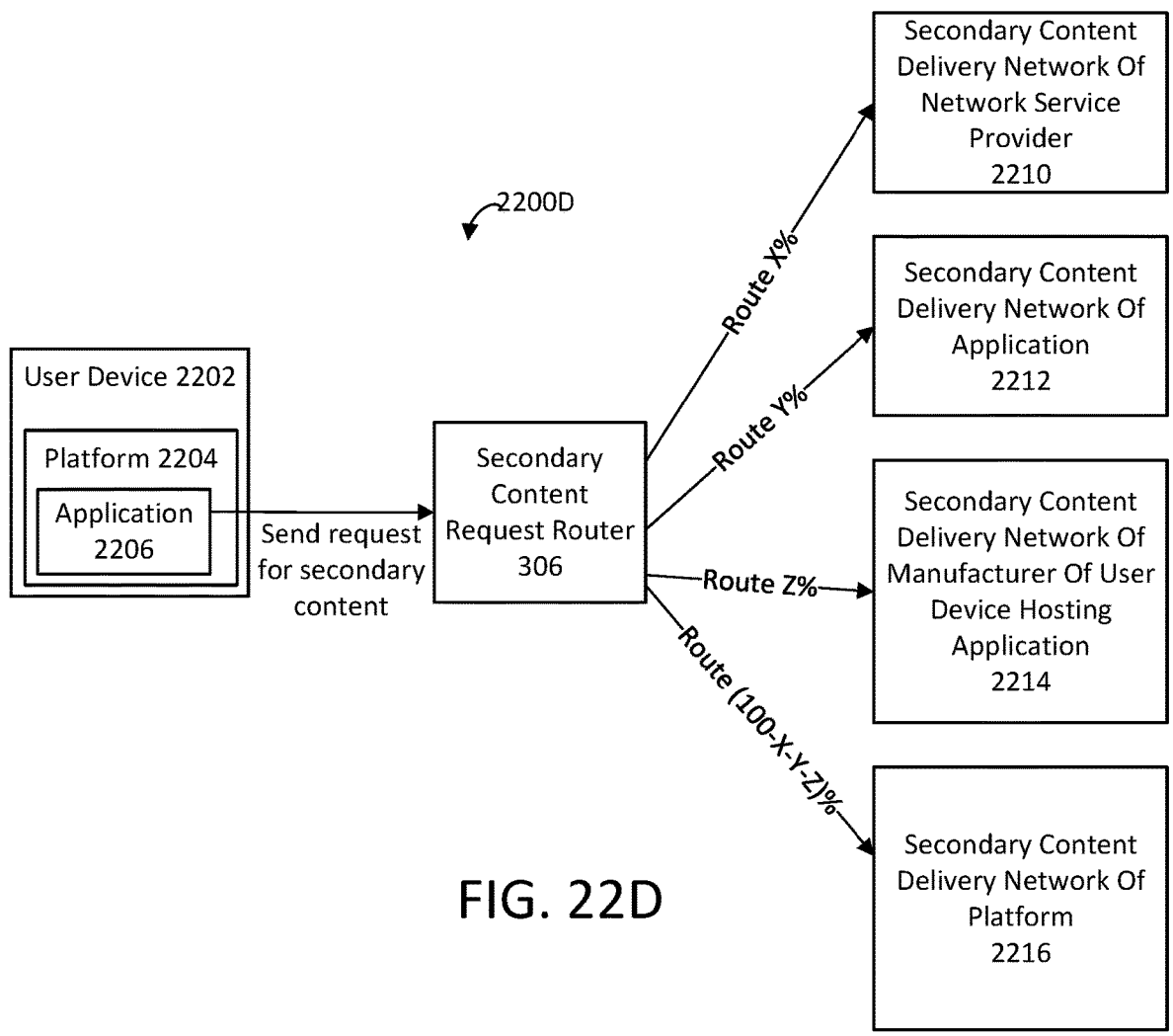

FIGS. 22A, 22B, 22C, and 22D show different rules that a network service provider may provide to the secondary content request router 306 for routing requests for secondary content items. For example, rule 2200A in FIG. 22A (e.g., a rule stored in the database 802 for storing rules for generating tokens) may indicate to secondary content request router 306 that all requests for secondary content items (e.g., 100% of the requests) received from user devices (e.g., the user device 2202) associated with the network service provider A will be sent by the secondary content request router 306 to a secondary content delivery network 2210 provided by the network service provider A. Alternatively, as shown in FIG. 22B, a rule 2200B for a network service provider A may specify that all requests for secondary content items (e.g., 100% of the requests) received from user devices (e.g., the user device 2202) associated with the network service provider A will be sent to a secondary content delivery network 2212 associated with entities providing and/or associated with the application (e.g., application 2206) installed on the user device requesting the secondary content items. As another example, as shown in FIG. 22C, a rule 2200C may specify to send some of the requests for secondary content items (e.g., X % of the requests) received from user devices (e.g., the user device 2202) associated with the network service provider A to the secondary content delivery network 2210 associated with the network service provider A and the rest of the requests for secondary content items (e.g., 100-X % of the requests) to secondary content delivery network 2212 associated with entities providing and/or associated with the application (e.g., application 2206) installed on the user devices requesting the secondary content items. Moreover, some of the requests may be forwarded to secondary content delivery networks other than the secondary content delivery network 2210 associated with the network service provider A and the secondary content delivery network 2212 associated with the application. As shown in FIG. 22D, a rule 2200D may specify to send some of the requests for secondary content items (e.g., X % of the requests) received from user devices (e.g., the user device 2202) to the secondary content delivery network 2210 associated with the network service provider, some of the requests (e.g., Y % of the requests) to the secondary content delivery network 2212 associated with the application, some of the requests (e.g., Z % of the requests) to the secondary content delivery network 2214 associated with the manufacturer of the user device (e.g., user device 2202), and the rest of the requests (e.g., 100-X-Y-Z % of the requests) to the secondary content delivery network 2216 associated with the platform (e.g., platform 2204) installed in the user device. Some of the rules may also specify sending a portion of the secondary content requests to the retailer of the user device.

Referring back to FIG. 18A, at step 1804, the secondary content request router 306 may receive rules for dividing revenue received for outputting secondary content items in various user devices. For example, FIG. 21 shows a rule provider 2102 (e.g., the rule provider 330) of a network service provider that may provide rules 2112 for dividing revenue gained by outputting secondary content items in user devices using the network service provider. A network service provider may determine the rules 2112 by itself and/or may determine the rules 2112 based on information and/or inputs from manufacturers and/or retailers 2114 of the user devices and/or primary content delivery networks associated with various applications that can be installed in the user devices (e.g., the primary content delivery network 2104 for application A, the primary content delivery network 2106 for application B, and the primary content delivery network 2108 for application C). A retailer for user devices may also indicate that it wants a revenue share. The rules 2112 for dividing revenues may be stored in a database (e.g., the database 804 for storing rules for splitting revenues from secondary content items). A rule for dividing the revenue may indicate that a portion of the revenue (e.g., X % of the revenue) will be assigned to the network service provider, a portion of the revenue (e.g., Y % of the revenue) may be assigned to the entities associated with the application outputting the secondary content items, a portion of the revenue (e.g., Z % of the revenue) may be assigned to the manufacturer of the user device (e.g., user device 2202), and the rest of the revenue (e.g., 100-X-Y-Z % of the revenue) may be assigned to an entity providing and/or associated with the platform (e.g., platform 2204) installed in the user device. Some of the rules may also specify sharing a portion of the revenue with the retailer of the user device.

Referring back to FIG. 18A, at step 1805, the secondary content request router 306 may receive a token from a user device (e.g., the user device 308) along with a request for secondary content items. The token received from the user device 308 may be a token object 502 shown in FIG. 5 and/or stored by the user device 308 (e.g., in the database 414 for storing tokens for requesting secondary content items). The secondary content request router 306 may receive additional data from the user device (e.g., the data 1404 in FIG. 14). For example, the secondary content request router 306 may receive an identifier for the network service provider associated with the user device, an identifier for the user device, an identifier of the application requesting the secondary content items, an identifier for the platform installed in the user device, content viewing habits or patterns of the users of the user devices, demographic characteristics of the users of the user devices, psychographic characteristics of the users of the user devices, and/or other data.

At step 1806, the secondary content request router 306 may determine an identifier for the network service provider associated with the user device. If the secondary content requester is only servicing user devices of one network service provider, the determined identifier may be the identifier of that network service provider. If the secondary content requester is servicing user devices of multiple network service providers, the identifiers of the network service providers may be received from the user device, identified from the tokens (e.g., from the data field 524 of the token indicating the network service provider), and/or determined from the information gathered at step 1801.

At step 1807, the secondary content request router 306 may determine an identifier for the application installed on the user device 308 (e.g., any one of the applications 404, 406, 408, 410, 412 in the user device 308) and requesting the secondary content items. The identifier of the application may be received from the user device 308 at step 1805 and/or identified from the token (e.g., from the data field 518 of the token indicating the application). Additionally, at step 1808, the secondary content request router 306 may determine an identifier for the user device 308 requesting the secondary content items. The identifier of the user device 308 may be received from the user device 308 at step 1805 and/or identified from the token (e.g., from the data field 520 of the token storing an identifier of the user device). At step 1809, the secondary content request router 306 may determine an identifier for the platform 501 installed in the user device 308. The identifier of the platform may be received from the user device 308 at step 1805 and/or determined from the information gathered at steps 1801 and 1802. At step 1810, the secondary content request router 306 may determine an identifier for the manufacturer of the user device and/or an identifier for the retailer of the user device. Using the user device's identifier, the secondary content request router 306 may determine an identifier for the manufacturer of the user device and/or an identifier for the retailer of the user device from the information received at steps 1801 and 1802.

At step 1811 in FIG. 18B, the secondary content request router 306 may receive content targeting data associated with the user device 308 and privacy settings associated with the content targeting data. The secondary content request router 306 may receive the content targeting data associated with the user device 308 and privacy settings associated with the content targeting data from the user device 308 and/or as part of the information received at step 1801. The privacy settings for the content targeting data may indicate whether the user device 308 has permission to receive targeted secondary content items (e.g., setting chosen by the various options in user interface 1002 in FIG. 10A) and/or whether a user of the user device 308 prefers to receive targeted secondary content items. Additionally, if the user device 308 has permission to receive the targeted secondary content items, the privacy settings may indicate which content targeting data may be shared with the secondary content delivery networks when requesting the secondary content items (e.g., settings chosen by the various options in user interface 1004 in FIG. 10B). For example, a user of the user device 308 may indicate to share user content viewing habits and/or patterns of the users of the user device but not demographic data of the users, psychographic data of the users, or zip code of the users.

At step 1812, if the user device 308 has permission to receive targeted secondary content items, the secondary content request router 306 may determine which portions of the content targeting data received at step 1811 may be used for receiving the targeted secondary content items based on the privacy settings associated with the content targeting data received at step 1811. Furthermore, the token received at step 1805 may comprise a Boolean data field (e.g., the "targeted secondary content" data field 526 in the token 502) that indicates whether the user device has permission to receive targeted secondary content items. Also, or alternatively, the token may indicate whether the token is for a session (e.g., of the token type "sessionid" indicated in token type data field 514 in the token 502) where targeted secondary content items may not be delivered to the user device 308. The secondary content request router 306 may receive content viewing habits and/or patterns of the users of the user device 308, the demographic data of the users, and the psychographic data of the users. If the privacy settings received at step 1811 indicate that a user of the user device 308 prefers only sharing the content viewing habits and/or patterns and not the demographic and psychographic data of the users, only the content viewing habits and/or patterns may be forwarded to the secondary content delivery networks for receiving targeted content items. If the privacy settings received at step 1811 or the token received at step 1805 indicate that a user of the user device does not prefer to receive targeted secondary content items, none of the content targeting data may be forwarded to secondary content delivery.

At step 1813, if the privacy settings received at step 1811 or the token received at step 1805 indicate that a user of the user device 308 does not prefer to receive targeted secondary content items, the secondary content request router 306 may determine general data that can be forwarded to the secondary content delivery networks. The general data may comprise a Designated Market Area (DMA) or a Metropolitan Statistical Area (MSA) that identifies the area the user device or the user of the user device may be located. The secondary content request router 306 may determine the general data based on the content targeting data. For example, the secondary content request router 306 may determine the DMA or MSA based on a ZIP code associated with the user device 308.

At step 1814, the secondary content request router 306 may select a rule to route the token and the request for secondary content items received at step 1805. The secondary content request router 306 may select one of the rules received at step 1803 and/or stored in a database of the secondary content request router 306 (e.g., the database 802 for storing rules for routing requests for secondary content items). The secondary content request router 306 may select one or more rules primarily based on the identifier for the network service provider determined at step 1806. For some network service providers, the secondary content request router 306 may only store one default rule for routing the token and the request for secondary content items. For example, the example default rule 2200A in FIG. 22A for the network service provider A may indicate that all requests for secondary content items (e.g., 100% of the requests) received from user devices (e.g., the user device 2202) may be sent to a secondary content delivery network 2210 associated with the network service provider A. Alternatively, a network service provider may store multiple rules (e.g., the rules 2200B, 2200C, 2200D) for combinations of various applications that may be installed on the user device 308 and requesting the secondary content items, various platforms installed on the user device 308, the manufacturer of the user device 308, and/or the retailer of the user device 308. The secondary content request router 306 may select one of the multiple rules for the network service provider based on the application identifier determined at step 1807, the user device identifier determined at step 1808, the platform identifier determined step 1809, the manufacturer identifier determined at step 1810, and/or the retailer identifier determined at step 1810.

At step 1815, the secondary content request router 306 may use the rule selected at step 1814 to select a secondary content delivery network to forward the token and the request for secondary content items received at step 1805. For example, if the rule selected at step 1814 is the default rule 2200A in FIG. 22A for the network service provider A, the secondary content delivery network 2210 associated with the network service provider A may be selected. Alternatively, if the rule selected at 1814 indicates that the token and the request for secondary content items may be routed to multiple secondary delivery networks (e.g., the rules 2200B, 2200C, 2200D), the secondary content request router 306 may select one of the multiple secondary delivery networks. The secondary content request router 306 may select one of the multiple secondary delivery networks by performing a probabilistic determination of which one of the multiple delivery networks may be selected. The probabilistic determination may entail generating a probability value (e.g., a random number generated by a random number generator) and determining if the probability value falls within predetermined value ranges of the multiple secondary content delivery networks. For example, the rule 2200 in FIG. 22D may indicate that 40% of the requests be routed to the secondary content delivery network 2210 associated with the network service provider, 40% of the requests will be routed to the secondary content delivery network 2212 associated with the application, 10% of the requests will be routed to the secondary content delivery network 2214 associated with the manufacturer of the user device 308 (e.g., user device 2202), and 10% of the requests will be routed to the secondary content delivery network 2216 associated with the platform (e.g., platform 2204) installed on the user device 308. The secondary content delivery network 2210 associated with the network service provider may be assigned a probability range of 0-40, the secondary content delivery network 2212 associated with the application may be assigned a probability range of 41-80, the secondary content delivery network 2214 associated with the manufacturer of the user device 308 may be assigned a probability range of 81-90, and the secondary content delivery network 2216 associated with the platform (e.g., platform 2204) installed on the user device 308 may be assigned a range of 91-100. If the probability value is 29, the secondary content delivery network 2210 associated with the network service provider may be selected. As another example, for a probability value of 93, the secondary content delivery network 2216 associated with the platform may be selected.

At step 1816, the secondary content request router 306 may forward the token and/or the request for secondary content items received at step 1805 to the selected secondary content delivery network of step 1815. If the token or the user device 308 has indicated that the user device 308 may receive targeted secondary content items, the content targeting data received at step 1812 may be forwarded to the selected secondary content delivery network of step 1815. Additionally, or alternatively, the general data determined at step 1813 may be forwarded to the selected secondary content delivery network of step 1815. Other information may also be sent to the selected secondary content delivery network of step 1815, such as the number of secondary content items needed, the total length of secondary content items required (e.g., 30 seconds, 1 minute, 1.5 minutes, etc.), and/or other data.

At step 1817, the secondary content request router 306 may receive one or more secondary content items from the selected secondary content delivery network of step 1815. At step 1818, the secondary content request router 306 may forward the received secondary content items to the user device 308 that sent the token and/or the request for the secondary content items at step 1805.

At step 1819, the secondary content request router 308 may select a rule for dividing the revenue earned by outputting the received secondary content items of step 1817 via the user device 308. The secondary content request router may select one of the rules received at step 1804 and/or stored in a database of the secondary content request router (e.g., the database 804 for storing rules for splitting revenue from secondary content items). The secondary content request router may select one or more rules based on the identifier for the network service provider determined at step 1806. Also, or additionally, the secondary content request router 306 may select a rule for dividing the revenue based on the application identifier determined at step 1807, the user device identifier determiner at step 1808, the platform identifier determined in step 1809, the manufacturer identifier determined at step 1810, and/or the retailer identifier determined at step 1810. At step 1820, the secondary content request router may send messages to different entities (e.g., network service provider, entities providing and/or associated with the application, manufacturer, and/or retailer) that would receive portions of the revenue.

FIG. 23 shows an architectural level schematic of an environment 2300 that includes an advertisement addressability and inventory management server 2302 (e.g., the secondary content requester 306) in communication with a user device 2306 (e.g., the mobile devices 135, devices in the premises 102, user device 308, etc.). The advertisement addressability and inventory management server 2302 may comprise one or more computing device(s) and/or be implemented on a cloud service, as a Software-as-a-Service (SaaS) application, or a web-architected application. The user device 2306 may comprise an OTT application 2310 (e.g., OTT applications 410, 412) for outputting primary content, such as videos, audios, games, and/or other data. While only one OTT application is shown in FIG. 23, multiple OTT applications may be present in the user device 2306. The user device 2306 may also comprise an application manager 2308 (e.g., comprising the functionalities of the token manager 416, the secondary content requester 418, and/or the content targeting data manager 420). The environment 2300 may further comprise a network service provider token management system 2312, a user management server 2314, and/or an advertisement delivery network 2304 associated with the OTT application 2310 in the user device 2306. The user device 2306, the advertisement addressability and inventory management server 2302, the advertisement delivery network 2304, the user management server 2314, and/or the network service provider token management system 2312 may comprise one or more computing devices and/or one or more software components executing on one or more computing devices.

The network service provider token management system 2312 may manage tokens (e.g., token 502 in FIG. 5) of the OTT application 2310 installed on the user device 2306. The application manager 2308 in the user device 2306 may request a token on behalf of the OTT application 2310 from the network service provider token management system 2312. The network service provider token management system 2312 may be associated with a network service provider (e.g., the network service provider of the local office 103 in FIG. 1A, the network service providers A and B in FIG. 1B) that is enabling communications between the user device 2306, the advertisement addressability and inventory management server 2302, the advertisement delivery network 2304, the user management server 2314, and/or the network service provider token management system 2312. The network service provider may also provide communication networks (e.g., the communication network 100A, the communication network 100B) that allow the user device 2306 to request, access, and/or output video, audio, and/or software via the OTT application 2310. The network service provider token management system 2312 may store rules provided by the network service provider for generating tokens. The network service provider token management system 2312 may generate a token for the OTT application 2310 based on the stored rules for generating tokens and send the token to the application manager 2308. If the OTT application 2310 does not yet have an assigned token, the application manager 2308 may send a request for a new token to the network service provider token management system 2312. Additionally, or alternatively, the network service provider token management system 2312 may determine that the token for the OTT application 2310 has expired and generate a new token for the OTT application 2310. The network service provider and/or the user management server 2314 (e.g., the user management server 318, the user management server 107) may also request the network service provider token management system 2312 to revoke a token previously assigned to OTT application 2310 and generate a new token for the OTT application 2310. The application manager 2308 may send request information specific to the user device 2306 and/or information specific to the users of the user device 2306 to the network service provider token management system 2312 for generating and managing the tokens of the OTT application 2310. Additionally, or alternatively, the network service provider token management system 2312 may receive the user- and/or device-specific information from the user management server 2314 (e.g., the user management server 318, the user management server 107).

The OTT application 2310 may send a request to the application manager 2308 for advertisements that may inserted between segments of primary content. The application manager 2308 may be configured to forward the request from the OTT application 2310, along with the token for the OTT application 2310, to the advertisement addressability and inventory management server 2302. The advertisement addressability and inventory management server 2302 may receive the token and/or requests for advertisements from the application manager 2308 in the user device 2306. The advertisement addressability and inventory management server 2302 may store an inventory of advertisements (e.g., store the inventory of advertisements in the advertisement addressability and inventory management server 2203 and/or in one or more computing devices or servers associated with the network service provider). The advertisement addressability and inventory management server 2302 may also store rules for processing advertisement requests from the OTT application 2310 and/or other applications in the user device 2306. Based on the rules, the advertisement addressability and inventory management server 2302 may select advertisements from its own advertisement inventory and/or forward the advertisement to the application manager 2308 and/or the OTT application 2310. Additionally, or alternately, based on the rules, the advertisement addressability and inventory management server 2302 may forward the request and/or the token for the OTT application 2310 to the advertisement delivery network 2304 associated with the OTT application 2310.

The application manager 2308 may also indicate to the network service provider token management system 2312 that one or more users of the user device 2306 prefer or do not prefer to receive targeted advertisements. The application manager 2308 may send the preference of the one or more users to the network service provider token management system 2312 along with a request for a new token. Alternatively, when a user for the user device 2306 changes the user's preference for targeted advertisements, the application manager 2308 may send the updated preference to the network service provider token management system 2312. In another example, the application manager 2308 may send the user's preference for targeted advertisements to the user management server 2314 (e.g., the user management server 318, user management server 107 of FIG. 1A), and the user management server 2314 may provide the user's preference to the network service provider token management system 2312.

When the advertisement addressability and inventory management server 2302 receives a token and/or a request for advertisements from the application manager 2308 of the user device 2310, the advertisement addressability and inventory management server 2302 may determine whether the user device 2306 has opted for targeted advertisements. If the user device 2306 has opted for targeted advertisements, the advertisement addressability and inventory management server 2302 may retrieve information related to the user device 2306, a user account associated with the user device 2306, and/or users of the user device 2306 from the user management server 2314, and forward the information to the advertisement delivery network 2304 or use the information to select one or more advertisements from its own inventory. The advertisement addressability and inventory management server 2302 may also retrieve user content viewing habits, demographic characteristics, and psychographic characteristics associated with the users of the user device 2306 from the user management server 2314 and/or the user device 2306, and forward such information to the advertisement delivery network 2304 or use the information to select one or more advertisements from its own inventory. The advertisement delivery network 2304 may select a targeted advertisement based on the user- and/or device-specific information provided by the secondary content request router 306 and send the targeted advertisement to the advertisement addressability and inventory management server 2302. The advertisement addressability and inventory management server 2302 may forward the targeted advertisement to the application manager 2308 or the OTT application 2310.

Alternatively, if the user device 2306 has opted not to receive targeted advertisements, the advertisement addressability and inventory management server 2302 may forward only the token for OTT application 2310 to the advertisement delivery network 2304 or use the token to select one or more non-targeted advertisements from its own inventory. The advertisement delivery network 2304 may select a nontargeted advertisement and send the nontargeted advertisement to the advertisement addressability and inventory management server 2302. The advertisement addressability and inventory management server 2302 may forward the nontargeted advertisement to the user device 2306 for display.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
    receiving, by a computing device and from a user device configured to receive primary content from one or more primary content delivery networks, a request for a token associated with secondary content from one or more secondary content delivery networks;
    determining, based on the request for the token, a network service provider of a communication network via which the user device accesses the one or more primary content delivery networks and the one or more secondary content delivery networks;
    selecting, based on the determined network service provider, one or more rules of a plurality of rules corresponding to a plurality of network service providers, wherein the one or more rules correspond to the determined network service provider;
    sending, to the user device, a token generated based on the selected one or more rules;
    receiving, from the user device, the token and a request for secondary content; and
    sending, to a secondary content delivery network, of the one or more secondary content delivery networks, and based on the request for secondary content, the token.

2. The method of claim 1, further comprising:
    selecting, based on a second network service provider of a second communication network via which a second user device accesses the one or more primary content delivery networks and the one or more secondary content delivery networks, one or more second rules of the plurality of rules, wherein the one or more second rules correspond to the second network service provider and are different from the one or more rules; and
    sending, to the second user device, a second token generated based on the selected one or more second rules.

3. The method of claim 1, wherein the receiving the request for the token comprises receiving one or more indications of one or more applications installed on the user device and associated with the one or more primary content delivery networks, and wherein the token is generated further based on the one or more indications.

4. The method of claim 1, wherein the receiving the request for the token comprises receiving one or more indications of one or more preferences, associated with the user device, for sharing of content targeting data, and wherein the token is generated further based on the one or more preferences.

5. The method of claim 1, wherein the token comprises an expiration date corresponding to the network service provider.

6. The method of claim 1, wherein the token further comprises one or more of:
    one or more indications of the selected one or more rules;
    one or more indications of one or more applications, installed on the user device, associated with the one or more primary content delivery networks;
    an indication that the token was requested by the user device, an application installed in the user device, or a user of the user device;
    an indication of a type of token;
    an indication of a user account associated with the user device; or
    an indication of the network service provider.

7. The method of claim 1, wherein the receiving the request for the token comprises receiving one or more indications of one or more preferences, associated with the user device, for sharing of content targeting data, and wherein the generated token comprises an indication of the one or more preferences.

8. The method of claim 1, wherein a plurality of applications, associated with a plurality of primary content delivery networks, are installed on the user device, wherein the receiving the request for the token comprises receiving one or more first indications of a first application of the plurality of applications, wherein the token is associated with the first application of the plurality of applications, and wherein the method further comprises:
    generating, further based on the first one or more indications, the token;
    receiving, from the user device, a second request for a second token associated with secondary content, wherein the second request for the second token comprises one or more second indications of a second application of the plurality of applications;
    generating, based on the selected one or more rules and on the one or more second indications, the second token; and
    sending, to the user device, the second token.

9. A method comprising:
    determining, by a computing device:
        a network service provider associated with communications between a user device and a plurality of primary content delivery networks;
        a first application installed on the user device and associated with a first primary content delivery network of the plurality of primary content delivery networks; and
        a second application installed on the user device and associated with a second primary content delivery network of the plurality of primary content delivery networks;
    selecting, based on the determined network service provider, one or more rules of a plurality of rules corresponding to a plurality of network service providers, wherein the one or more rules correspond to the determined network service provider;
    generating, based on the determined network service provider and on the first application, a first token associated with secondary content from one or more secondary content delivery networks and with the first application;

generating, based on the determined network service provider and on the second application, a second token associated with secondary content from the one or more secondary content delivery networks and with the second application; and sending, to the user device, the first token and the second token.

10. The method of claim 9, further comprising:
receiving, from the first application, the first token and a first request for secondary content;
sending, to a secondary content delivery network associated with the first application and based on the first request for secondary content, the first token;
receiving, from the second application, the second token and a second request for secondary content; and
sending, to a secondary content delivery network associated with the second application and based on the second request for secondary content, the second token.

11. The method of claim 9, further comprising:
selecting, based on a second network service provider associated with communications between a second user device and the plurality of primary content delivery networks, one or more second rules of the plurality of rules, wherein the one or more second rules correspond to the second network service provider and are different from the one or more rules; and
sending, to the second user device, a third token generated based on the selected one or more second rules.

12. The method of claim 9, wherein determining the first application comprises receiving, from the user device, a first request associated with the first token and comprising one or more first indications of the first application; and
wherein determining the second application comprises receiving, from the user device, a second request associated with the second token and comprising one or more second indications of the second application.

13. The method of claim 9, further comprising:
receiving one or more indications of one or more preferences, associated with the user device, for sharing of content targeting data, wherein the first token and the second token are generated further based on the one or more preferences.

14. The method of claim 9, wherein the first token and the second token comprise an expiration date corresponding to the network service provider.

15. The method of claim 9, further comprising:
receiving one or more indications of one or more preferences, associated with the user device, for sharing of content targeting data, and wherein at least one of the first token or the second token comprises an indication of the one or more preferences.

16. A method comprising:
determining, by a computing device:
a network service provider of a communication network via which a user device accesses a plurality of primary content delivery networks and a secondary content delivery network, and
one or more preferences, associated with the user device, for sharing of content targeting data;
selecting, based on the determined network service provider, one or more rules of a plurality of rules corresponding to a plurality of network service providers, wherein the one or more rules correspond to the determined network service provider;

generating, based on the determined network service provider and on the one or more preferences, a token:
associated with secondary content from the secondary content delivery network, and
comprising an indication of the one or more preferences; and
sending, based on a request for secondary content received from the user device, the token to the secondary content delivery network.

17. The method of claim 16, further comprising:
sending the token to the user device; and
receiving, from the user device, the token and a request for secondary content,
wherein the sending the token to the secondary content delivery network is based on the receiving the token and the request for secondary content from the user device.

18. The method of claim 16, further comprising:
selecting, based on a second network service provider of a second communication network via which a second user device accesses the plurality of primary content delivery networks and the secondary content delivery network, one or more second rules of the plurality of rules, wherein the one or more second rules correspond to the second network service provider and are different from the one or more rules; and
sending, to the second user device, a second token generated based on the selected one or more second rules.

19. The method of claim 16, further comprising:
receiving, from the user device, a request for the token and one or more indications of an application installed on the user device and associated with one of the plurality of primary content delivery networks, wherein the generating the token is further based on the one or more indications.

20. The method of claim 16, wherein the token further comprises one or more of:
an indication of an expiration date associated with the token and corresponding to the network service provider;
one or more indications of the selected one or more rules;
one or more indications of one or more applications, installed on the user device, associated with one or more primary content delivery networks;
an indication that the token was requested by the user device, an application installed in the user device, or a user of the user device;
an indication of a type of token;
an indication of a user account associated with the user device; or
an indication of the network service provider.

21. A method comprising:
determining a network service provider associated with communications between a user device and a plurality of primary content delivery networks;
generating, based on one or more rules provided by the determined network service provider, a plurality of tokens for a plurality of applications installed on the user device, wherein each application, of the plurality of applications may use a corresponding token, from the plurality of tokens, to request secondary content from a plurality of secondary content delivery networks; and
sending, to the user device, the plurality of tokens.

22. The method of claim 21, wherein the generating the plurality of tokens is further based on one or more primary content delivery networks associated with the plurality of applications.

23. The method of claim 21, wherein the generating the plurality of tokens is further based on one or more preferences, associated with the user device, for sharing of content targeting data.

24. The method of claim 21, wherein the plurality of tokens comprise an expiration date corresponding to the network service provider.

* * * * *